(12) United States Patent
Zaman et al.

(10) Patent No.: US 10,254,955 B2
(45) Date of Patent: Apr. 9, 2019

(54) PROGRESSIVELY INDICATING NEW CONTENT IN AN APPLICATION-SELECTABLE USER INTERFACE

(71) Applicant: Microsoft Technology Licensing, LLC, Redmond, WA (US)

(72) Inventors: Nazia Zaman, Kirkland, WA (US); Tyler J. Donahue, Bellevue, WA (US); Ethan Nelson Ray, Redmond, WA (US); Maverick J. Velasco, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 550 days.

(21) Appl. No.: 14/847,882

(22) Filed: Sep. 8, 2015

(65) Prior Publication Data
US 2015/0378594 A1    Dec. 31, 2015

Related U.S. Application Data

(63) Continuation of application No. 13/229,702, filed on Sep. 10, 2011, now Pat. No. 9,146,670.

(51) Int. Cl.
| | | |
|---|---|---|
| *G06F 3/01* | (2006.01) | |
| *G06F 17/30* | (2006.01) | |
| *G06F 3/0488* | (2013.01) | |
| *G06F 3/0482* | (2013.01) | |

(Continued)

(52) U.S. Cl.
CPC .......... *G06F 3/04883* (2013.01); *G06F 3/017* (2013.01); *G06F 3/03543* (2013.01); *G06F 3/0482* (2013.01); *G06F 3/04817* (2013.01); *G06F 17/30112* (2013.01); *G06F 17/30126* (2013.01); *G06F 17/30905* (2013.01)

(58) Field of Classification Search
None
See application file for complete search history.

(56) References Cited

U.S. PATENT DOCUMENTS

| | | | |
|---|---|---|---|
| 4,686,332 | A | 8/1987 | Greanias et al. |
| 4,823,283 | A | 4/1989 | Diehm et al. |
| 4,843,538 | A | 6/1989 | Lane et al. |

(Continued)

FOREIGN PATENT DOCUMENTS

| | | |
|---|---|---|
| CN | 1129889 | 8/1996 |
| CN | 1326564 | 12/2001 |

(Continued)

OTHER PUBLICATIONS

"Corrected Notice of Allowance", U.S. Appl. No. 13/228,931, dated Oct. 31, 2016, 2 pages.

(Continued)

*Primary Examiner* — Peter Hoang
(74) *Attorney, Agent, or Firm* — Newport IP, LLC; Jacob P. Rohwer

(57) ABSTRACT

This document describes techniques for progressively indicating new content in an application-selectable user interface. These techniques permit a user to view indications of new content for applications progressively, rather than all at one time. By so doing, the techniques may avoid mentally or visually overloading or over-stimulating a user viewing the indications.

20 Claims, 14 Drawing Sheets

(51) Int. Cl.
*G06F 3/0481* (2013.01)
*G06F 3/0354* (2013.01)

(56) References Cited

U.S. PATENT DOCUMENTS

| | | |
|---|---|---|
| 5,045,997 A | 9/1991 | Watanabe |
| 5,046,001 A | 9/1991 | Barker et al. |
| 5,189,732 A | 2/1993 | Kondo |
| 5,231,578 A | 7/1993 | Levin et al. |
| 5,237,647 A | 8/1993 | Roberts et al. |
| 5,258,748 A | 11/1993 | Jones |
| 5,297,032 A | 3/1994 | Trojan et al. |
| 5,305,435 A | 4/1994 | Bronson |
| 5,321,750 A | 6/1994 | Nadan |
| 5,339,392 A | 8/1994 | Risberg et al. |
| 5,351,995 A | 10/1994 | Booker et al. |
| 5,406,307 A | 4/1995 | Hirayama et al. |
| 5,432,932 A | 7/1995 | Chen et al. |
| 5,463,725 A | 10/1995 | Henckel et al. |
| 5,485,197 A | 1/1996 | Hoarty |
| 5,487,143 A | 1/1996 | Southgate |
| 5,490,241 A | 2/1996 | Mallgren et al. |
| 5,491,783 A | 2/1996 | Douglas et al. |
| 5,495,566 A | 2/1996 | Kwatinetz |
| 5,497,776 A | 3/1996 | Yamazaki et al. |
| 5,506,951 A | 4/1996 | Ishikawa |
| 5,510,808 A | 4/1996 | Cina, Jr. et al. |
| 5,511,148 A | 4/1996 | Wellner |
| 5,515,495 A | 5/1996 | Ikemoto |
| 5,555,369 A | 9/1996 | Menendez et al. |
| 5,568,604 A | 10/1996 | Hansen |
| 5,574,836 A | 11/1996 | Broemmelsiek |
| 5,586,244 A | 12/1996 | Berry et al. |
| 5,596,697 A | 1/1997 | Foster et al. |
| 5,598,523 A | 1/1997 | Fujita |
| 5,603,053 A | 2/1997 | Gough et al. |
| 5,611,060 A | 3/1997 | Belfiore et al. |
| 5,623,613 A | 4/1997 | Rowe et al. |
| 5,640,176 A | 6/1997 | Mundt et al. |
| 5,650,827 A | 7/1997 | Tsumori et al. |
| 5,657,049 A | 8/1997 | Ludolph et al. |
| 5,659,693 A | 8/1997 | Hansen |
| 5,661,773 A | 8/1997 | Swerdloff et al. |
| 5,664,128 A | 9/1997 | Bauer |
| 5,675,329 A | 10/1997 | Barker |
| 5,680,562 A | 10/1997 | Conrad et al. |
| 5,687,331 A | 11/1997 | Volk et al. |
| 5,694,150 A | 12/1997 | Sigona et al. |
| 5,712,995 A | 1/1998 | Cohn |
| 5,731,813 A | 3/1998 | O'Rourke et al. |
| 5,740,389 A | 4/1998 | Li et al. |
| 5,742,285 A | 4/1998 | Ueda |
| 5,761,485 A | 6/1998 | Munyan |
| 5,771,042 A | 6/1998 | Santos-Gomez |
| 5,793,415 A | 8/1998 | Gregory et al. |
| 5,817,019 A | 10/1998 | Kawashima |
| 5,819,284 A | 10/1998 | Farber et al. |
| 5,821,930 A | 10/1998 | Hansen |
| 5,838,889 A | 11/1998 | Booker et al. |
| 5,844,547 A | 12/1998 | Minakuchi et al. |
| 5,847,706 A | 12/1998 | Kingsley |
| 5,859,636 A | 1/1999 | Pandit |
| 5,860,073 A | 1/1999 | Ferrel et al. |
| 5,867,799 A | 2/1999 | Lang et al. |
| 5,880,725 A | 3/1999 | Southgate |
| 5,889,517 A | 3/1999 | Ueda et al. |
| 5,898,434 A | 4/1999 | Small et al. |
| 5,905,492 A | 5/1999 | Straub et al. |
| 5,914,720 A | 6/1999 | Maples et al. |
| 5,920,315 A | 7/1999 | Santos-Gomez |
| 5,940,076 A | 8/1999 | Sommers et al. |
| 5,959,621 A | 9/1999 | Nawaz et al. |
| 5,963,204 A | 10/1999 | Ikeda et al. |
| 5,969,720 A | 10/1999 | Lisle et al. |
| 6,008,809 A | 12/1999 | Brooks |
| 6,008,816 A | 12/1999 | Eisler |
| 6,009,519 A | 12/1999 | Jones et al. |
| 6,011,542 A | 1/2000 | Durrani et al. |
| 6,016,145 A | 1/2000 | Horvitz et al. |
| 6,028,600 A | 2/2000 | Rosin et al. |
| 6,037,937 A | 3/2000 | Beaton et al. |
| 6,057,839 A | 5/2000 | Advani et al. |
| 6,061,061 A | 5/2000 | Conrad et al. |
| 6,064,383 A | 5/2000 | Skelly |
| 6,072,476 A | 6/2000 | Harada et al. |
| 6,097,392 A | 8/2000 | Leyerle |
| 6,104,418 A | 8/2000 | Tanaka et al. |
| 6,108,003 A | 8/2000 | Hall, Jr. et al. |
| 6,111,585 A | 8/2000 | Choi |
| 6,115,040 A | 9/2000 | Bladow et al. |
| 6,115,724 A | 9/2000 | Booker et al. |
| 6,163,317 A | 12/2000 | de Judicibus |
| 6,163,749 A | 12/2000 | McDonough et al. |
| 6,166,736 A | 12/2000 | Hugh |
| 6,167,439 A | 12/2000 | Levine et al. |
| 6,188,405 B1 | 2/2001 | Czerwinski et al. |
| 6,211,921 B1 | 4/2001 | Cherian et al. |
| 6,212,564 B1 | 4/2001 | Harter et al. |
| 6,216,141 B1 | 4/2001 | Straub et al. |
| 6,219,032 B1 | 4/2001 | Rosenberg et al. |
| 6,232,971 B1 | 5/2001 | Haynes |
| 6,239,798 B1 | 5/2001 | Ludolph et al. |
| 6,266,098 B1 | 7/2001 | Cove et al. |
| 6,278,448 B1 | 8/2001 | Brown et al. |
| 6,281,940 B1 | 8/2001 | Sciammarella |
| 6,292,179 B1 | 9/2001 | Lee |
| 6,310,610 B1 | 10/2001 | Beaton et al. |
| 6,311,058 B1 | 10/2001 | Wecker et al. |
| 6,313,854 B1 | 11/2001 | Gibson |
| 6,340,979 B1 | 1/2002 | Beaton et al. |
| 6,346,935 B1 | 2/2002 | Nakajima et al. |
| 6,369,837 B1 | 4/2002 | Schirmer |
| 6,385,630 B1 | 5/2002 | Ejerhed |
| 6,389,386 B1 | 5/2002 | Hetherington et al. |
| 6,396,963 B2 | 5/2002 | Shaffer |
| 6,411,307 B1 | 6/2002 | Rosin et al. |
| 6,414,698 B1 | 7/2002 | Lovell et al. |
| 6,424,338 B1 | 7/2002 | Andersone |
| 6,426,753 B1 | 7/2002 | Migdal |
| 6,433,789 B1 | 8/2002 | Rosman |
| 6,448,987 B1 | 9/2002 | Easty et al. |
| 6,449,638 B1 | 9/2002 | Wecker et al. |
| 6,456,334 B1 | 9/2002 | Duhault |
| 6,489,977 B2 | 12/2002 | Sone |
| 6,493,002 B1 | 12/2002 | Christensen |
| 6,505,243 B1 | 1/2003 | Lortz |
| 6,507,352 B1 | 1/2003 | Cohen et al. |
| 6,507,643 B1 | 1/2003 | Groner |
| 6,510,144 B1 | 1/2003 | Dommety et al. |
| 6,510,466 B1 | 1/2003 | Cox et al. |
| 6,510,553 B1 | 1/2003 | Hazra |
| 6,525,749 B1 | 2/2003 | Moran et al. |
| 6,538,635 B1 | 3/2003 | Ringot |
| 6,542,868 B1 | 4/2003 | Badt |
| 6,545,669 B1 | 4/2003 | Kinawi et al. |
| 6,570,582 B1 | 5/2003 | Sciammarella et al. |
| 6,570,597 B1 | 5/2003 | Seki et al. |
| 6,577,323 B1 | 6/2003 | Jamieson et al. |
| 6,577,350 B1 | 6/2003 | Proehl et al. |
| 6,591,244 B2 | 7/2003 | Jim et al. |
| 6,597,374 B1 | 7/2003 | Baker et al. |
| 6,601,233 B1 | 7/2003 | Underwood |
| 6,608,637 B1 | 8/2003 | Beaton et al. |
| 6,628,309 B1 | 9/2003 | Dodson et al. |
| 6,636,246 B1 | 10/2003 | Gallo et al. |
| 6,658,147 B2 | 12/2003 | Gorbatov et al. |
| 6,661,436 B2 | 12/2003 | Barksdale et al. |
| 6,662,023 B1 | 12/2003 | Helle |
| 6,675,387 B1 | 1/2004 | Boucher et al. |
| 6,690,387 B2 | 2/2004 | Zimmerman et al. |
| 6,697,825 B1 | 2/2004 | Underwood et al. |
| 6,707,449 B2 | 3/2004 | Hinckley et al. |
| 6,710,771 B1 | 3/2004 | Yamaguchi et al. |
| 6,721,958 B1 | 4/2004 | Dureau |

(56) References Cited

U.S. PATENT DOCUMENTS

| | | |
|---|---|---|
| 6,724,403 B1 | 4/2004 | Santoro et al. |
| 6,727,892 B1 | 4/2004 | Murphy |
| 6,738,084 B1 | 5/2004 | Kelley et al. |
| 6,750,872 B1 | 6/2004 | Hong et al. |
| 6,784,925 B1 | 8/2004 | Tomat et al. |
| 6,798,421 B2 | 9/2004 | Baldwin |
| 6,798,649 B1 | 9/2004 | Olodort |
| 6,801,203 B1 | 10/2004 | Hussain |
| 6,807,558 B1 | 10/2004 | Hassett et al. |
| 6,832,355 B1 | 12/2004 | Duperrouzel et al. |
| 6,839,763 B1 | 1/2005 | Kamvysselis et al. |
| 6,857,104 B1 | 2/2005 | Cahn |
| 6,859,909 B1 | 2/2005 | Lerner et al. |
| 6,865,297 B2 | 3/2005 | Loui |
| 6,873,329 B2 | 3/2005 | Cohen et al. |
| 6,876,312 B2 | 4/2005 | Yu |
| 6,885,974 B2 | 4/2005 | Holle |
| 6,904,597 B2 | 6/2005 | Jin |
| 6,920,445 B2 | 7/2005 | Bae |
| 6,920,619 B1 | 7/2005 | Milekic |
| 6,938,101 B2 | 8/2005 | Hayes et al. |
| 6,961,731 B2 | 11/2005 | Holbrook |
| 6,971,067 B1 | 11/2005 | Karson et al. |
| 6,972,776 B2 | 12/2005 | Davis et al. |
| 6,975,306 B2 | 12/2005 | Hinckley |
| 6,976,210 B1 | 12/2005 | Silva et al. |
| 6,978,303 B1 | 12/2005 | McCreesh et al. |
| 6,983,310 B2 | 1/2006 | Rouse |
| 6,987,991 B2 | 1/2006 | Nelson |
| 7,013,041 B2 | 3/2006 | Miyamoto |
| 7,017,119 B1 | 3/2006 | Johnston et al. |
| 7,019,757 B2 | 3/2006 | Brown et al. |
| 7,028,264 B2 | 4/2006 | Santoro et al. |
| 7,032,187 B2 | 4/2006 | Keely, Jr. et al. |
| 7,036,090 B1 | 4/2006 | Nguyen |
| 7,036,091 B1 | 4/2006 | Nguyen |
| 7,042,460 B2 | 5/2006 | Hussain et al. |
| 7,051,291 B2 | 5/2006 | Sciammarella et al. |
| 7,058,955 B2 | 6/2006 | Porkka |
| 7,065,385 B2 | 6/2006 | Jarrad et al. |
| 7,065,386 B1 | 6/2006 | Smethers |
| 7,075,535 B2 | 7/2006 | Aguera y Arcas |
| 7,089,507 B2 | 8/2006 | Lection et al. |
| 7,091,998 B2 | 8/2006 | Miller-Smith |
| 7,093,201 B2 | 8/2006 | Duarte |
| 7,106,349 B2 | 9/2006 | Baar et al. |
| 7,111,044 B2 | 9/2006 | Lee |
| 7,133,707 B1 | 11/2006 | Rak |
| 7,133,859 B1 | 11/2006 | Wong |
| 7,139,800 B2 | 11/2006 | Bellotti et al. |
| 7,146,573 B2 | 12/2006 | Brown et al. |
| 7,155,729 B1 | 12/2006 | Andrew et al. |
| 7,158,123 B2 | 1/2007 | Myers et al. |
| 7,158,135 B2 | 1/2007 | Santodomingo et al. |
| 7,178,111 B2 | 2/2007 | Glein et al. |
| 7,180,527 B2 | 2/2007 | Sakai et al. |
| 7,181,699 B2 | 2/2007 | Morrow et al. |
| 7,194,506 B1 | 3/2007 | White et al. |
| 7,197,702 B2 | 3/2007 | Niyogi et al. |
| 7,210,099 B2 | 4/2007 | Rohrabaugh et al. |
| 7,216,588 B2 | 5/2007 | Suess |
| 7,249,326 B2 | 7/2007 | Stoakley et al. |
| 7,250,955 B1 | 7/2007 | Beeman et al. |
| 7,251,782 B1 | 7/2007 | Albers |
| 7,257,200 B2 | 8/2007 | Valeriano |
| 7,262,775 B2 | 8/2007 | Calkins et al. |
| 7,263,668 B1 | 8/2007 | Lentz |
| 7,277,924 B1 | 10/2007 | Wichmann et al. |
| 7,280,097 B2 | 10/2007 | Chen |
| 7,283,620 B2 | 10/2007 | Adamczyk |
| 7,289,806 B2 | 10/2007 | Morris et al. |
| 7,293,244 B2 | 11/2007 | Randall |
| 7,296,184 B2 | 11/2007 | Derks et al. |
| 7,296,242 B2 | 11/2007 | Agata et al. |
| 7,304,638 B2 | 12/2007 | Murphy |
| 7,310,100 B2 | 12/2007 | Hussain |
| 7,333,092 B2 | 2/2008 | Zadesky et al. |
| 7,333,120 B2 | 2/2008 | Venolia |
| 7,336,263 B2 | 2/2008 | Valikangas |
| 7,343,567 B2 | 3/2008 | Mann et al. |
| 7,348,965 B2 | 3/2008 | Itoh |
| 7,369,647 B2 | 5/2008 | Gao et al. |
| 7,376,907 B2 | 5/2008 | Santoro et al. |
| 7,386,807 B2 | 6/2008 | Cummins et al. |
| 7,388,578 B2 | 6/2008 | Tao |
| 7,403,191 B2 | 7/2008 | Sinclair |
| 7,404,147 B2 | 7/2008 | Bell et al. |
| 7,408,538 B2 | 8/2008 | Hinckley et al. |
| 7,409,646 B2 | 8/2008 | Vedbrat et al. |
| 7,412,663 B2 | 8/2008 | Lindsay et al. |
| 7,424,686 B2 | 9/2008 | Beam et al. |
| 7,433,920 B2 | 10/2008 | Blagsvedt et al. |
| 7,437,678 B2 | 10/2008 | Awada et al. |
| 7,447,520 B2 | 11/2008 | Scott |
| 7,454,717 B2 | 11/2008 | Hinckley et al. |
| 7,461,151 B2 | 12/2008 | Colson et al. |
| 7,469,380 B2 | 12/2008 | Wessling et al. |
| 7,469,381 B2 | 12/2008 | Ording |
| 7,478,326 B2 | 1/2009 | Holecek et al. |
| 7,479,949 B2 | 1/2009 | Jobs |
| 7,480,870 B2 | 1/2009 | Anzures |
| 7,483,418 B2 | 1/2009 | Maurer |
| 7,484,182 B1 | 1/2009 | Smith |
| 7,487,467 B1 | 2/2009 | Kawahara et al. |
| 7,496,830 B2 | 2/2009 | Rubin |
| 7,500,175 B2 | 3/2009 | Colle et al. |
| 7,506,269 B2 | 3/2009 | Lang |
| 7,512,966 B2 | 3/2009 | Lyons, Jr. et al. |
| 7,532,196 B2 | 5/2009 | Hinckley |
| 7,549,131 B2 | 6/2009 | Lengeling et al. |
| 7,577,914 B1 | 8/2009 | Stuple et al. |
| 7,577,918 B2 | 8/2009 | Lindsay |
| 7,581,034 B2 | 8/2009 | Polivy et al. |
| 7,593,995 B1 | 9/2009 | He et al. |
| 7,595,810 B2 | 9/2009 | Louch |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,096 B2 | 10/2009 | Oreizy et al. |
| 7,607,106 B2 | 10/2009 | Ernst et al. |
| 7,610,563 B2 | 10/2009 | Nelson et al. |
| 7,614,018 B1 | 11/2009 | Ohazama et al. |
| 7,619,615 B1 | 11/2009 | Donoghue |
| 7,636,071 B2 | 12/2009 | O'Gorman |
| 7,640,518 B2 | 12/2009 | Forlines et al. |
| 7,644,361 B2 | 1/2010 | Wu et al. |
| 7,653,883 B2 | 1/2010 | Hotelling et al. |
| 7,656,393 B2 | 2/2010 | King et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,669,140 B2 | 2/2010 | Matthews et al. |
| 7,671,756 B2 | 3/2010 | Herz et al. |
| 7,676,767 B2 | 3/2010 | Hofmeister et al. |
| 7,676,907 B2 | 3/2010 | Santoro et al. |
| 7,681,138 B2 | 3/2010 | Grasser et al. |
| 7,681,143 B2 | 3/2010 | Lindsay et al. |
| 7,689,916 B1 | 3/2010 | Goel et al. |
| 7,694,221 B2 | 4/2010 | Fortes |
| 7,702,683 B1 | 4/2010 | Kirshenbaum |
| 7,730,425 B2 | 6/2010 | de los Reyes et al. |
| 7,746,388 B2 | 6/2010 | Jeon |
| 7,755,674 B2 | 7/2010 | Kaminaga |
| 7,760,187 B2 | 7/2010 | Kennedy |
| 7,765,490 B2 | 7/2010 | Lai et al. |
| 7,774,366 B2 | 8/2010 | Fisher et al. |
| 7,792,925 B1 | 9/2010 | Werner et al. |
| 7,821,780 B2 | 10/2010 | Choy |
| 7,834,861 B2 | 11/2010 | Lee |
| 7,840,979 B2 | 11/2010 | Poling et al. |
| 7,844,915 B2 | 11/2010 | Platzer et al. |
| D631,043 S | 1/2011 | Kell |
| 7,877,707 B2 | 1/2011 | Westerman et al. |

(56) References Cited

U.S. PATENT DOCUMENTS

| | | |
|---|---|---|
| 7,880,728 B2 | 2/2011 | De Los Reyes et al. |
| 7,889,180 B2 | 2/2011 | Byun et al. |
| 7,890,882 B1 | 2/2011 | Nelson |
| 7,895,309 B2 | 2/2011 | Belali et al. |
| 7,898,529 B2 | 3/2011 | Fitzmaurice et al. |
| 7,903,115 B2 | 3/2011 | Platzer et al. |
| 7,904,832 B2 | 3/2011 | Ubillos |
| 7,924,271 B2 | 4/2011 | Christie et al. |
| 7,933,632 B2 | 4/2011 | Flynt et al. |
| 7,956,847 B2 | 6/2011 | Christie |
| 7,962,281 B2 | 6/2011 | Rasmussen et al. |
| 7,983,718 B1 | 7/2011 | Roka |
| 7,987,431 B2 | 7/2011 | Santoro et al. |
| 7,996,045 B1 | 8/2011 | Bauer et al. |
| 8,006,276 B2 | 8/2011 | Nakagawa et al. |
| 8,028,239 B1 | 9/2011 | Al-Hilali et al. |
| 8,050,030 B2 | 11/2011 | Wu et al. |
| 8,065,628 B2 | 11/2011 | Oshiro et al. |
| 8,065,629 B1 | 11/2011 | Ragan |
| 8,086,275 B2 | 12/2011 | Wykes |
| 8,102,858 B1 | 1/2012 | Rahim et al. |
| 8,108,781 B2 | 1/2012 | Laansoo et al. |
| 8,126,865 B1 | 2/2012 | Bharat et al. |
| 8,131,808 B2 | 3/2012 | Aoki et al. |
| 8,134,727 B1 | 3/2012 | Shmunis et al. |
| 8,150,924 B2 | 4/2012 | Buchheit et al. |
| 8,171,431 B2 | 5/2012 | Grossman et al. |
| 8,175,653 B2 | 5/2012 | Smuga |
| 8,176,436 B2 | 5/2012 | Arend et al. |
| 8,176,438 B2 | 5/2012 | Zaman et al. |
| 8,190,707 B2 | 5/2012 | Trivedi et al. |
| 8,209,623 B2 | 6/2012 | Barletta et al. |
| 8,212,788 B2 | 7/2012 | Lam |
| 8,225,193 B1 | 7/2012 | Kleinschnitz et al. |
| 8,230,355 B1 | 7/2012 | Bauermeister et al. |
| 8,238,876 B2 | 8/2012 | Teng |
| 8,239,785 B2 | 8/2012 | Hinckley |
| 8,245,152 B2 | 8/2012 | Brunner et al. |
| 8,245,156 B2 | 8/2012 | Mouilleseaux et al. |
| 8,250,494 B2 | 8/2012 | Butcher |
| 8,255,473 B2 | 8/2012 | Eren et al. |
| 8,255,812 B1 | 8/2012 | Parparita et al. |
| 8,255,818 B2 | 8/2012 | Bales et al. |
| 8,259,437 B2 | 9/2012 | Vesely |
| 8,261,213 B2 | 9/2012 | Hinckley |
| 8,266,550 B1 | 9/2012 | Cleron et al. |
| 8,269,736 B2 | 9/2012 | Wilairat |
| 8,272,104 B2 | 9/2012 | Chen et al. |
| 8,279,241 B2 | 10/2012 | Fong |
| 8,280,901 B2 | 10/2012 | McDonald |
| 8,289,688 B2 | 10/2012 | Behar et al. |
| 8,290,926 B2 | 10/2012 | Ozzie et al. |
| 8,294,669 B2 | 10/2012 | Partridge et al. |
| 8,300,392 B2 | 10/2012 | Weng |
| 8,307,279 B1 | 11/2012 | Fioravanti et al. |
| 8,312,383 B2 | 11/2012 | Gilfix |
| 8,327,295 B2 | 12/2012 | Ikeda et al. |
| 8,334,871 B2 | 12/2012 | Hamilton et al. |
| 8,355,698 B2 | 1/2013 | Teng et al. |
| 8,384,726 B1 | 2/2013 | Grabowski et al. |
| 8,385,952 B2 | 2/2013 | Friedman et al. |
| 8,411,046 B2 | 4/2013 | Kruzeniski et al. |
| 8,429,565 B2 | 4/2013 | Agarawala et al. |
| 8,434,019 B2 | 4/2013 | Nelson |
| 8,448,083 B1 | 5/2013 | Migos et al. |
| 8,473,870 B2 | 6/2013 | Hinckley et al. |
| 8,473,871 B1 | 6/2013 | Sandler et al. |
| 8,493,510 B2 | 7/2013 | Bryan et al. |
| 8,519,860 B2 | 8/2013 | Johnson et al. |
| 8,525,808 B1 | 9/2013 | Buening |
| 8,527,892 B2 | 9/2013 | Sirpal et al. |
| 8,539,384 B2 | 9/2013 | Hinckley et al. |
| 8,548,431 B2 | 10/2013 | Teng et al. |
| 8,549,430 B2 | 10/2013 | Russell et al. |
| 8,549,432 B2 | 10/2013 | Warner |
| 8,560,959 B2 | 10/2013 | Zaman et al. |
| 8,566,100 B2 | 10/2013 | Verna et al. |
| 8,584,150 B2 | 11/2013 | Wallace |
| 8,589,815 B2 | 11/2013 | Fong et al. |
| 8,595,642 B1 | 11/2013 | Lagassey |
| 8,612,874 B2 | 12/2013 | Zaman et al. |
| 8,615,707 B2 | 12/2013 | Fortuna et al. |
| 8,615,713 B2 | 12/2013 | Sun et al. |
| 8,624,933 B2 | 1/2014 | Marr et al. |
| 8,627,227 B2 | 1/2014 | Matthews et al. |
| 8,627,228 B2 | 1/2014 | Yosef et al. |
| 8,639,819 B2 | 1/2014 | Pohja et al. |
| 8,665,272 B2 | 3/2014 | Fitzmaurice et al. |
| 8,669,950 B2 | 3/2014 | Forstall et al. |
| 8,687,023 B2 | 4/2014 | Markiewicz et al. |
| 8,689,123 B2 | 4/2014 | Zaman et al. |
| 8,698,845 B2 | 4/2014 | Lemay |
| 8,706,515 B2 | 4/2014 | Cobbs et al. |
| 8,713,463 B2 | 4/2014 | Kim et al. |
| 8,726,190 B2 | 5/2014 | Clark et al. |
| 8,769,427 B2 | 7/2014 | Raman et al. |
| 8,769,431 B1 | 7/2014 | Prasad |
| 8,826,181 B2 | 9/2014 | Mouilleseaux et al. |
| 8,830,270 B2 | 9/2014 | Zaman et al. |
| 8,836,648 B2 | 9/2014 | Wilairat |
| 8,893,033 B2 | 11/2014 | Donahue et al. |
| 8,910,081 B2 | 12/2014 | Fennel |
| 8,922,575 B2 | 12/2014 | Garside et al. |
| 8,924,885 B2 | 12/2014 | LeVee et al. |
| 8,933,952 B2 | 1/2015 | Zaman et al. |
| 8,935,631 B2 | 1/2015 | Leonard et al. |
| 8,990,733 B2 | 3/2015 | Deutsch et al. |
| 8,994,697 B2 | 3/2015 | Lin et al. |
| 9,015,606 B2 | 4/2015 | Zaman et al. |
| 9,052,820 B2 | 6/2015 | Jarrett et al. |
| 9,092,132 B2 | 7/2015 | Migos et al. |
| 9,098,186 B1 | 8/2015 | Worley et al. |
| 9,104,307 B2 | 8/2015 | Jarrett et al. |
| 9,104,440 B2 | 8/2015 | Jarrett et al. |
| 9,141,262 B2 | 9/2015 | Nan et al. |
| 9,146,670 B2 | 9/2015 | Zaman et al. |
| 9,158,445 B2 | 10/2015 | Wong et al. |
| 9,213,468 B2 | 12/2015 | Zaman et al. |
| 9,229,918 B2 | 1/2016 | Zaman et al. |
| 9,244,802 B2 | 1/2016 | Yalovsky et al. |
| 9,329,774 B2 | 5/2016 | Sareen et al. |
| 9,383,917 B2 | 7/2016 | Mouton et al. |
| 9,418,464 B2 | 8/2016 | Fong et al. |
| 9,423,951 B2 | 8/2016 | Deutsch et al. |
| 9,535,597 B2 | 1/2017 | Wong et al. |
| 9,557,909 B2 | 1/2017 | Elliott et al. |
| 9,665,384 B2 | 5/2017 | Zielinski et al. |
| 9,696,888 B2 | 7/2017 | Deutsch et al. |
| 9,766,790 B2 | 9/2017 | Zaman et al. |
| 9,864,494 B2 | 1/2018 | Zaman et al. |
| 9,870,132 B2 | 1/2018 | Zaman et al. |
| 2001/0012000 A1 | 8/2001 | Eberhard |
| 2001/0022621 A1 | 9/2001 | Squibbs |
| 2001/0047263 A1 | 11/2001 | Smith et al. |
| 2002/0000963 A1 | 1/2002 | Yoshida et al. |
| 2002/0018051 A1 | 2/2002 | Singh |
| 2002/0026524 A1 | 2/2002 | Dharap |
| 2002/0035607 A1 | 3/2002 | Checkoway |
| 2002/0054117 A1 | 5/2002 | van Dantzich et al. |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0083025 A1 | 6/2002 | Robarts et al. |
| 2002/0091755 A1 | 7/2002 | Narin |
| 2002/0097229 A1 | 7/2002 | Rose et al. |
| 2002/0097264 A1 | 7/2002 | Dutta et al. |
| 2002/0101457 A1 | 8/2002 | Lang |
| 2002/0105531 A1 | 8/2002 | Niemi |
| 2002/0105553 A1 | 8/2002 | Segre |
| 2002/0115476 A1 | 8/2002 | Padawer et al. |
| 2002/0116421 A1 | 8/2002 | Fox et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |

(56) References Cited

U.S. PATENT DOCUMENTS

| | | |
|---|---|---|
| 2002/0142762 A1 | 10/2002 | Chmaytelli et al. |
| 2002/0145631 A1 | 10/2002 | Arbab et al. |
| 2002/0149622 A1 | 10/2002 | Uesaki et al. |
| 2002/0152305 A1 | 10/2002 | Jackson et al. |
| 2002/0154176 A1 | 10/2002 | Barksdale et al. |
| 2002/0158838 A1 | 10/2002 | Smith et al. |
| 2002/0159632 A1 | 10/2002 | Chui et al. |
| 2002/0161634 A1 | 10/2002 | Kaars |
| 2002/0165923 A1 | 11/2002 | Prince |
| 2002/0186251 A1 | 12/2002 | Himmel et al. |
| 2002/0191028 A1 | 12/2002 | Senechalle et al. |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihihata |
| 2003/0020671 A1 | 1/2003 | Santoro et al. |
| 2003/0040300 A1 | 2/2003 | Bodic |
| 2003/0046396 A1 | 3/2003 | Richter et al. |
| 2003/0052900 A1 | 3/2003 | Card et al. |
| 2003/0073414 A1 | 4/2003 | Capps |
| 2003/0096604 A1 | 5/2003 | Vollandt |
| 2003/0098858 A1 | 5/2003 | Perski et al. |
| 2003/0105827 A1 | 6/2003 | Tan et al. |
| 2003/0107604 A1 | 6/2003 | Ording |
| 2003/0135582 A1 | 7/2003 | Allen et al. |
| 2003/0179541 A1 | 9/2003 | Sullivan |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2003/0231219 A1 | 12/2003 | Leung |
| 2003/0231327 A1 | 12/2003 | Ashey et al. |
| 2003/0234799 A1 | 12/2003 | Lee |
| 2004/0015553 A1 | 1/2004 | Griffin et al. |
| 2004/0066414 A1 | 4/2004 | Czerwinski et al. |
| 2004/0066418 A1 | 4/2004 | Tosey |
| 2004/0068543 A1 | 4/2004 | Seifert |
| 2004/0078299 A1 | 4/2004 | Down-Logan |
| 2004/0095395 A1 | 5/2004 | Kurtenbach |
| 2004/0111673 A1 | 6/2004 | Bowman et al. |
| 2004/0128359 A1 | 7/2004 | Horvitz et al. |
| 2004/0155908 A1 | 8/2004 | Wagner |
| 2004/0165010 A1 | 8/2004 | Robertson et al. |
| 2004/0174396 A1 | 9/2004 | Jobs et al. |
| 2004/0185883 A1 | 9/2004 | Rukman |
| 2004/0189707 A1 | 9/2004 | Moore et al. |
| 2004/0212586 A1 | 10/2004 | Denny |
| 2004/0212605 A1 | 10/2004 | Fitzmaurice et al. |
| 2004/0212617 A1 | 10/2004 | Fitzmaurice et al. |
| 2004/0217954 A1 | 11/2004 | O'Gorman et al. |
| 2004/0217980 A1 | 11/2004 | Radburn et al. |
| 2004/0236774 A1 | 11/2004 | Baird et al. |
| 2004/0237048 A1 | 11/2004 | Tojo et al. |
| 2004/0250217 A1 | 12/2004 | Tojo et al. |
| 2004/0255254 A1 | 12/2004 | Weingart et al. |
| 2004/0266491 A1 | 12/2004 | Howard et al. |
| 2005/0005241 A1 | 1/2005 | Hunleth et al. |
| 2005/0012723 A1 | 1/2005 | Pallakoff |
| 2005/0028208 A1 | 2/2005 | Ellis |
| 2005/0044058 A1 | 2/2005 | Matthews et al. |
| 2005/0050462 A1 | 3/2005 | Whittle et al. |
| 2005/0054384 A1 | 3/2005 | Pasquale et al. |
| 2005/0058353 A1 | 3/2005 | Matsubara |
| 2005/0060647 A1 | 3/2005 | Doan et al. |
| 2005/0060658 A1 | 3/2005 | Tsukiori |
| 2005/0060663 A1 | 3/2005 | Arkeketa et al. |
| 2005/0060665 A1 | 3/2005 | Rekimoto |
| 2005/0079896 A1 | 4/2005 | Kokko et al. |
| 2005/0081155 A1 | 4/2005 | Martin et al. |
| 2005/0085215 A1 | 4/2005 | Kokko |
| 2005/0085272 A1 | 4/2005 | Anderson et al. |
| 2005/0091612 A1 | 4/2005 | Stabb et al. |
| 2005/0093868 A1 | 5/2005 | Hinckley |
| 2005/0101864 A1 | 5/2005 | Zheng et al. |
| 2005/0108655 A1 | 5/2005 | Andrea et al. |
| 2005/0114778 A1 | 5/2005 | Branson et al. |
| 2005/0114788 A1 | 5/2005 | Fabritius |
| 2005/0120306 A1 | 6/2005 | Klassen et al. |
| 2005/0125736 A1 | 6/2005 | Ferri et al. |
| 2005/0125739 A1 | 6/2005 | Thompson et al. |
| 2005/0129314 A1 | 6/2005 | Chen |
| 2005/0136953 A1 | 6/2005 | Jo |
| 2005/0143138 A1 | 6/2005 | Lee et al. |
| 2005/0149879 A1 | 7/2005 | Jobs et al. |
| 2005/0156947 A1 | 7/2005 | Sakai et al. |
| 2005/0182798 A1 | 8/2005 | Todd et al. |
| 2005/0183021 A1 | 8/2005 | Allen et al. |
| 2005/0184973 A1 | 8/2005 | Lum et al. |
| 2005/0184999 A1 | 8/2005 | Daioku |
| 2005/0188406 A1 | 8/2005 | Gielow et al. |
| 2005/0198159 A1 | 9/2005 | Kirsch |
| 2005/0198584 A1 | 9/2005 | Matthews et al. |
| 2005/0198586 A1 | 9/2005 | Sekiguchi et al. |
| 2005/0198592 A1 | 9/2005 | Keely, Jr. et al. |
| 2005/0200762 A1 | 9/2005 | Barletta et al. |
| 2005/0207734 A1 | 9/2005 | Howell et al. |
| 2005/0216300 A1 | 9/2005 | Appelman et al. |
| 2005/0223057 A1 | 10/2005 | Buchheit et al. |
| 2005/0223069 A1 | 10/2005 | Cooperman et al. |
| 2005/0232166 A1 | 10/2005 | Nierhaus |
| 2005/0250547 A1 | 11/2005 | Salman et al. |
| 2005/0268237 A1 | 12/2005 | Crane et al. |
| 2005/0273614 A1 | 12/2005 | Ahuja |
| 2005/0280719 A1 | 12/2005 | Kim |
| 2006/0001650 A1 | 1/2006 | Robbins et al. |
| 2006/0004685 A1 | 1/2006 | Pyhalammi et al. |
| 2006/0005114 A1 | 1/2006 | Williamson et al. |
| 2006/0005207 A1 | 1/2006 | Louch et al. |
| 2006/0010371 A1 | 1/2006 | Shur et al. |
| 2006/0010394 A1 | 1/2006 | Chaudhri et al. |
| 2006/0012580 A1 | 1/2006 | Perski et al. |
| 2006/0015562 A1 | 1/2006 | Kilian-Kehr et al. |
| 2006/0015736 A1 | 1/2006 | Callas et al. |
| 2006/0015812 A1 | 1/2006 | Cunningham |
| 2006/0015820 A1 | 1/2006 | Wood |
| 2006/0020903 A1 | 1/2006 | Wang et al. |
| 2006/0022955 A1 | 2/2006 | Kennedy |
| 2006/0026013 A1 | 2/2006 | Kraft |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0031786 A1 | 2/2006 | Hillis et al. |
| 2006/0036425 A1 | 2/2006 | Le Cocq et al. |
| 2006/0048073 A1 | 3/2006 | Jarrett et al. |
| 2006/0048101 A1 | 3/2006 | Krassovsky et al. |
| 2006/0055670 A1 | 3/2006 | Castrucci |
| 2006/0059430 A1 | 3/2006 | Bells |
| 2006/0061597 A1 | 3/2006 | Hui |
| 2006/0070005 A1 | 3/2006 | Gilbert et al. |
| 2006/0074735 A1 | 4/2006 | Shukla et al. |
| 2006/0074771 A1 | 4/2006 | Kim |
| 2006/0075360 A1 | 4/2006 | Bixler |
| 2006/0092177 A1 | 5/2006 | Blasko |
| 2006/0093219 A1 | 5/2006 | Gounares et al. |
| 2006/0101354 A1 | 5/2006 | Hashimoto et al. |
| 2006/0103623 A1 | 5/2006 | Davis |
| 2006/0107231 A1 | 5/2006 | Matthews et al. |
| 2006/0112335 A1 | 5/2006 | Hofmeister et al. |
| 2006/0112354 A1 | 5/2006 | Park et al. |
| 2006/0114239 A1 | 6/2006 | Nakajima |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0155728 A1 | 7/2006 | Bosarge |
| 2006/0156228 A1 | 7/2006 | Gallo et al. |
| 2006/0156247 A1 | 7/2006 | McCormack et al. |
| 2006/0161863 A1 | 7/2006 | Gallo |
| 2006/0161870 A1 | 7/2006 | Hotelling et al. |
| 2006/0172724 A1 | 8/2006 | Linkert et al. |
| 2006/0173911 A1 | 8/2006 | Levin et al. |
| 2006/0176403 A1 | 8/2006 | Gritton et al. |
| 2006/0184901 A1 | 8/2006 | Dietz |
| 2006/0184966 A1 | 8/2006 | Hunleth et al. |
| 2006/0190833 A1 | 8/2006 | SanGiovanni et al. |

(56) References Cited

U.S. PATENT DOCUMENTS

| | | |
|---|---|---|
| 2006/0197750 A1 | 9/2006 | Kerr et al. |
| 2006/0199598 A1 | 9/2006 | Lee et al. |
| 2006/0209016 A1 | 9/2006 | Fox et al. |
| 2006/0212806 A1 | 9/2006 | Griffin et al. |
| 2006/0218234 A1 | 9/2006 | Deng et al. |
| 2006/0218500 A1 | 9/2006 | Sauve et al. |
| 2006/0218501 A1 | 9/2006 | Wilson et al. |
| 2006/0224993 A1 | 10/2006 | Wong et al. |
| 2006/0227153 A1 | 10/2006 | Anwar et al. |
| 2006/0232551 A1 | 10/2006 | Matta |
| 2006/0236264 A1 | 10/2006 | Cain et al. |
| 2006/0238517 A1 | 10/2006 | King et al. |
| 2006/0238520 A1 | 10/2006 | Westerman et al. |
| 2006/0246955 A1 | 11/2006 | Nirhamo |
| 2006/0248471 A1 | 11/2006 | Lindsay et al. |
| 2006/0253685 A1 | 11/2006 | Wong et al. |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0262188 A1 | 11/2006 | Elyada et al. |
| 2006/0268013 A1 | 11/2006 | Miles |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0284852 A1 | 12/2006 | Hofmeister et al. |
| 2006/0288280 A1 | 12/2006 | Makela |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LeVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0016609 A1 | 1/2007 | Kim et al. |
| 2007/0024646 A1 | 2/2007 | Saarinen |
| 2007/0028267 A1 | 2/2007 | Ostojic et al. |
| 2007/0035513 A1 | 2/2007 | Sherrard et al. |
| 2007/0038567 A1 | 2/2007 | Allaire et al. |
| 2007/0044039 A1 | 2/2007 | Amadio et al. |
| 2007/0050724 A1 | 3/2007 | Lee et al. |
| 2007/0054679 A1 | 3/2007 | Cho et al. |
| 2007/0055770 A1 | 3/2007 | Karmakar et al. |
| 2007/0061306 A1 | 3/2007 | Pell et al. |
| 2007/0061488 A1 | 3/2007 | Alagappan et al. |
| 2007/0061511 A1 | 3/2007 | Faber |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0067737 A1 | 3/2007 | Zielinski et al. |
| 2007/0067738 A1 | 3/2007 | Flynt et al. |
| 2007/0067798 A1 | 3/2007 | Wroblewski |
| 2007/0073718 A1 | 3/2007 | Ramer |
| 2007/0075976 A1 | 4/2007 | Kun et al. |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083501 A1 | 4/2007 | Pedersen et al. |
| 2007/0083746 A1 | 4/2007 | Fallon et al. |
| 2007/0083821 A1 | 4/2007 | Garbow et al. |
| 2007/0094045 A1 | 4/2007 | Cobbs et al. |
| 2007/0094597 A1 | 4/2007 | Rostom |
| 2007/0097096 A1 | 5/2007 | Rosenberg |
| 2007/0103452 A1 | 5/2007 | Wakai et al. |
| 2007/0106635 A1 | 5/2007 | Frieden et al. |
| 2007/0106939 A1 | 5/2007 | Qassoudi |
| 2007/0120762 A1 | 5/2007 | O'Gorman |
| 2007/0120835 A1 | 5/2007 | Sato |
| 2007/0127638 A1 | 6/2007 | Doulton |
| 2007/0136677 A1 | 6/2007 | Agarwal |
| 2007/0140566 A1 | 6/2007 | Lin et al. |
| 2007/0143705 A1 | 6/2007 | Peters |
| 2007/0150826 A1 | 6/2007 | Anzures et al. |
| 2007/0150842 A1 | 6/2007 | Chaudhri et al. |
| 2007/0152961 A1 | 7/2007 | Dunton et al. |
| 2007/0157089 A1 | 7/2007 | Van Os et al. |
| 2007/0157099 A1 | 7/2007 | Haug |
| 2007/0157105 A1 | 7/2007 | Owens et al. |
| 2007/0168890 A1 | 7/2007 | Zhao et al. |
| 2007/0171192 A1 | 7/2007 | Seo et al. |
| 2007/0171238 A1 | 7/2007 | Ubillos et al. |
| 2007/0180381 A1 | 8/2007 | Rice |
| 2007/0180401 A1 | 8/2007 | Singh et al. |
| 2007/0180448 A1 | 8/2007 | Low et al. |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192726 A1 | 8/2007 | Kim et al. |
| 2007/0192730 A1 | 8/2007 | Simila et al. |
| 2007/0192733 A1 | 8/2007 | Horiuchi |
| 2007/0192739 A1 | 8/2007 | Hunleth et al. |
| 2007/0197196 A1 | 8/2007 | Shenfield et al. |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214422 A1 | 9/2007 | Agarwal et al. |
| 2007/0214429 A1 | 9/2007 | Lyudovyk et al. |
| 2007/0214454 A1 | 9/2007 | Edwards et al. |
| 2007/0216651 A1 | 9/2007 | Patel |
| 2007/0216661 A1 | 9/2007 | Chen et al. |
| 2007/0220444 A1 | 9/2007 | Sunday et al. |
| 2007/0222769 A1 | 9/2007 | Otsuka et al. |
| 2007/0225022 A1 | 9/2007 | Satake |
| 2007/0226647 A1 | 9/2007 | Louch |
| 2007/0233654 A1 | 10/2007 | Karlson |
| 2007/0236468 A1 | 10/2007 | Tuli |
| 2007/0238487 A1 | 10/2007 | Kuhl et al. |
| 2007/0238488 A1 | 10/2007 | Scott |
| 2007/0242056 A1 | 10/2007 | Engelhardt et al. |
| 2007/0247435 A1 | 10/2007 | Benko et al. |
| 2007/0250583 A1 | 10/2007 | Hardy |
| 2007/0250787 A1 | 10/2007 | Kawahara et al. |
| 2007/0253758 A1 | 11/2007 | Suess |
| 2007/0255831 A1 | 11/2007 | Hayashi et al. |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |
| 2007/0263843 A1 | 11/2007 | Foxenland |
| 2007/0266342 A1 | 11/2007 | Chang et al. |
| 2007/0273663 A1 | 11/2007 | Park et al. |
| 2007/0273668 A1 | 11/2007 | Park et al. |
| 2007/0280457 A1 | 12/2007 | Aberethy |
| 2007/0281747 A1 | 12/2007 | Pletikosa |
| 2007/0288860 A1 | 12/2007 | Ording et al. |
| 2007/0291007 A1 | 12/2007 | Forlines et al. |
| 2008/0001924 A1 | 1/2008 | de los Reyes et al. |
| 2008/0005668 A1 | 1/2008 | Mavinkurve |
| 2008/0005703 A1 | 1/2008 | Radivojevic et al. |
| 2008/0028294 A1 | 1/2008 | Sell et al. |
| 2008/0032681 A1 | 2/2008 | West |
| 2008/0034318 A1 | 2/2008 | Louch et al. |
| 2008/0036743 A1 | 2/2008 | Westerman et al. |
| 2008/0040692 A1 | 2/2008 | Sunday et al. |
| 2008/0042978 A1 | 2/2008 | Perez-Noguera |
| 2008/0048986 A1 | 2/2008 | Khoo |
| 2008/0052370 A1 | 2/2008 | Snyder |
| 2008/0052637 A1 | 2/2008 | Ben-Yoseph et al. |
| 2008/0052945 A1 | 3/2008 | Matas et al. |
| 2008/0057910 A1 | 3/2008 | Thoresson et al. |
| 2008/0057926 A1 | 3/2008 | Forstall et al. |
| 2008/0059896 A1 | 3/2008 | Anderson et al. |
| 2008/0062141 A1 | 3/2008 | Chandhri |
| 2008/0065607 A1 | 3/2008 | Weber |
| 2008/0065720 A1 | 3/2008 | Brodersen et al. |
| 2008/0066010 A1 | 3/2008 | Brodersen et al. |
| 2008/0072173 A1 | 3/2008 | Brunner et al. |
| 2008/0076472 A1 | 3/2008 | Hyatt |
| 2008/0082903 A1 | 4/2008 | McCurdy et al. |
| 2008/0082911 A1 | 4/2008 | Sorotokin et al. |
| 2008/0082934 A1 | 4/2008 | Kocienda et al. |

(56) References Cited

U.S. PATENT DOCUMENTS

| | | |
|---|---|---|
| 2008/0084400 A1 | 4/2008 | Rosenberg |
| 2008/0084970 A1 | 4/2008 | Harper |
| 2008/0085700 A1 | 4/2008 | Arora |
| 2008/0092054 A1 | 4/2008 | Bhumkar et al. |
| 2008/0092057 A1 | 4/2008 | Monson et al. |
| 2008/0094368 A1 | 4/2008 | Ording et al. |
| 2008/0095100 A1 | 4/2008 | Cleveland et al. |
| 2008/0098093 A1 | 4/2008 | Simon et al. |
| 2008/0102863 A1 | 5/2008 | Hardy |
| 2008/0104544 A1 | 5/2008 | Collins et al. |
| 2008/0107057 A1 | 5/2008 | Kannan et al. |
| 2008/0109753 A1 | 5/2008 | Karstens |
| 2008/0113656 A1 | 5/2008 | Lee et al. |
| 2008/0114535 A1 | 5/2008 | Nesbitt |
| 2008/0120569 A1 | 5/2008 | Mann et al. |
| 2008/0120571 A1 | 5/2008 | Chang et al. |
| 2008/0122796 A1 | 5/2008 | Jobs |
| 2008/0126441 A1 | 5/2008 | Giampaolo et al. |
| 2008/0132252 A1 | 6/2008 | Altman et al. |
| 2008/0138030 A1 | 6/2008 | Bryan et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0158189 A1 | 7/2008 | Kim |
| 2008/0162651 A1 | 7/2008 | Madnani |
| 2008/0163104 A1 | 7/2008 | Haug |
| 2008/0164982 A1 | 7/2008 | Andrews et al. |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0165210 A1 | 7/2008 | Platzer et al. |
| 2008/0165255 A1 | 7/2008 | Christie et al. |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168382 A1 | 7/2008 | Louch et al. |
| 2008/0168396 A1 | 7/2008 | Matas et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0178125 A1 | 7/2008 | Elsbree |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi |
| 2008/0211766 A1 | 9/2008 | Westerman et al. |
| 2008/0211778 A1 | 9/2008 | Ording et al. |
| 2008/0215475 A1 | 9/2008 | Ramer et al. |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0225014 A1 | 9/2008 | Kim |
| 2008/0229192 A1 | 9/2008 | Gear et al. |
| 2008/0229217 A1 | 9/2008 | Kembel et al. |
| 2008/0238941 A1 | 10/2008 | Kinnan |
| 2008/0242277 A1 | 10/2008 | Chen et al. |
| 2008/0242362 A1 | 10/2008 | Duarte |
| 2008/0249682 A1 | 10/2008 | Wisniewski et al. |
| 2008/0250354 A1 | 10/2008 | Park |
| 2008/0256471 A1 | 10/2008 | Okamoto |
| 2008/0259042 A1 | 10/2008 | Thorn |
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0275956 A1 | 11/2008 | Saxena |
| 2008/0278455 A1 | 11/2008 | Atkins et al. |
| 2008/0284798 A1 | 11/2008 | Weybrew et al. |
| 2008/0288606 A1 | 11/2008 | Kasai et al. |
| 2008/0297475 A1 | 12/2008 | Woolf et al. |
| 2008/0299999 A1 | 12/2008 | Lockhart et al. |
| 2008/0301046 A1 | 12/2008 | Martinez et al. |
| 2008/0301575 A1 | 12/2008 | Fermon |
| 2008/0303798 A1 | 12/2008 | Matsudate et al. |
| 2008/0307351 A1 | 12/2008 | Louch et al. |
| 2008/0307364 A1 | 12/2008 | Chaudhri et al. |
| 2008/0309626 A1 | 12/2008 | Westerman et al. |
| 2008/0313538 A1 | 12/2008 | Hudson |
| 2008/0313540 A1 | 12/2008 | Dirks et al. |
| 2008/0316177 A1 | 12/2008 | Tseng |
| 2008/0317240 A1 | 12/2008 | Chang et al. |
| 2008/0320413 A1 | 12/2008 | Oshiro |
| 2009/0007004 A1 | 1/2009 | Holecek et al. |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0021486 A1 | 1/2009 | Chaudhri et al. |
| 2009/0029736 A1 | 1/2009 | Kim et al. |
| 2009/0031243 A1 | 1/2009 | Kano et al. |
| 2009/0031247 A1 | 1/2009 | Walter et al. |
| 2009/0033632 A1 | 2/2009 | Szolyga et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0054107 A1 | 2/2009 | Feland, III et al. |
| 2009/0055749 A1 | 2/2009 | Chatterjee et al. |
| 2009/0058821 A1 | 3/2009 | Chaudhri |
| 2009/0058830 A1 | 3/2009 | Herz |
| 2009/0059073 A1 | 3/2009 | Cho et al. |
| 2009/0059730 A1 | 3/2009 | Lyons et al. |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0077501 A1 | 3/2009 | Partridge et al. |
| 2009/0077649 A1 | 3/2009 | Lockhart |
| 2009/0079699 A1 | 3/2009 | Sun |
| 2009/0079740 A1 | 3/2009 | Fitzmaurice et al. |
| 2009/0083656 A1 | 3/2009 | Dokhon |
| 2009/0085851 A1 | 4/2009 | Lim |
| 2009/0085878 A1 | 4/2009 | Heubel et al. |
| 2009/0085886 A1 | 4/2009 | Huang et al. |
| 2009/0089215 A1 | 4/2009 | Newton |
| 2009/0089459 A1 | 4/2009 | Jeyaseelan et al. |
| 2009/0089704 A1 | 4/2009 | Makela |
| 2009/0094562 A1 | 4/2009 | Jeong et al. |
| 2009/0096758 A1 | 4/2009 | Hotelling et al. |
| 2009/0103515 A1 | 4/2009 | Pointer |
| 2009/0106691 A1 | 4/2009 | Ballard et al. |
| 2009/0106694 A1 | 4/2009 | Kraft et al. |
| 2009/0106696 A1 | 4/2009 | Duarte |
| 2009/0109243 A1 | 4/2009 | Kraft |
| 2009/0117942 A1 | 5/2009 | Boningue et al. |
| 2009/0117943 A1 | 5/2009 | Lee et al. |
| 2009/0119578 A1 | 5/2009 | Relyea et al. |
| 2009/0125844 A1 | 5/2009 | Weir et al. |
| 2009/0128505 A1 | 5/2009 | Partridge et al. |
| 2009/0132942 A1 | 5/2009 | Santoro et al. |
| 2009/0138830 A1 | 5/2009 | Borgaonkar et al. |
| 2009/0140061 A1 | 6/2009 | Schultz et al. |
| 2009/0140986 A1 | 6/2009 | Karkkainen et al. |
| 2009/0143141 A1 | 6/2009 | Wells et al. |
| 2009/0144376 A1 | 6/2009 | Moscatelli et al. |
| 2009/0144642 A1 | 6/2009 | Crystal |
| 2009/0144652 A1 | 6/2009 | Wiley |
| 2009/0144653 A1 | 6/2009 | Ubillos |
| 2009/0144753 A1 | 6/2009 | Morris |
| 2009/0146962 A1 | 6/2009 | Ahonen et al. |
| 2009/0150618 A1 | 6/2009 | Allen, Jr. et al. |
| 2009/0153438 A1 | 6/2009 | Miller et al. |
| 2009/0153492 A1 | 6/2009 | Popp |
| 2009/0158144 A1 | 6/2009 | Griffin |
| 2009/0160809 A1 | 6/2009 | Yang |
| 2009/0163182 A1 | 6/2009 | Gatti et al. |
| 2009/0164888 A1 | 6/2009 | Phan |

(56) References Cited

U.S. PATENT DOCUMENTS

| | | |
|---|---|---|
| 2009/0164928 A1 | 6/2009 | Brown et al. |
| 2009/0164936 A1 | 6/2009 | Kawaguchi |
| 2009/0167696 A1 | 7/2009 | Griffin |
| 2009/0171920 A1 | 7/2009 | Wade et al. |
| 2009/0172103 A1 | 7/2009 | Tuli |
| 2009/0174679 A1 | 7/2009 | Westerman |
| 2009/0178007 A1 | 7/2009 | Matas et al. |
| 2009/0182788 A1 | 7/2009 | Chung et al. |
| 2009/0183077 A1 | 7/2009 | Hakim et al. |
| 2009/0183107 A1 | 7/2009 | Matthews et al. |
| 2009/0184939 A1 | 7/2009 | Wohlstadter et al. |
| 2009/0187842 A1 | 7/2009 | Collins et al. |
| 2009/0187860 A1 | 7/2009 | Fleck et al. |
| 2009/0189868 A1 | 7/2009 | Joo et al. |
| 2009/0192942 A1 | 7/2009 | Cottrille et al. |
| 2009/0193358 A1 | 7/2009 | Mernyk et al. |
| 2009/0193364 A1 | 7/2009 | Jarrett et al. |
| 2009/0193366 A1 | 7/2009 | Davidson |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0210795 A1 | 8/2009 | Katsuranis |
| 2009/0215504 A1 | 8/2009 | Lando |
| 2009/0225038 A1 | 9/2009 | Bolsinga et al. |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |
| 2009/0248421 A1 | 10/2009 | Michaelis et al. |
| 2009/0249236 A1 | 10/2009 | Westerman et al. |
| 2009/0249247 A1 | 10/2009 | Tseng et al. |
| 2009/0249257 A1 | 10/2009 | Bove et al. |
| 2009/0251432 A1 | 10/2009 | Wang et al. |
| 2009/0254846 A1 | 10/2009 | Vaidyanathan et al. |
| 2009/0265662 A1 | 10/2009 | Bamford |
| 2009/0271735 A1 | 10/2009 | Anderson et al. |
| 2009/0271778 A1 | 10/2009 | Mandyam et al. |
| 2009/0276701 A1 | 11/2009 | Nurmi |
| 2009/0278812 A1 | 11/2009 | Yasutake |
| 2009/0282332 A1 | 11/2009 | Porat |
| 2009/0284478 A1 | 11/2009 | De la Torre Baltierra et al. |
| 2009/0284482 A1 | 11/2009 | Chin |
| 2009/0284657 A1 | 11/2009 | Roberts et al. |
| 2009/0288044 A1 | 11/2009 | Matthews et al. |
| 2009/0289902 A1 | 11/2009 | Carlvik et al. |
| 2009/0292989 A1 | 11/2009 | Matthews et al. |
| 2009/0293007 A1 | 11/2009 | Duarte et al. |
| 2009/0293013 A1 | 11/2009 | O'Shaugnessy et al. |
| 2009/0293014 A1 | 11/2009 | Meuninck et al. |
| 2009/0295753 A1 | 12/2009 | King et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0307682 A1 | 12/2009 | Gharabally et al. |
| 2009/0309846 A1 | 12/2009 | Trachtenberg et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0318171 A1 | 12/2009 | Backholm et al. |
| 2009/0320070 A1 | 12/2009 | Inoguchi |
| 2009/0322760 A1 | 12/2009 | Kwiatkowski et al. |
| 2009/0327953 A1 | 12/2009 | Honkala et al. |
| 2009/0327969 A1 | 12/2009 | Estrada |
| 2009/0327975 A1 | 12/2009 | Stedman |
| 2010/0008490 A1 | 1/2010 | Gharachorloo et al. |
| 2010/0010934 A1 | 1/2010 | Barry et al. |
| 2010/0013768 A1 | 1/2010 | Leung |
| 2010/0013782 A1 | 1/2010 | Liu et al. |
| 2010/0016049 A1 | 1/2010 | Shirakawa et al. |
| 2010/0020025 A1 | 1/2010 | Lemort et al. |
| 2010/0020091 A1 | 1/2010 | Rasmussen et al. |
| 2010/0030578 A1 | 2/2010 | Siddique et al. |
| 2010/0031186 A1 | 2/2010 | Tseng |
| 2010/0042911 A1 | 2/2010 | Wormald et al. |
| 2010/0045705 A1 | 2/2010 | Vertegaal et al. |
| 2010/0050076 A1 | 2/2010 | Roth |
| 2010/0053861 A1 | 3/2010 | Kim et al. |
| 2010/0057566 A1 | 3/2010 | Itzhak |
| 2010/0058226 A1 | 3/2010 | Flake et al. |
| 2010/0058248 A1 | 3/2010 | Park |
| 2010/0062811 A1 | 3/2010 | Park et al. |
| 2010/0064261 A1 | 3/2010 | Andrews et al. |
| 2010/0066667 A1 | 3/2010 | MacDougall et al. |
| 2010/0066698 A1 | 3/2010 | Seo |
| 2010/0066705 A1 | 3/2010 | Keely et al. |
| 2010/0070931 A1 | 3/2010 | Nichols |
| 2010/0073160 A1 | 3/2010 | Gilmour et al. |
| 2010/0073380 A1 | 3/2010 | Kaplan et al. |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079392 A1 | 4/2010 | Chiang et al. |
| 2010/0079413 A1 | 4/2010 | Kawashima et al. |
| 2010/0081475 A1 | 4/2010 | Chiang et al. |
| 2010/0083190 A1 | 4/2010 | Roberts et al. |
| 2010/0086022 A1 | 4/2010 | Hunleth et al. |
| 2010/0087169 A1 | 4/2010 | Lin et al. |
| 2010/0087173 A1 | 4/2010 | Lin et al. |
| 2010/0088634 A1 | 4/2010 | Tsuruta et al. |
| 2010/0088635 A1 | 4/2010 | Louch |
| 2010/0088641 A1 | 4/2010 | Choi |
| 2010/0090971 A1 | 4/2010 | Choi et al. |
| 2010/0095240 A1 | 4/2010 | Shiplacoff et al. |
| 2010/0097338 A1 | 4/2010 | Miyashita et al. |
| 2010/0100839 A1 | 4/2010 | Tseng et al. |
| 2010/0102998 A1 | 4/2010 | Fux |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman et al. |
| 2010/0105440 A1 | 4/2010 | Kruzeniski |
| 2010/0105441 A1 | 4/2010 | Voss |
| 2010/0105443 A1 | 4/2010 | Vaisanen |
| 2010/0106607 A1 | 4/2010 | Riddiford et al. |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0115455 A1 | 5/2010 | Kim |
| 2010/0121705 A1 | 5/2010 | Ramer et al. |
| 2010/0122110 A1 | 5/2010 | Ordogh |
| 2010/0122208 A1 | 5/2010 | Herr et al. |
| 2010/0123737 A1 | 5/2010 | Williamson et al. |
| 2010/0131901 A1 | 5/2010 | Takahashi et al. |
| 2010/0134415 A1 | 6/2010 | Iwase et al. |
| 2010/0137027 A1 | 6/2010 | Kim |
| 2010/0138767 A1 | 6/2010 | Wang et al. |
| 2010/0138782 A1 | 6/2010 | Rainisto |
| 2010/0138834 A1 | 6/2010 | Agarwal et al. |
| 2010/0145675 A1 | 6/2010 | Lloyd et al. |
| 2010/0146384 A1 | 6/2010 | Peev et al. |
| 2010/0146431 A1 | 6/2010 | Raji et al. |
| 2010/0146437 A1 | 6/2010 | Woodcock et al. |
| 2010/0157157 A1 | 6/2010 | Yi |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0164878 A1 | 7/2010 | Bestle et al. |
| 2010/0164959 A1 | 7/2010 | Brown et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0169819 A1 | 7/2010 | Bestle et al. |
| 2010/0175018 A1 | 7/2010 | Petschnigg et al. |
| 2010/0175029 A1 | 7/2010 | Williams |
| 2010/0180233 A1 | 7/2010 | Kruzeniski |

(56) References Cited

U.S. PATENT DOCUMENTS

| | | |
|---|---|---|
| 2010/0185932 A1 | 7/2010 | Coffman et al. |
| 2010/0185989 A1 | 7/2010 | Shiplacoff et al. |
| 2010/0188328 A1 | 7/2010 | Dodge et al. |
| 2010/0188371 A1 | 7/2010 | Lowles et al. |
| 2010/0192102 A1 | 7/2010 | Chmielewski et al. |
| 2010/0201634 A1 | 8/2010 | Coddington |
| 2010/0213040 A1 | 8/2010 | Yeh et al. |
| 2010/0216491 A1 | 8/2010 | Winkler et al. |
| 2010/0217428 A1 | 8/2010 | Strong et al. |
| 2010/0223569 A1 | 9/2010 | Vuong et al. |
| 2010/0223627 A1 | 9/2010 | Sharma |
| 2010/0235736 A1 | 9/2010 | Fleisher et al. |
| 2010/0241973 A1 | 9/2010 | Whiddett |
| 2010/0245263 A1 | 9/2010 | Parada, Jr. et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga et al. |
| 2010/0248788 A1 | 9/2010 | Yook et al. |
| 2010/0251153 A1 | 9/2010 | SanGiovanni et al. |
| 2010/0251167 A1 | 9/2010 | Deluca et al. |
| 2010/0251189 A1 | 9/2010 | Jaeger |
| 2010/0259493 A1 | 10/2010 | Chang et al. |
| 2010/0262928 A1 | 10/2010 | Abbott |
| 2010/0265196 A1 | 10/2010 | Lee et al. |
| 2010/0281402 A1 | 11/2010 | Staikos et al. |
| 2010/0281409 A1 | 11/2010 | Rainisto et al. |
| 2010/0281481 A1 | 11/2010 | Rainisto et al. |
| 2010/0283743 A1 | 11/2010 | Coddington et al. |
| 2010/0283748 A1 | 11/2010 | Hsieh et al. |
| 2010/0289806 A1 | 11/2010 | Lao et al. |
| 2010/0293056 A1 | 11/2010 | Flynt et al. |
| 2010/0293501 A1 | 11/2010 | Russ et al. |
| 2010/0295789 A1 | 11/2010 | Shin et al. |
| 2010/0295795 A1 | 11/2010 | Wilairat |
| 2010/0298034 A1 | 11/2010 | Shin et al. |
| 2010/0302172 A1 | 12/2010 | Wilairat |
| 2010/0302176 A1 | 12/2010 | Nikula et al. |
| 2010/0302278 A1 | 12/2010 | Shaffer et al. |
| 2010/0302712 A1 | 12/2010 | Zednicek et al. |
| 2010/0306702 A1 | 12/2010 | Warner |
| 2010/0309148 A1 | 12/2010 | Fleizach et al. |
| 2010/0311470 A1 | 12/2010 | Seo et al. |
| 2010/0313124 A1 | 12/2010 | Privault et al. |
| 2010/0313165 A1 | 12/2010 | Louch et al. |
| 2010/0318745 A1 | 12/2010 | Wheeler et al. |
| 2010/0321403 A1 | 12/2010 | Inadome |
| 2010/0325411 A1 | 12/2010 | Jung et al. |
| 2010/0328431 A1 | 12/2010 | Kim et al. |
| 2010/0329642 A1 | 12/2010 | Kam et al. |
| 2010/0333008 A1 | 12/2010 | Taylor |
| 2011/0004839 A1 | 1/2011 | Cha et al. |
| 2011/0004845 A1 | 1/2011 | Ciabarra |
| 2011/0018806 A1 | 1/2011 | Yano |
| 2011/0018821 A1 | 1/2011 | Kii |
| 2011/0029598 A1 | 2/2011 | Arnold et al. |
| 2011/0029904 A1 | 2/2011 | Smith et al. |
| 2011/0029927 A1 | 2/2011 | Lietzke et al. |
| 2011/0029934 A1 | 2/2011 | Locker et al. |
| 2011/0032365 A1 | 2/2011 | Yett |
| 2011/0035702 A1 | 2/2011 | Williams et al. |
| 2011/0041096 A1 | 2/2011 | Larco et al. |
| 2011/0043527 A1 | 2/2011 | Ording et al. |
| 2011/0050594 A1 | 3/2011 | Kim et al. |
| 2011/0055729 A1 | 3/2011 | Mason et al. |
| 2011/0055753 A1 | 3/2011 | Horodezky et al. |
| 2011/0055773 A1 | 3/2011 | Agarawala et al. |
| 2011/0055775 A1 | 3/2011 | Saito et al. |
| 2011/0057953 A1 | 3/2011 | Horodezky |
| 2011/0074699 A1* | 3/2011 | Marr .................... G06F 3/0485 345/173 |
| 2011/0074710 A1 | 3/2011 | Weeldreyer et al. |
| 2011/0074719 A1 | 3/2011 | Yeh et al. |
| 2011/0078624 A1 | 3/2011 | Missig et al. |
| 2011/0087739 A1 | 4/2011 | Lin et al. |
| 2011/0087988 A1 | 4/2011 | Ray et al. |
| 2011/0093778 A1 | 4/2011 | Kim et al. |
| 2011/0093815 A1 | 4/2011 | Gobeil |
| 2011/0093816 A1 | 4/2011 | Chang et al. |
| 2011/0093821 A1 | 4/2011 | Wigdor et al. |
| 2011/0102464 A1 | 5/2011 | Godavari |
| 2011/0107220 A1 | 5/2011 | Perlman |
| 2011/0107272 A1 | 5/2011 | Aguilar |
| 2011/0109563 A1 | 5/2011 | Liu |
| 2011/0113337 A1 | 5/2011 | Liu et al. |
| 2011/0113486 A1 | 5/2011 | Hunt et al. |
| 2011/0115735 A1 | 5/2011 | Lev et al. |
| 2011/0119586 A1 | 5/2011 | Blinnikka et al. |
| 2011/0119597 A1 | 5/2011 | Yellamraju et al. |
| 2011/0124376 A1 | 5/2011 | Kim et al. |
| 2011/0126094 A1 | 5/2011 | Horodezky et al. |
| 2011/0126156 A1 | 5/2011 | Krishnaraj et al. |
| 2011/0138313 A1 | 6/2011 | Decker et al. |
| 2011/0143769 A1 | 6/2011 | Jones et al. |
| 2011/0154223 A1 | 6/2011 | Whitnah et al. |
| 2011/0154235 A1 | 6/2011 | Min et al. |
| 2011/0157027 A1 | 6/2011 | Rissa |
| 2011/0161845 A1 | 6/2011 | Stallings et al. |
| 2011/0163944 A1* | 7/2011 | Bilbrey .................. G01D 21/02 345/156 |
| 2011/0163968 A1 | 7/2011 | Hogan |
| 2011/0167336 A1 | 7/2011 | Aitken et al. |
| 2011/0167341 A1 | 7/2011 | Cranfill et al. |
| 2011/0167403 A1 | 7/2011 | French et al. |
| 2011/0170252 A1 | 7/2011 | Jones et al. |
| 2011/0173556 A1 | 7/2011 | Czerwinski et al. |
| 2011/0173568 A1 | 7/2011 | Royal, Jr. et al. |
| 2011/0173569 A1 | 7/2011 | Howes et al. |
| 2011/0175821 A1 | 7/2011 | King |
| 2011/0175930 A1 | 7/2011 | Hwang et al. |
| 2011/0179020 A1 | 7/2011 | Ozzie et al. |
| 2011/0179386 A1 | 7/2011 | Shaffer et al. |
| 2011/0179387 A1 | 7/2011 | Shaffer et al. |
| 2011/0181524 A1 | 7/2011 | Hinckley |
| 2011/0181617 A1 | 7/2011 | Tsuda et al. |
| 2011/0184960 A1 | 7/2011 | Delpha et al. |
| 2011/0185299 A1 | 7/2011 | Hinckley |
| 2011/0185300 A1 | 7/2011 | Hinckley |
| 2011/0185318 A1 | 7/2011 | Hinckley et al. |
| 2011/0185320 A1 | 7/2011 | Hinckley |
| 2011/0191675 A1 | 8/2011 | Kauranen |
| 2011/0191704 A1 | 8/2011 | Hinckley |
| 2011/0191718 A1 | 8/2011 | Hinckley |
| 2011/0191719 A1 | 8/2011 | Hinckley |
| 2011/0199386 A1 | 8/2011 | Dharwada et al. |
| 2011/0202834 A1 | 8/2011 | Mandryk et al. |
| 2011/0202837 A1 | 8/2011 | Fong |
| 2011/0202866 A1 | 8/2011 | Huang et al. |
| 2011/0205163 A1 | 8/2011 | Hinckley |
| 2011/0209039 A1 | 8/2011 | Hinckley et al. |
| 2011/0209057 A1 | 8/2011 | Hinckley |
| 2011/0209058 A1 | 8/2011 | Hinckley |
| 2011/0209088 A1 | 8/2011 | Hinckley |
| 2011/0209089 A1 | 8/2011 | Hinckley et al. |
| 2011/0209093 A1 | 8/2011 | Hinckley |
| 2011/0209097 A1 | 8/2011 | Hinckley |
| 2011/0209098 A1 | 8/2011 | Hinckley et al. |
| 2011/0209099 A1 | 8/2011 | Hinckley |
| 2011/0209100 A1 | 8/2011 | Hinckley et al. |
| 2011/0209101 A1 | 8/2011 | Hinckley et al. |
| 2011/0209102 A1 | 8/2011 | Hinckley et al. |
| 2011/0209103 A1 | 8/2011 | Hinckley et al. |
| 2011/0209104 A1 | 8/2011 | Hinckley et al. |
| 2011/0210850 A1 | 9/2011 | Tran |
| 2011/0216064 A1 | 9/2011 | Dahl et al. |
| 2011/0225547 A1 | 9/2011 | Fong et al. |
| 2011/0231796 A1 | 9/2011 | Vigil |
| 2011/0234522 A1 | 9/2011 | Lin et al. |
| 2011/0252346 A1 | 10/2011 | Chaudhri |
| 2011/0252380 A1 | 10/2011 | Chaudhri |
| 2011/0252381 A1 | 10/2011 | Chaudhri |
| 2011/0258563 A1 | 10/2011 | Lincke |
| 2011/0271182 A1 | 11/2011 | Tsai et al. |
| 2011/0273379 A1 | 11/2011 | Chen et al. |

(56) References Cited

U.S. PATENT DOCUMENTS

| | | |
|---|---|---|
| 2011/0276864 A1 | 11/2011 | Oules |
| 2011/0279461 A1 | 11/2011 | Hamilton et al. |
| 2011/0280312 A1 | 11/2011 | Gaur et al. |
| 2011/0283188 A1 | 11/2011 | Farrenkopf et al. |
| 2011/0291964 A1 | 12/2011 | Chambers et al. |
| 2011/0296057 A1 | 12/2011 | Shah et al. |
| 2011/0316884 A1 | 12/2011 | Giambalvo et al. |
| 2011/0320863 A1 | 12/2011 | Amroladze et al. |
| 2011/0320978 A1 | 12/2011 | Horodezky et al. |
| 2012/0005584 A1 | 1/2012 | Seago et al. |
| 2012/0009903 A1 | 1/2012 | Schultz et al. |
| 2012/0011437 A1 | 1/2012 | James et al. |
| 2012/0017162 A1 | 1/2012 | Khokhlov |
| 2012/0023101 A1 | 1/2012 | Heimendinger et al. |
| 2012/0028687 A1 | 2/2012 | Wykes |
| 2012/0030616 A1 | 2/2012 | Howes et al. |
| 2012/0050185 A1 | 3/2012 | Davydov et al. |
| 2012/0050332 A1 | 3/2012 | Nikara et al. |
| 2012/0054674 A1 | 3/2012 | Beykpour et al. |
| 2012/0062604 A1 | 3/2012 | Lobo |
| 2012/0072853 A1 | 3/2012 | Krigstrom et al. |
| 2012/0072953 A1 | 3/2012 | James et al. |
| 2012/0079414 A1 | 3/2012 | Eischeid et al. |
| 2012/0081310 A1 | 4/2012 | Schrock et al. |
| 2012/0084704 A1 | 4/2012 | Lee et al. |
| 2012/0084705 A1 | 4/2012 | Lee et al. |
| 2012/0084710 A1 | 4/2012 | Sirpal et al. |
| 2012/0089950 A1 | 4/2012 | Tseng |
| 2012/0096411 A1 | 4/2012 | Nash |
| 2012/0102433 A1 | 4/2012 | Falkenburg |
| 2012/0124469 A1 | 5/2012 | Nakajima et al. |
| 2012/0151397 A1 | 6/2012 | Oberstein et al. |
| 2012/0159383 A1 | 6/2012 | Matthews et al. |
| 2012/0159386 A1 | 6/2012 | Kang et al. |
| 2012/0159395 A1 | 6/2012 | Deutsch et al. |
| 2012/0159402 A1 | 6/2012 | Nurmi et al. |
| 2012/0161791 A1 | 6/2012 | Shaw |
| 2012/0162266 A1 | 6/2012 | Douglas et al. |
| 2012/0166980 A1 | 6/2012 | Yosef et al. |
| 2012/0167005 A1 | 6/2012 | Matthews et al. |
| 2012/0167008 A1 | 6/2012 | Zaman |
| 2012/0167011 A1 | 6/2012 | Zaman |
| 2012/0169593 A1 | 7/2012 | Mak et al. |
| 2012/0174005 A1 | 7/2012 | Deutsch et al. |
| 2012/0174029 A1 | 7/2012 | Bastide et al. |
| 2012/0174034 A1 | 7/2012 | Chae et al. |
| 2012/0176322 A1 | 7/2012 | Karmi et al. |
| 2012/0176401 A1 | 7/2012 | Hayward et al. |
| 2012/0179992 A1 | 7/2012 | Smuga |
| 2012/0180001 A1 | 7/2012 | Griffin et al. |
| 2012/0194448 A1 | 8/2012 | Rothkopf |
| 2012/0208501 A1 | 8/2012 | Tsuda |
| 2012/0209907 A1 | 8/2012 | Andrews et al. |
| 2012/0210265 A1 | 8/2012 | Delia et al. |
| 2012/0212495 A1 | 8/2012 | Butcher |
| 2012/0216139 A1 | 8/2012 | Ording et al. |
| 2012/0218192 A1 | 8/2012 | Lazaridis et al. |
| 2012/0226971 A1 | 9/2012 | Tocchini et al. |
| 2012/0233571 A1 | 9/2012 | Wever et al. |
| 2012/0235930 A1 | 9/2012 | Lazaridis et al. |
| 2012/0236026 A1 | 9/2012 | Hinckley |
| 2012/0236035 A1 | 9/2012 | Kimura |
| 2012/0244841 A1 | 9/2012 | Teng |
| 2012/0254780 A1 | 10/2012 | Mouton et al. |
| 2012/0254808 A1 | 10/2012 | Gildfind |
| 2012/0265644 A1 | 10/2012 | Roa et al. |
| 2012/0272181 A1 | 10/2012 | Rogers et al. |
| 2012/0278727 A1 | 11/2012 | Ananthakrishnan et al. |
| 2012/0284673 A1 | 11/2012 | Lamb et al. |
| 2012/0290962 A1 | 11/2012 | Zielinski et al. |
| 2012/0299968 A1 | 11/2012 | Wong et al. |
| 2012/0304068 A1 | 11/2012 | Zaman et al. |
| 2012/0304092 A1 | 11/2012 | Jarrett et al. |
| 2012/0304102 A1 | 11/2012 | LeVee et al. |
| 2012/0304106 A1 | 11/2012 | LeVee et al. |
| 2012/0304107 A1 | 11/2012 | Nan et al. |
| 2012/0304108 A1 | 11/2012 | Jarrett et al. |
| 2012/0304113 A1 | 11/2012 | Patten et al. |
| 2012/0304114 A1 | 11/2012 | Wong et al. |
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0304131 A1 | 11/2012 | Nan et al. |
| 2012/0304132 A1 | 11/2012 | Sareen et al. |
| 2012/0304133 A1 | 11/2012 | Nan et al. |
| 2012/0311436 A1 | 12/2012 | Steele et al. |
| 2012/0311485 A1 | 12/2012 | Caliendo, Jr. et al. |
| 2012/0314342 A1 | 12/2012 | Sheu et al. |
| 2012/0322527 A1 | 12/2012 | Aoki et al. |
| 2012/0323992 A1 | 12/2012 | Brobst et al. |
| 2013/0007665 A1 | 1/2013 | Chaudhri et al. |
| 2013/0024805 A1 | 1/2013 | In et al. |
| 2013/0031508 A1 | 1/2013 | Kodosky et al. |
| 2013/0033525 A1 | 2/2013 | Markiewicz |
| 2013/0038541 A1 | 2/2013 | Bakker |
| 2013/0042203 A1 | 2/2013 | Wong et al. |
| 2013/0042206 A1 | 2/2013 | Zaman et al. |
| 2013/0044136 A1 | 2/2013 | Matthews |
| 2013/0044141 A1 | 2/2013 | Markiewicz |
| 2013/0047079 A1 | 2/2013 | Kroeger et al. |
| 2013/0047105 A1 | 2/2013 | Jarrett |
| 2013/0047117 A1 | 2/2013 | Deutsch |
| 2013/0047126 A1 | 2/2013 | Sareen |
| 2013/0057587 A1 | 3/2013 | Leonard et al. |
| 2013/0057588 A1 | 3/2013 | Leonard |
| 2013/0063442 A1 | 3/2013 | Zaman |
| 2013/0063443 A1 | 3/2013 | Garside |
| 2013/0063465 A1 | 3/2013 | Zaman |
| 2013/0063490 A1 | 3/2013 | Zaman et al. |
| 2013/0067381 A1 | 3/2013 | Yalovsky |
| 2013/0067390 A1 | 3/2013 | Kwiatkowski |
| 2013/0067391 A1 | 3/2013 | Pittappilly |
| 2013/0067398 A1 | 3/2013 | Pittappilly |
| 2013/0067399 A1 | 3/2013 | Elliott |
| 2013/0067412 A1 | 3/2013 | Leonard et al. |
| 2013/0067420 A1 | 3/2013 | Pittappilly |
| 2013/0093757 A1 | 4/2013 | Cornell |
| 2013/0102366 A1 | 4/2013 | Teng |
| 2013/0111396 A1 | 5/2013 | Brid |
| 2013/0117715 A1 | 5/2013 | Williams et al. |
| 2013/0145244 A1 | 6/2013 | Rothschiller et al. |
| 2013/0167058 A1 | 6/2013 | LeVee |
| 2013/0169649 A1 | 7/2013 | Bates |
| 2013/0176316 A1 | 7/2013 | Bates |
| 2013/0178155 A1 | 7/2013 | Shulenberger |
| 2013/0179781 A1 | 7/2013 | Nan et al. |
| 2013/0219332 A1 | 8/2013 | Woley |
| 2013/0268422 A1 | 10/2013 | Ram et al. |
| 2013/0277271 A1 | 10/2013 | Toulotte |
| 2013/0297700 A1 | 11/2013 | Hayton et al. |
| 2013/0300684 A1 | 11/2013 | Kim et al. |
| 2013/0304822 A1 | 11/2013 | Tetreault |
| 2013/0305184 A1 | 11/2013 | Kim et al. |
| 2014/0013271 A1 | 1/2014 | Moore et al. |
| 2014/0033099 A1 | 1/2014 | Treitman et al. |
| 2014/0067833 A1 | 3/2014 | Nandi |
| 2014/0082552 A1 | 3/2014 | Zaman |
| 2014/0089833 A1 | 3/2014 | Hwang et al. |
| 2014/0089856 A1 | 3/2014 | Matthews |
| 2014/0098108 A1 | 4/2014 | Fong et al. |
| 2014/0109008 A1 | 4/2014 | Zaman |
| 2014/0143708 A1 | 5/2014 | Yang et al. |
| 2014/0223381 A1 | 8/2014 | Huang et al. |
| 2014/0298245 A1 | 10/2014 | Tappen et al. |
| 2014/0310646 A1 | 10/2014 | Vranjes et al. |
| 2014/0359721 A1 | 12/2014 | Alphin et al. |
| 2015/0046829 A1 | 2/2015 | Donahue et al. |
| 2015/0058763 A1 | 2/2015 | Leonard et al. |
| 2015/0113476 A1 | 4/2015 | Deutsch et al. |
| 2015/0186376 A1 | 7/2015 | Garside et al. |
| 2015/0193403 A1 | 7/2015 | Zaman et al. |
| 2015/0317062 A1 | 11/2015 | Jarrett et al. |
| 2015/0378554 A1 | 12/2015 | Jan et al. |
| 2016/0041710 A1 | 2/2016 | Zaman et al. |

(56) References Cited

U.S. PATENT DOCUMENTS

| | | |
|---|---|---|
| 2016/0041711 A1 | 2/2016 | Zaman et al. |
| 2016/0041730 A1 | 2/2016 | Zaman et al. |
| 2016/0070357 A1 | 3/2016 | Huang et al. |
| 2016/0110090 A1 | 4/2016 | Patten et al. |
| 2017/0068428 A1 | 3/2017 | Wong et al. |
| 2017/0315705 A1 | 11/2017 | Zaman et al. |
| 2018/0101292 A1 | 4/2018 | Zaman et al. |

FOREIGN PATENT DOCUMENTS

| | | |
|---|---|---|
| CN | 1512301 | 7/2004 |
| CN | 1591305 | 3/2005 |
| CN | 1591398 | 3/2005 |
| CN | 1734440 | 2/2006 |
| CN | 1735856 | 2/2006 |
| CN | 1749936 | 3/2006 |
| CN | 1766824 | 5/2006 |
| CN | 1786906 | 6/2006 |
| CN | 1845054 | 10/2006 |
| CN | 1851641 | 10/2006 |
| CN | 1902575 | 1/2007 |
| CN | 1904823 | 1/2007 |
| CN | 1930568 | 3/2007 |
| CN | 1936797 | 3/2007 |
| CN | 101006425 | 7/2007 |
| CN | 101036104 | 9/2007 |
| CN | 101075174 | 11/2007 |
| CN | 101114303 | 1/2008 |
| CN | 101228570 | 7/2008 |
| CN | 101233477 | 7/2008 |
| CN | 101233504 | 7/2008 |
| CN | 101346688 | 1/2009 |
| CN | 101377920 | 3/2009 |
| CN | 101432677 | 5/2009 |
| CN | 201298220 | 8/2009 |
| CN | 101566865 | 10/2009 |
| CN | 101576789 | 11/2009 |
| CN | 101578577 | 11/2009 |
| CN | 101627361 | 1/2010 |
| CN | 101636711 | 1/2010 |
| CN | 101770332 | 7/2010 |
| CN | 101809531 | 8/2010 |
| CN | 101819498 | 9/2010 |
| CN | 101981522 | 2/2011 |
| CN | 102004603 | 4/2011 |
| CN | 102033710 | 4/2011 |
| CN | 102144213 | 8/2011 |
| CN | 102197702 | 9/2011 |
| CN | 102460370 | 5/2012 |
| CN | 102591571 | 7/2012 |
| CN | 102624970 | 8/2012 |
| CN | 202904485 | 4/2013 |
| CN | 103105995 | 5/2013 |
| CN | 203025612 | 6/2013 |
| CN | 103197837 | 7/2013 |
| CN | 103475784 | 12/2013 |
| CN | 103543904 | 1/2014 |
| CN | 103562858 | 2/2014 |
| CN | 103562917 | 2/2014 |
| EP | 0583060 | 2/1994 |
| EP | 0965932 | 12/1999 |
| EP | 1176520 | 1/2002 |
| EP | 1337093 | 8/2003 |
| EP | 1353505 | 10/2003 |
| EP | 1434411 | 6/2004 |
| EP | 1526463 | 4/2005 |
| EP | 1752868 | 2/2007 |
| EP | 1939718 | 7/2008 |
| EP | 1942401 | 7/2008 |
| EP | 1962480 | 8/2008 |
| EP | 2045700 | 4/2009 |
| EP | 2172836 | 4/2009 |
| EP | 2076000 | 7/2009 |
| EP | 2148268 | 1/2010 |
| EP | 2262193 | 12/2010 |
| EP | 2535809 | 12/2012 |
| EP | 2659347 | 11/2013 |
| GB | 2350991 | 12/2000 |
| JP | 6282368 | 10/1994 |
| JP | H0744351 | 2/1995 |
| JP | 7281810 | 10/1995 |
| JP | 2000293280 | 10/2000 |
| JP | 2000347645 | 12/2000 |
| JP | 2001265523 | 9/2001 |
| JP | 2001290585 | 10/2001 |
| JP | 2002055753 | 2/2002 |
| JP | 2003513350 | 4/2003 |
| JP | 2003195998 | 7/2003 |
| JP | 2004227393 | 8/2004 |
| JP | 2004357257 | 12/2004 |
| JP | 2005527888 | 9/2005 |
| JP | 2006139615 | 6/2006 |
| JP | 2006268849 | 10/2006 |
| JP | 2006293989 | 10/2006 |
| JP | 2006323672 | 11/2006 |
| JP | 2007058740 | 3/2007 |
| JP | 2007148783 | 6/2007 |
| JP | 2007516496 | 6/2007 |
| JP | 2007195186 | 8/2007 |
| JP | 2008508600 | 3/2008 |
| JP | 2008527540 | 7/2008 |
| JP | 2008234042 | 10/2008 |
| JP | 2008276584 | 11/2008 |
| JP | 2008305087 | 12/2008 |
| JP | 2009097724 | 4/2009 |
| JP | 2009265929 | 11/2009 |
| JP | 2009266192 | 11/2009 |
| JP | 2010039761 | 2/2010 |
| JP | 2010049684 | 3/2010 |
| JP | 2010073099 | 4/2010 |
| JP | 20100090931 | 4/2010 |
| JP | 2010108273 | 5/2010 |
| JP | 2010250465 | 11/2010 |
| JP | 2010538394 | 12/2010 |
| JP | 2011048835 | 3/2011 |
| JP | 2011070525 | 4/2011 |
| JP | 2011515780 | 5/2011 |
| JP | 2011516936 | 5/2011 |
| JP | 2011128029 | 6/2011 |
| JP | 2011170523 | 9/2011 |
| JP | 2011221821 | 11/2011 |
| JP | 2012514811 | 6/2012 |
| JP | 2012155416 | 8/2012 |
| JP | 2012527684 | 11/2012 |
| JP | 2012256147 | 12/2012 |
| JP | 201365294 | 10/2014 |
| KR | 200303655 | 2/2003 |
| KR | 20060019198 | 3/2006 |
| KR | 20070039613 | 4/2007 |
| KR | 102007003611 | 4/2007 |
| KR | 20070093084 | 9/2007 |
| KR | 20070093585 | 9/2007 |
| KR | 102007009833 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 20080084156 | 9/2008 |
| KR | 1020080084156 | 9/2008 |
| KR | 1020080113913 | 12/2008 |
| KR | 20090002951 | 1/2009 |
| KR | 20090013927 | 2/2009 |
| KR | 1020090041635 | 4/2009 |
| KR | 20090053143 | 5/2009 |
| KR | 1020090088501 | 8/2009 |
| KR | 20090106755 | 10/2009 |
| KR | 1020090123545 | 12/2009 |
| KR | 20100010072 | 2/2010 |
| KR | 20100023637 | 3/2010 |
| KR | 20100048375 | 5/2010 |
| KR | 20100051119 | 5/2010 |
| KR | 20100056369 | 5/2010 |
| KR | 1020100056369 | 5/2010 |

(56) References Cited

FOREIGN PATENT DOCUMENTS

| | | |
|---|---|---|
| KR | 1020100107377 | 10/2010 |
| KR | 20100124427 | 11/2010 |
| KR | 1020100131724 | 12/2010 |
| KR | 20110038632 | 4/2011 |
| RU | 2409833 | 4/2009 |
| RU | 2363033 | 7/2009 |
| RU | 2412463 | 1/2010 |
| RU | 2405214 | 11/2010 |
| RU | 2413970 | 3/2011 |
| TW | 200947297 | 11/2009 |
| TW | 201023026 | 6/2010 |
| TW | 201037592 | 10/2010 |
| TW | I333157 | 11/2010 |
| WO | WO-9928812 | 1/1999 |
| WO | WO-9926127 | 5/1999 |
| WO | WO-0129976 | 4/2001 |
| WO | WO-03075547 | 9/2003 |
| WO | WO-2005026931 | 3/2005 |
| WO | WO-2005027506 | 3/2005 |
| WO | WO-2006019639 | 2/2006 |
| WO | WO-2006074267 | 7/2006 |
| WO | WO-2007019599 | 2/2007 |
| WO | WO-2007065019 | 6/2007 |
| WO | WO-2007121557 | 11/2007 |
| WO | WO-2007134623 | 11/2007 |
| WO | WO-2008030608 | 3/2008 |
| WO | WO-2008031871 | 3/2008 |
| WO | WO-2008035831 | 3/2008 |
| WO | WO-2008041318 | 4/2008 |
| WO | WO-2008084211 | 7/2008 |
| WO | WO-2008146784 | 12/2008 |
| WO | WO-2009000043 | 12/2008 |
| WO | WO-2009012398 | 1/2009 |
| WO | WO-2009049331 | 4/2009 |
| WO | WO-2009054809 | 4/2009 |
| WO | WO-2009081593 | 7/2009 |
| WO | WO-2009086628 | 7/2009 |
| WO | WO-2009142880 | 11/2009 |
| WO | WO-2009158310 | 12/2009 |
| WO | WO-2010013609 | 2/2010 |
| WO | WO-2010024969 | 3/2010 |
| WO | WO-2010036660 | 4/2010 |
| WO | WO-2010041826 | 4/2010 |
| WO | WO-2010048229 | 4/2010 |
| WO | WO-2010048448 | 4/2010 |
| WO | WO-2010048519 | 4/2010 |
| WO | WO-2010080258 | 7/2010 |
| WO | WO-2010089980 | 8/2010 |
| WO | WO-2010092993 | 8/2010 |
| WO | WO-2010110613 | 9/2010 |
| WO | WO-2010117643 | 10/2010 |
| WO | WO-2010117661 | 10/2010 |
| WO | WO-2010119356 | 10/2010 |
| WO | WO-2010125451 | 11/2010 |
| WO | WO-2010134718 | 11/2010 |
| WO | WO-2010135155 | 11/2010 |
| WO | WO-2011041885 | 4/2011 |
| WO | WO-2011106467 | 9/2011 |
| WO | WO-2011106468 | 9/2011 |
| WO | WO-2011126501 | 10/2011 |
| WO | WO-2012087847 | 6/2012 |
| WO | WO-2012088485 | 6/2012 |
| WO | WO-2012091289 | 7/2012 |
| WO | WO-2012166188 | 12/2012 |
| WO | WO-2013158110 | 10/2013 |
| WO | WO-2014051920 | 4/2014 |
| WO | WO-2014085502 | 6/2014 |

OTHER PUBLICATIONS

"Corrected Notice of Allowance", U.S. Appl. No. 13/657,621, dated Oct. 31, 2016, 2 pages.
"Foreign Notice of Allowance", CN Application No. 201180071183.0, dated Sep. 27, 2016, 6 pages.
"Foreign Notice of Allowance", JP Application No. 2014-528371, dated Oct. 4, 2016, 4 pages.
"Foreign Office Action", Application No. MX/a/2013/013923, dated Sep. 13, 2016, 10 pages.
"Foreign Office Action", Application No. MX/a/2014/002507, dated Aug. 9, 2016, 7 pages.
"Foreign Office Action", AU Application No. 2011369365, dated Oct. 7, 2016, 3 pages.
"Foreign Office Action", AU Application No. 2011375741, dated Sep. 14, 2016, 4 pages.
"Foreign Office Action", AU Application No. 2011376310, dated Sep. 10, 2016, 3 pages.
"Foreign Office Action", AU Application No. 2011376311, dated Sep. 10, 2016, 3 pages.
"Non-Final Office Action", U.S. Appl. No. 14/918,358, dated Oct. 13, 2016, 9 pages.
"Corrected Notice of Allowance", U.S. Appl. No. 13/228,931, dated Dec. 29, 2016, 2 pages.
"Final Office Action", U.S. Appl. No. 13/228,945, dated Jan. 12, 2017, 23 pages.
"Foreign Office Action", AU Application No. 2011369362, dated Nov. 15, 2016, 3 pages.
"Foreign Office Action", AU Application No. 2011369370, dated Oct. 10, 2016, 3 pages.
"Foreign Office Action", AU Application No. 2011369370, dated Dec. 5, 2016, 4 pages.
"Foreign Office Action", AU Application No. 2011376310, dated Nov. 7, 2016, 3 pages.
"Foreign Office Action", PH Application No. 1-2013-502364, dated Dec. 23, 2016, 2 pages.
"Microsoft Windows XP—File and Folder Permissions", Retrieved from<<https://web.archive.org/web/20110211034655/http://www.microsoft.com/resources/documentation/windows/xp/all/proddocs/en-us/acl_folder_permissions.mspx?mfr=true>, Feb. 11, 2011, 1 page.
"Non-Final Office Action", U.S. Appl. No. 14/586,364, dated Dec. 28, 2016, 7 pages.
"Notice of Allowance", U.S. Appl. No. 13/118,314, dated Jan. 11, 2017, 10 pages.
"Notice of Allowance", U.S. Appl. No. 13/550,432, dated Jan. 3, 2017, 5 pages.
"Restriction Requirement", U.S. Appl. No. 14/558,666, dated Jan. 13, 2017, 6 pages.
"Corrected Notice of Allowance", U.S. Appl. No. 14/919,607, dated May 30, 2017, 2 pages.
"Foreign Notice of Allowance", AU Application No. 2011376310, dated Apr. 28, 2017, 3 pages.
"Foreign Notice of Allowance", CN Application No. 201210085754.2, dated May 31, 2017, 4 pages.
"Foreign Office Action", IL Application No. 229140, dated Apr. 26, 2017, 6 pages.
"Foreign Office Action", KR Application No. 10-2013-7031472, dated Jun. 22, 2017, 5 pages.
"Non-Final Office Action", U.S. Appl. No. 13/228,876, dated Jun. 15, 2017, 27 pages.
"Non-Final Office Action", U.S. Appl. No. 13/228,945, dated Jun. 30, 2017, 16 pages.
"Final Office Action", U.S. Appl. No. 13/118,302, dated Mar. 25, 2016, 22 pages.
"Final Office Action", U.S. Appl. No. 2014-529685, dated Apr. 5, 2016, 6 pages.
"Foreign Notice of Allowance", CN Application No. 201210317470.1, dated Feb. 23, 2016, 4 pages.
"Foreign Notice of Allowance", CN Application No. 201210331584.1, dated Feb. 14, 2016, 4 pages.
"Foreign Notice of Allowance", RU Application No. 2013152636, dated Feb. 19, 2016, 18 pages.
"Foreign Office Action", EP Application No. 11866579.3, dated Apr. 5, 2016, 4 pages.
"Foreign Office Action", EP Application No. 11866699.9, dated Feb. 3, 2016, 4 pages.
"Foreign Office Action", IL Application No. 229622, dated Feb. 15, 2016, 6 pages.

(56) References Cited

OTHER PUBLICATIONS

"Foreign Office Action", JP Application No. 2014-512820, dated Mar. 22, 2016, 5 pages.
"iOS Human Interface Guidelines", Apple Inc, Retrieved at <<https://itunes.apple.com/in/book/ics-human-interface-guidelines/id877942287?mt=11>>, Mar. 23, 2011, 2 pages.
"Non-Final Office Action", U.S. Appl. No. 13/228,707, dated Apr. 19, 2016, 26 pages.
"Non-Final Office Action", U.S. Appl. No. 13/228,931, dated Mar. 24, 2016, 22 pages.
"Non-Final Office Action", U.S. Appl. No. 14/522,420, dated Apr. 22, 2016, 21 pages.
"Notice of Allowance", U.S. Appl. No. 14/059,163, dated Apr. 25, 2016, 7 pages.
Budiu,"Usability of iPad Apps and Websites", Retrieved at<<https://tdougher.expressions.syr.edu/wrt307fall12/files/2012/08/ipad-usability_report_1st-edition-1.pdf>>, Dec. 31, 2010, 98 pages.
"Final Office Action", U.S. Appl. No. 13/118,181, dated Jun. 16, 2016, 18 pages.
"Foreign Notice of Allowance", CN Application No. 201210331670.2, dated Apr. 26, 2016, 4 pages.
"Foreign Notice of Allowance", RU Application No. 2014107906, dated Apr. 25, 2016, 18 pages.
"Foreign Office Action", CN Application No. 201110454251.3, dated May 27, 2016, 6 Pages.
"Foreign Office Action", CN Application No. 201180071190.0, dated May 17, 2016, 7 pages.
"Foreign Office Action", CN Application No. 201210085754.2, dated Apr. 5, 2016, 16 pages.
"Foreign Office Action", CN Application No. 201210331670.2, dated Dec. 1, 2015, 14 pages.
"Foreign Office Action", JP Application No. 2014-512824, dated Jun. 7, 2016, 6 pages.
"Foreign Office Action", PH Application No. 1-2013-502367, dated Jun. 15, 2016, 2 pages.
"Non-Final Office Action", U.S. Appl. No. 13/118,221, dated May 19, 2016, 14 pages.
"Non-Final Office Action", U.S. Appl. No. 13/228,876, dated May 12, 2016, 20 pages.
"Non-Final Office Action", U.S. Appl. No. 13/550,432, dated Jun. 16, 2016, 18 pages.
"Non-Final Office Action", U.S. Appl. No. 14/850,347, dated Jun. 16, 2016, 26 pages.
"Notice of Allowance", U.S. Appl. No. 12/983,106, dated Jun. 6, 2016, 17 pages.
"Corrected Notice of Allowance", U.S. Appl. No. 14/919,607, dated May 8, 2017, 2 pages.
"Final Office Action", U.S. Appl. No. 13/118,302, dated May 4, 2017, 43 pages.
"Final Office Action", U.S. Appl. No. 14/918,359, dated May 17, 2017, 7 pages.
"Foreign Office Action", IL Application No. 229621, dated Feb. 20, 2017, 6 pages.
"Non-Final Office Action", U.S. Appl. No. 14/558,666, dated May 4, 2017, 13 pages.
"Corrected Notice of Allowance", U.S. Appl. No. 14/919,607, dated Aug. 21, 2017, 2 pages.
"Foreign Notice of Allowance", CN Application No. 201110454251.3, dated Aug. 7, 2017, 6 pages.
"Foreign Office Action", Application No. MX/a/2014/002781, dated Jun. 23, 2017, 8 pages.
"Foreign Office Action", CA Application No. 2835931, dated Jun. 28, 2017, 5 pages.
"Foreign Office Action", EP Application No. 11866579.3, dated Jul. 10, 2017, 4 pages.
"Non-Final Office Action", U.S. Appl. No. 14/529,341, dated Aug. 10, 2017, 27 pages.
"Non-Final Office Action", U.S. Appl. No. 14/800,391, dated Aug. 16, 2017, 14 pages.
"Notice of Allowance", U.S. Appl. No. 14/918,358, dated Sep. 1, 2017, 5 pages.
"Notice of Allowance", U.S. Appl. No. 14/918,359, dated Sep. 7, 2017, 5 pages.
"Supplemental Notice of Allowance", U.S. Appl. No. 14/918,358, dated Sep. 15, 2017, 2 pages.
"Corrected Notice of Allowance", U.S. Appl. No. 14/659,442, dated Nov. 27, 2015, 2 pages.
"Final Office Action", U.S. Appl. No. 14/059,163, dated Dec. 3, 2015, 6 pages.
"Foreign Office Action", CL Application No. 3370-2013, dated Oct. 29, 2015, 6 pages.
"Foreign Office Action", RU Application No. 2013152630, dated Oct. 26, 2015, 5 pages.
"Foreign Office Action", RU Application No. 2013152634, dated Oct. 22, 2015, 7 pages.
"Foreign Office Action", RU Application No. 2013152636, dated Oct. 16, 2015, 11 pages.
"Foreign Office Action", RU Application No. 2014108844, dated Oct. 27, 2015, 6 pages.
"Foreign Office Action", RU Application No. 2014108997, dated Oct. 14, 2015, 6 pages.
"Non-Final Office Action", U.S. Appl. No. 13/118,292, dated Dec. 7, 2015, 32 pages.
Sakumi,"Browse/Creation Tool for Hierarchy Contents with Concept Pad System: Zoomable User Interface", In Lecture Note/Software Science 23 Interactive System and Software VIII, Dec. 20, 1999, 8 pages.
Stein,"Growing Beautiful Code in BioPerl", In Beautiful Code—Leading Programmers Explain How They Think, Oreilly, 2007, 32 pages.
Toshiyuki,"User Interaction Technique for Mobile Terminal (First Part)—Display Interaction Technique—Information Processing", In Information Processing Society of Japan, vol. 48, No. 6, Jun. 15, 2007, 12 pages.
"Final Office Action", U.S. Appl. No. 13/118,314, dated Jan. 13, 2016, 16 pages.
"Final Office Action", U.S. Appl. No. 13/657,621, dated Jan. 21, 2016, 21 pages.
"Foreign Notice of Allowance", JP Application No. 2014-512819, dated Jan. 26, 2016, 4 pages.
"Foreign Office Action", CN Application No. 201180071183.0, dated Jan. 28, 2016, 18 pages.
"Foreign Office Action", CN Application No. 201180071190.0, dated Jan. 26, 2016, 16 pages.
"Foreign Office Action", CN Application No. 201180071194.9, dated Nov. 27, 2015, 17 pages.
"Foreign Office Action", EP Application No. 11866772.4, dated Feb. 2, 2016, 5 pages.
"Foreign Office Action", EP Application No. 1866699.9, dated Feb. 3, 2016, 4 pages.
"Foreign Office Action", PH Application No. 12013502355, dated Jan. 19, 2016, 5 pages.
"Foreign Office Action", PH Application No. 1-2013-502364, dated Jan. 19, 2016, 4 pages.
"International Search Report and Written Opinion", Application No. PCT/US2015/048751, dated Nov. 27, 2015, 12 pages.
"Notice of Allowance", U.S. Appl. No. 13/073,300, dated Feb. 12, 2016, 9 pages.
"Notice of Allowance", U.S. Appl. No. 13/658,694, dated Jan. 7, 2016, 20 pages.
"Foreign Notice of Allowance", JP Application No. 2014-512821, dated Jun. 28, 2016, 4 pages.
"Foreign Notice of Allowance", JP Application No. 2014-529687, dated May 31, 2016, 4 pages.
"Foreign Notice of Allowance", RU Application No. 2014108997, dated May 26, 2016, 17 pages.
"Foreign Notice of Allowance", TW Application No. 100136568, dated May 31, 2016, 4 pages.
"Foreign Office Action", AU Application No. 2011369360, dated Jul. 23, 2016, 3 pages.
"Foreign Office Action", IL Application No. 229140, dated May 8, 2016, 6 pages.

(56) References Cited

OTHER PUBLICATIONS

"Foreign Office Action", JP Application No. 2014-528371, dated Jun. 7, 2016, 5 pages.
"Foreign Office Action", RU Application No. 2014108844, dated Jun. 23, 2016, 6 pages.
"Non-Final Office Action", U.S. Appl. No. 13/118,314, dated Jun. 30, 2016, 16 pages.
"Non-Final Office Action", U.S. Appl. No. 13/228,945, dated Jul. 21, 2016, 20 pages.
"Examiner's Answer to Appeal Brief", U.S. Appl. No. 13/224,258, dated Sep. 23, 2016, 12 pages.
"Final Office Action", U.S. Appl. No. 13/118,292, dated Aug. 26, 2016, 38 pages.
"Final Office Action", U.S. Appl. No. 13/228,707, dated Aug. 23, 2016, 33 pages.
"Final Office Action", U.S. Appl. No. 13/228,876, dated Sep. 13, 2016, 21 pages.
"Foreign Notice of Allowance", RU Application No. 2013152634, dated Jul. 22, 2016, 19 pages.
"Foreign Office Action", AU Application No. 2011369370, dated Aug. 4, 2016, 3 pages.
"Foreign Office Action", EP Application No. 11866699.9, dated Sep. 20, 2016, 4 pages.
"Non-Final Office Action", U.S. Appl. No. 13/118,302, dated Aug. 12, 2016, 34 pages.
"Non-Final Office Action", U.S. Appl. No. 14/522,420, dated Aug. 15, 2016, 20 pages.
"Non-Final Office Action", U.S. Appl. No. 14/919,607, dated Sep. 23, 2016, 11 pages.
"Notice of Allowance", U.S. Appl. No. 13/228,931, dated Sep. 23, 2016, 10 pages.
"Notice of Allowance", U.S. Appl. No. 13/657,621, dated Aug. 26, 2016, 9 pages.
"Second Written Opinion", Application No. PCT/US2015/048751, dated Jul. 12, 2016, 5 pages.
"Corrected Notice of Allowance", U.S. Appl. No. 13/118,314, dated Mar. 9, 2017, 3 pages.
"Extended European Search Report", EP Application No. 11850624.5, dated Dec. 21, 2016, 9 pages.
"Final Office Action", U.S. Appl. No. 14/850,347, dated Dec. 23, 2016, 6 pages.
"Foreign Notice of Allowance", AU Application No. 2011369365, dated Jan. 25, 2017, 3 pages.
"Foreign Office Action", Application No. MX/a/2014/002781, dated Oct. 25, 2016, 5 pages.
"Foreign Office Action", CN Application No. 201110454251.3, dated Feb. 4, 2017, 7 pages.
"Foreign Office Action", EP Application No. 11867033.0, dated Feb. 8, 2017, 7 pages.
"How to Run iPhone Apps Full Screen on iPad Full Force—Quick Tip #8—iOS Vlog 35", Retrieved from <<https://www.youtube.com/watch?v=csccfh80QZ8>>, Jul. 31, 2010, 1 page.
"Corrected Notice of Allowance", U.S. Appl. No. 13/228,931, dated Nov. 30, 2016, 2 pages.
"Corrected Notice of Allowance", U.S. Appl. No. 13/657,621, dated Dec. 1, 2016, 3 pages.
"Foreign Notice of Allowance", CN Application No. 201180071190.0, dated Sep. 8, 2016, 6 pages.
"Foreign Notice of Allowance", JP Application No. 2014-512824, dated Oct. 18, 2016, 4 pages.
"Foreign Notice of Allowance", JP Application No. 2014-529685, dated Oct. 19, 2016, 4 pages.
"Foreign Office Action", EP Application No. 11866772.4, dated Nov. 21, 2016, 6 pages.
"Non-Final Office Action", U.S. Appl. No. 14/918,359, dated Nov. 22, 2016, 9 pages.
"Corrected Notice of Allowance", U.S. Appl. No. 13/118,314, dated Apr. 27, 2017, 2 pages.
"Final Office Action", U.S. Appl. No. 14/918,358, dated Apr. 27, 2017, 8 pages.
"Foreign Notice of Allowance", AU Application No. 2011375741, dated Feb. 1, 2017, 3 pages.
"Foreign Notice of Allowance", TW Application No. 105106514, dated Feb. 15, 2017, 4 pages.
"Foreign Office Action", CN Application No. 201180071193.4, dated Mar. 3, 2017, 10 pages.
"Foreign Office Action", EP Application No. 11866553.8, dated Feb. 8, 2017, 6 pages.
"Non-Final Office Action", U.S. Appl. No. 14/522,420, dated Apr. 28, 2017, 31 pages.
"Notice of Allowance", U.S. Appl. No. 14/586,364, dated Apr. 21, 2017, 9 pages.
"Notice of Allowance", U.S. Appl. No. 14/919,607, dated Apr. 14, 2017, 7 pages.
"Corrected Notice of Allowance", U.S. Appl. No. 14/918,358, dated Oct. 4, 2017, 2 pages.
"Corrected Notice of Allowance", U.S. Appl. No. 14/918,359, dated Oct. 4, 2017, 2 pages.
"Foreign Notice of Allowance", JP Application No. 2016-216574, dated Aug. 22, 2017, 4 pages.
"Foreign Office Action", CA Application No. 2,836,263, dated Aug. 28, 2017, 4 pages.
"Foreign Office Action", CA Application No. 2,846,505, dated Aug. 17, 2017, 5 pages.
"Foreign Office Action", CA Application No. 2,847,180, dated Aug. 17, 2017, 5 pages.
"Foreign Office Action", KR Application No. 10-2013-7031528, dated Sep. 13, 2017, 13 pages.
"Foreign Office Action", KR Application No. 10-2014-7005296, dated Sep. 15, 2017, 12 pages.
"Foreign Office Action", MY Application No. PI2013702227, dated Jul. 31, 2017, 3 pages.
"Non-Final Office Action", U.S. Appl. No. 13/118,292, dated Oct. 5, 2017, 50 pages.
Duino, "Google Testing Complete Redesign of 'My Apps' Section of Google Play, Includes Sort Option", Retrieved from <<https://9to5google.com/2017/02/03/google-testing-redesign-my-apps-section-google-play-sort-option/>, Feb. 3, 2017, 5 pages.
Vincent, "A First Look at the Google Play Store Redesign", Retrieved from. <<https://www.theverge.com/2015/10/16/9549121/google-play-redesign>, Oct. 16, 2015, 2 pages.
Welch, "Android Just Got Incredibly Good at Helping You Manage Your Apps", Retrieved from <<https://www.theverge.com/2017/4/19/15360278/android-my-apps-google-play-store-redesign-update-sort>, Apr. 19, 2017, 5 pages.
Whitwam, "[Update #2: 4.8.22] Latest Google Play Store 4.8.22 With PayPal Support, Simplified App Permissions, Bigger Buttons, and More [APK Download]", Retrieved from <<http://www.androidpolice.com/2014/07/15/google-rolling-out-play-store-v4-8-19-with-paypal-support-simplified-app-permissions-bigger-buttons-and-more-apk-download/>>, dated Jul. 15, 2014, 8 page.
"Corrected Notice of Allowance", U.S. Appl. No. 14/918,358, dated Nov. 13, 2017, 2 pages.
"Corrected Notice of Allowance", U.S. Appl. No. 14/918,359, dated Nov. 14, 2017, 2 pages.
"Final Office Action", U.S. Appl. No. 14/800,391, dated Dec. 21, 2017, 15 pages.
"Foreign Office Action", KR Application No. 10-2017-7026885, dated Dec. 19, 2017, 5 pages.
"Non-Final Office Action", U.S. Appl. No. 14/977,462, dated Dec. 7, 2017, 15 pages.
"A New Era in Visual Simulation", http://www.reality-xp.com/professional/files/Microsoft%20ESP/%20Datasheet.pdf, 2007, 2 pages.
"Adobe Acrobat 8 Standard User Guide", Adobe Systems Incorporated, 2007, pp. 34 & 36.
"Adobe Audition / Customizing Workspaces", Retrieved From: <http://help.adobe.com/en_US/audition/cs/using/WS9FA7B8D7-5991-4e05-B13C-4C85DAF1F051.html> Jul. 5, 2014, May 18, 2011, 6 Pages.
"Advisory Action", U.S. Appl. No. 12/414,382, dated Jan. 20, 2012, 3 pages.

(56) References Cited

OTHER PUBLICATIONS

"Advisory Action", U.S. Appl. No. 12/433,605, dated Apr. 5, 2012, 3 pages.

"Advisory Action", U.S. Appl. No. 12/709,376, dated Dec. 19, 2013, 2 pages.

"Airbender 2.0", Retrieved From: <http://www.newtrent.com/airbender-2-0-nt30b.html> Mar. 31, 2014, 2013, 2 Pages.

"Alltel Adds Dedicated Search Key to Phones", Retrieved from: <http://www.phonescoop.com/news/item.php?n=2159> on Nov. 26, 2008., Apr. 12, 2007, 2 Pages.

"Android 2.3 User's Guide", Aug.-2.3-103, Android mobile technology platform 2.3, Dec. 13, 2010, 380 pages.

"Apple Human Interface Guidelines: Windows", retrieved from <http://developer.apple.com/library/mac/#documentation/UserExperience/Conceptuai/AppleHIGuidelines/XHIGWindows/XHIGWindows.html> on Sep. 28, 2010, Aug. 20, 2009, 59 pages.

"Apple iPhone—8GB At&T", Retrieved from: <http://nytimes.com/smartphones/apple-iphone-8gb-at/4515-6452_7-32309245.html> on Nov. 20, 2008, Jun. 29, 2007, 11 pages.

"Apple Unibody MacBook Pro #MB991LL/A 2.53 GHz Intel Core 2 Duo", Retrieved from: <http://www.themacstore.com/parts/show/c-nmb3-mb991||_a> on Nov. 10, 2009, 2009, 12 pages.

"Application User Model IDs", Retrieved from: <http://msdn.microsoft.com/en-us/library/dd378459(VS.85).aspx> on Sep. 28, 2010, 2010, 6 pages.

"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., Nov. 11, 2008, 3 pages.

"Authoritative Dictionary of IEEE Standards Terms, 7th ed.", Definitions—processor, memory, and storage, 2000, 3 pages.

"Basics of Your Device: Get Familiar with the Home Screen", Nokia USA—How to—retrieved from <http://www.nokia.ca/get-support-and-software/product-support/c6-01/how-to#> on May 11, 2011, 3 pages.

"Blackberry office tools: Qwerty Convert", Retrieved from: <http://blackberrysoftwarelist.net/blackberry/download-software/blackberry-office/qwerty_convertaspx> on Nov. 20. 2008, Nov. 20, 2008, 1 page.

"Bluetooth 360 Rotating Removable Keyboard Case Cover Stand for iPad 2 3 4", Retrieved From: <http://www.ebay.com/itm/Bluetooth-360-Rotating-Removable-Keyboard-Case-Cover-Stand-for-iPad-2-3-4-/200999748037> Mar. 31, 2014, Mar. 19, 2014, 3 Pages.

"Borderless Window Option", retrieved from <http://forums.lotro.com/show1hread.php?89700-Borderless-window-option> on Sep. 28, 2010, Sep. 9, 2007, 9 pages.

"Calc4M", Retrieved from: <http://www.hellebo.com/Calc4M.html> on Dec. 11, 2008, Sep. 10, 2008, 4 Pages.

"Class ScrollView", Retrieved from: <http://www.blackberry.com/developers/docs/6.0.0api/net/rim/device/api/ui/ScrollView.htm I> on Sep. 28, 2010, 13 pages.

"CloseAll Closes All Open Program Windows in One Click", Guiding Tech.com, Retrieved from < https://web.archive.org/web/20100424072622/http://www.guidingtech.com/2470/close-open-program-windows-in-one-click> on Apr. 1, 2015, Apr. 24, 2010, 6 pages.

"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, 2009, 5 Pages.

"Corrected Notice of Allowance", U.S. Appl. No. 13/118,333, dated Jun. 1, 2015, 4 pages.

"Corrected Notice of Allowance", U.S. Appl. No. 13/118,333, dated Aug. 4, 2015, 4 pages.

"Corrected Notice of Allowance", U.S. Appl. No. 13/118,333, dated Sep. 14, 2015, 4 pages.

"Corrected Notice of Allowance", 13/656,574, dated Jan. 13, 2015, 4 pages.

"Corrected Notice of Allowance", U.S. Appl. No. 13/656,574, dated Dec. 12, 2014, 4 pages.

"Corrected Notice of Allowance", U.S. Appl. No. 13/656,639, dated Dec. 11, 2013, 3 pages.

"Corrected Notice of Allowance", U.S. Appl. No. 14/089,149, dated Feb. 20, 2015, 2 pages.

"Corrected Notice of Allowance", U.S. Appl. No. 14/109,779, dated Jul. 21, 2015, 2 pages.

"Daphne v1.47", retrieved from <http://www.drk.com.ar/daphne.php> on Nov. 18, 2011, 3 pages.

"Dell and Windows 7—The Wait Is Over", Retrieved from: <http://content.dell.com/us/en/corp/d/press-releases/2009-10-22-Dell-and-Windows-7.aspx> on Nov. 10, 2009, Oct. 22, 2009, 2 pages.

"Dial a number", Retrieved from: <http://www.phonespell.org/ialhelp.html> on Nov. 20, 2008, Nov. 20, 2008, 1 page.

"Display Control", Retrieved From: <http://www.portrait.com/technology/display-control.html> Jul. 4, 2014, Jun. 24, 2013, 5 Pages.

"DuoSense™ Multi-Touch Gestures", Retrieved from: <http://www.n-trig.com/Data/Uploads/Misc/DuoSenseMTG_final.pdf>, Jul. 2008, 4 pages.

"Elecont Quick Desktop 1.0.43", Retrieved from: <http://handheld.softpedia.com/get/System-Utilities/Launcher-Applications/Elecont-Quick-Desktop-72131.shtml> on May 5, 2009., Mar. 13, 2009, 2 pages.

"Email Notification for Microsoft Outlook and Outlook Express", Retrieved from: <http://www.contextmagic.com/express-notification/> on Sep. 29, 2010, Jul. 21, 2004, 3 pages.

"Enhanced IBM Power Systems Software and PowerVM Restructuring", IBM United States Announcement 208-082, dated Apr. 8, 2008, available at <http://www.ibm.com/common/ssi/rep_ca/2/897/ENUS208-082/ENUS208082.PDF>, Apr. 8, 2008, pp. 1-19.

"Ex Parte Mewherter, PTAB precedential decision", U.S. Appl. No. 10/685,192, dated May 8, 2013, 22 pages.

"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, Aug. 1, 2008, 14 pages.

"Extended European Search Report", EP Application No. 09818253.8, dated Apr. 10, 2012, 7 pages.

"Extended European Search Report", EP Application No. 09822736.6, dated Dec. 18, 2012, 7 pages.

"Extended European Search Report", EP Application No. 10762112.0, dated Aug. 2, 2013, 7 pages.

"Extended European Search Report", EP Application No. 11851985.9, dated Oct. 7, 2014, 6 pages.

"Extended European Search Report", EP Application No. 11866553.8, dated Dec. 9, 2014, 7 pages.

"Extended European Search Report", EP Application No. 11866579.3, dated Oct. 9, 2014, 7 pages.

"Extended European Search Report", EP Application No. 11866699.9, dated Jan. 15, 2015, 6 pages.

"Extended European Search Report", EP Application No. 11866745.0, dated Jan. 21, 2015, 10 pages.

"Extended European Search Report", EP Application No. 11866772.4, dated Jan. 15, 2015, 6 pages.

"Extended European Search Report", EP Application No. 11866939.9, dated Jan. 15, 2015, 8 pages.

"Extended European Search Report", EP Application No. 11867033.0, dated Nov. 27, 2014, 8 pages.

"Extended European Search Report", EP Application No. 11867076.9, dated Jan. 15, 2015, 8 pages.

"Extended European Search Report", EP Application No. 11871863.4, dated May 11, 2015, 8 pages.

"Extended European Search Report", EP Application No. 11871917.8, dated May 11, 2015, 9 pages.

"Extended European Search Report", EP Application No. 11872072.1, dated Jul. 28, 2015, 7 pages.

"Extended European Search Report", EP Application No. 11872137.2, dated Apr. 9, 2015, 12 pages.

(56) References Cited

OTHER PUBLICATIONS

"eXtreme Energy Conservation: Advanced Power-Saving Software for Wireless Devices", White Paper, Freescale Semiconductor, Inc., Document No. XTMENRGYCNSVWP, Rev #0, available at<http://www.freescale.com/files/32bit/doc/white_paper/XTMENRGYCNSVWP.pdf>, Feb. 2006, 15 pages.
"Final Office Action", U.S. Appl. No. 11/305,789, dated Apr. 1, 2009, 10 pages.
"Final Office Action", U.S. Appl. No. 11/502,264, dated Feb. 4, 2010, 15 pages.
"Final Office Action", U.S. Appl. No. 11/502,264, dated Mar. 29, 2013, 16 pages.
"Final Office Action", U.S. Appl. No. 11/502,264, dated Apr. 3. 2009, 9 pages.
"Final Office Action", U.S. Appl. No. 12/244,545, dated Dec. 7, 2011, 16 pages.
"Final Office Action", U.S. Appl. No. 12/244,545, dated Sep. 7, 2012, 23 pages.
"Final Office Action", U.S. Appl. No. 12/413,977, dated Nov. 17, 2011, 16 pages.
"Final Office Action", U.S. Appl. No. 12/414,382, dated Dec. 23, 2011, 7 pages.
"Final Office Action", U.S. Appl. No. 12/414,476, dated Apr. 8, 2013, 25 pages.
"Final Office Action", U.S. Appl. No. 12/414,476, dated Dec. 1, 2011, 20 pages.
"Final Office Action", U.S. Appl. No. 12/433,605, dated Jul. 17, 2013, 13 pages.
"Final Office Action", U.S. Appl. No. 12/433,605, dated Feb. 3, 2012, 11 pages.
"Final Office Action", U.S. Appl. No. 12/433,667, dated Jan. 7, 2013, 17 pages.
"Final Office Action", U.S. Appl. No. 12/433,667, dated Sep. 13, 2011, 17 pages.
"Final Office Action", U.S. Appl. No. 12/469,458, dated Feb. 1, 2013, 19 pages.
"Final Office Action", U.S. Appl. No. 12/469,458, dated Nov. 17, 2011, 15 pages.
"Final Office Action", U.S. Appl. No. 12/469,480, dated Apr. 10, 2013, 21 pages.
"Final Office Action", U.S. Appl. No. 12/469,480, dated Feb. 9, 2012, 17 pages.
"Final Office Action", U.S. Appl. No. 12/472,699, dated Jul. 29, 2013, 12 pages.
"Final Office Action", U.S. Appl. No. 12/472,699, dated Feb. 15, 2012, 12 pages.
"Final Office Action", U.S. Appl. No. 12/480,969, dated Nov. 23, 2012, 18 pages.
"Final Office Action", U.S. Appl. No. 12/480,969, dated Jul. 24, 2013, 19 pages.
"Final Office Action", U.S. Appl. No. 12/484,799, dated Apr. 30, 2012, 13 pages.
"Final Office Action", U.S. Appl. No. 12/560,081, dated Mar. 14, 2012, 16 pages.
"Final Office Action", U.S. Appl. No. 12/577,400, dated Jan. 30, 2014, 36 pages.
"Final Office Action", U.S. Appl. No. 12/577,400, dated Aug. 16, 2013, 25 pages.
"Final Office Action", U.S. Appl. No. 12/577,400, dated Sep. 14, 2012, 26 pages.
"Final Office Action", U.S. Appl. No. 12/695,842, dated Dec. 2, 2013, 17 pages.
"Final Office Action", U.S. Appl. No. 12/695,937, dated Jul. 26, 2012, 13 pages.
"Final Office Action", U.S. Appl. No. 12/695,976, dated Nov. 21, 2012, 10 pages.
"Final Office Action", U.S. Appl. No. 12/700,357, dated Oct. 24, 2012, 13 pages.
"Final Office Action", U.S. Appl. No. 12/700,460, dated Aug. 28, 2012, 26 pages.
"Final Office Action", U.S. Appl. No. 12/700,510, dated Oct. 10, 2012, 23 pages.
"Final Office Action", U.S. Appl. No. 12/709,204, dated Sep. 12, 2013, 24 pages.
"Final Office Action", U.S. Appl. No. 12/709,204, dated Oct. 3, 2012, 24 pages.
"Final Office Action", U.S. Appl. No. 12/709,245, dated Mar. 15, 2013, 16 pages.
"Final Office Action", U.S. Appl. No. 12/709,245, dated Jan. 6, 2012, 13 pages.
"Final Office Action", U.S. Appl. No. 12/709,282, dated Dec. 24, 2012, 11 pages.
"Final Office Action", U.S. Appl. No. 12/709,282, dated Jul. 16, 2013, 11 pages.
"Final Office Action", U.S. Appl. No. 12/709,301, dated Jan. 7, 2013, 14 pages.
"Final Office Action", U.S. Appl. No. 12/709,301, dated Sep. 3, 2013, 12 pages.
"Final Office Action", U.S. Appl. No. 12/709,301, dated Mar. 1, 2012, 11 pages.
"Final Office Action", U.S. Appl. No. 12/709,348, dated Jan. 7, 2013, 15 pages.
"Final Office Action", U.S. Appl. No. 12/709,348, dated Sep. 12, 2013, 12 pages.
"Final Office Action", U.S. Appl. No. 12/709,348, dated Feb. 17, 2012, 13 pages.
"Final Office Action", U.S. Appl. No. 12/709,376, dated Sep. 10, 2013, 12 pages.
"Final Office Action", U.S. Appl. No. 12/709,376, dated Nov. 8, 2012, 20 pages.
"Final Office Action", U.S. Appl. No. 12/709,376, dated Mar. 30, 2012, 16 pages.
"Final Office Action", U.S. Appl. No. 12/713,053, dated Aug. 17, 2012, 10 pages.
"Final Office Action", U.S. Appl. No. 12/713,081, dated May 9, 2012, 19 pages.
"Final Office Action", U.S. Appl. No. 12/713,096, dated Feb. 15, 2013, 7 pages.
"Final Office Action", U.S. Appl. No. 12/713,110, dated Jan. 17, 2013, 10 pages.
"Final Office Action", U.S. Appl. No. 12/713,113, dated Oct. 8, 2013, 21 pages.
"Final Office Action", U.S. Appl. No. 12/713,113, dated Jun. 4, 2012, 18 pages.
"Final Office Action", U.S. Appl. No. 12/713,118, dated Oct. 26, 2012, 10 pages.
"Final Office Action", U.S. Appl. No. 12/713,127, dated Jun. 6, 2012, 18 pages.
"Final Office Action", U.S. Appl. No. 12/713,130, dated Jun. 29, 2012, 8 pages.
"Final Office Action", U.S. Appl. No. 12/713,133, dated May 20, 2013, 10 pages.
"Final Office Action", U.S. Appl. No. 12/713,133, dated Jul. 2, 2012, 8 pages.
"Final Office Action", U.S. Appl. No. 12/721,422, dated Mar. 7, 2013, 10 pages.
"Final Office Action", U.S. Appl. No. 12/972,611, dated Oct. 11, 2013, 19 pages.
"Final Office Action", U.S. Appl. No. 12/972,967, dated Oct. 11, 2013, 21 pages.
"Final Office Action", U.S. Appl. No. 12/977,235, dated Apr. 22, 2015, 19 pages.
"Final Office Action", U.S. Appl. No. 12/983,106, dated Jul. 16, 2015, 23 pages.
"Final Office Action", U.S. Appl. No. 12/983,106, dated Oct. 7, 2013, 19 pages.
"Final Office Action", U.S. Appl. No. 13/073,300, dated Apr. 1, 2014, 14 pages.
"Final Office Action", U.S. Appl. No. 13/073,300, dated Sep. 4, 2015, 17 pages.
"Final Office Action", U.S. Appl. No. 13/118,181, dated Dec. 20, 2013, 18 pages.

(56) References Cited

OTHER PUBLICATIONS

"Final Office Action", U.S. Appl. No. 13/118,204, dated Nov. 21, 2013, 24 pages.
"Final Office Action", U.S. Appl. No. 13/118,221, dated Mar. 17, 2014, 21 pages.
"Final Office Action", U.S. Appl. No. 13/118,265, dated Nov. 6, 2014, 19 pages.
"Final Office Action", U.S. Appl. No. 13/118,288, dated Nov. 7, 2014, 14 pages.
"Final Office Action", U.S. Appl. No. 13/118,292, dated Dec. 5, 2014, 30 pages.
"Final Office Action", U.S. Appl. No. 13/118,302, dated Aug. 15, 2014, 17 pages.
"Final Office Action", U.S. Appl. No. 13/118,314, dated Sep. 11, 2014, 18 pages.
"Final Office Action", U.S. Appl. No. 13/118,321, dated Apr. 2, 2015, 30 pages.
"Final Office Action", U.S. Appl. No. 13/118,321, dated Dec. 19, 2013, 30 pages.
"Final Office Action", U.S. Appl. No. 13/118,333, dated Apr. 23, 2014, 22 pages.
"Final Office Action", U.S. Appl. No. 13/118,339, dated Aug. 22, 2013, 21 pages.
"Final Office Action", U.S. Appl. No. 13/118,347, dated Aug. 15, 2013, 25 pages.
"Final Office Action", U.S. Appl. No. 13/224,258, dated Jul. 18, 2014, 39 pages.
"Final Office Action", U.S. Appl. No. 13/224,258, dated Aug. 13, 2015, 39 pages.
"Final Office Action", U.S. Appl. No. 13/224,258, dated Sep. 11, 2013, 37 pages.
"Final Office Action", U.S. Appl. No. 13/228,707, dated May 21, 2014, 16 pages.
"Final Office Action", U.S. Appl. No. 13/228,707, dated Jun. 1, 2015, 20 pages.
"Final Office Action", U.S. Appl. No. 13/228,876, dated Jun. 19, 2015, 20 pages.
"Final Office Action", U.S. Appl. No. 13/228,876, dated Jul. 18, 2014, 15 pages.
"Final Office Action", U.S. Appl. No. 13/228,888, dated Oct. 24, 2014, 29 pages.
"Final Office Action", U.S. Appl. No. 13/228,931, dated Dec. 19, 2014, 27 pages.
"Final Office Action", U.S. Appl. No. 13/228,945, dated Oct. 23, 2014, 24 pages.
"Final Office Action", U.S. Appl. No. 13/229,155, dated Jun. 4, 2015, 16 pages.
"Final Office Action", U.S. Appl. No. 13/229,155, dated Jun. 12, 2014, 15 pages.
"Final Office Action", U.S. Appl. No. 13/229,693, dated Jan. 6, 2015, 24 pages.
"Final Office Action", U.S. Appl. No. 13/229,693, dated Sep. 4, 2013, 23 pages.
"Final Office Action", U.S. Appl. No. 13/229,702, dated Jan. 15, 2015, 24 pages.
"Final Office Action", U.S. Appl. No. 13/335,001, dated May 22, 2014, 19 pages.
"Final Office Action", U.S. Appl. No. 13/335,001, dated Oct. 21, 2014, 34 pages.
"Final Office Action", U.S. Appl. No. 13/335,001, dated Nov. 22, 2013, 18 pages.
"Final Office Action", U.S. Appl. No. 13/345,383, dated Jul. 25, 2014, 26 pages.
"Final Office Action", U.S. Appl. No. 13/345,383, dated Jul. 30, 2013, 27 pages.
"Final Office Action", U.S. Appl. No. 13/484,075, dated May 21, 2013, 10 pages.
"Final Office Action", U.S. Appl. No. 13/550,432, dated Sep. 14, 2015, 18 pages.
"Final Office Action", U.S. Appl. No. 13/598,422, dated Jun. 23, 2015, 19 pages.
"Final Office Action", U.S. Appl. No. 13/598,422, dated Aug. 6, 2014, 33 pages.
"Final Office Action", U.S. Appl. No. 13/655,386, dated Jun. 6, 2013, 34 pages.
"Final Office Action", U.S. Appl. No. 13/656,354, dated Jun. 17, 2013, 14 pages.
"Final Office Action", U.S. Appl. No. 13/656,574, dated Aug. 23, 2013, 20 pages.
"Final Office Action", U.S. Appl. No. 13/657,621, dated Jan. 15, 2015, 22 pages.
"Final Office Action", U.S. Appl. No. 13/657,621, dated Sep. 10, 2013, 18 pages.
"Final Office Action", U.S. Appl. No. 13/657,646, dated May 6, 2013, 12 pages.
"Final Office Action", U.S. Appl. No. 13/657,789, dated Jun. 21, 2013, 35 pages.
"Final Office Action", U.S. Appl. No. 13/658,694, dated Mar. 30, 2015, 30 pages.
"Final Office Action", U.S. Appl. No. 13/658,694, dated Oct. 30, 2013, 17 pages.
"First Examination Report", NZ Application No. 618254, dated May 20, 2014, 3 Pages.
"First Examination Report", NZ Application No. 618264, dated May 20, 2014, 2 pages.
"First Examination Report", NZ Application No. 618269, dated May 20, 2014, 2 pages.
"First Examination Report", NZ Application No. 618284, dated May 20, 2014, 2 pages.
"Foreign Office Action", CN Application No. 200980142644.1, dated Aug. 20, 2013, 9 Pages.
"Foreign Office Action", CN Application No. 200980142661.5, dated Sep. 24, 2013, 8 Pages.
"Foreign Office Action", JP Application No. 2011-533353, dated Jul. 5, 2013, 9 Pages.
"Foreign Notice of Acceptance", NZ Application No. 618254, dated Jan. 20, 2015, 1 Page.
"Foreign Notice of Acceptance", NZ Application No. 618264, dated Jun. 27, 2015, 1 Page.
"Foreign Notice of Acceptance", NZ Application No. 618269, dated Oct. 31, 2014, 1 Page.
"Foreign Notice of Allowance", CN Application No. 201110429183.5, dated Mar. 9, 2015, 4 pages.
"Foreign Notice of Allowance", CN Application No. 201110437542.1, dated Aug. 3, 2015, 4 Pages.
"Foreign Notice of Allowance", CN Application No. 201110437572.2, dated Mar. 3, 2015, 3 Pages.
"Foreign Office Action", CL Application No. 2379-2011, dated Jul. 3, 2013, 8 pages.
"Foreign Office Action", CL Application No. 3368-2013, dated May 7, 2015, 7 pages.
"Foreign Office Action", CL Application No. 3369-2013, dated May 7, 2015, 6 pages.
"Foreign Office Action", CL Application No. 3370-2013, dated May 7, 2015, 6 pages.
"Foreign Office Action", CN Application No. 200980139831.4, dated Jul. 1, 2013, 12 pages.
"Foreign Office Action", CN Application No. 200980142632.9, dated Jun. 14, 2013, 6 pages.
"Foreign Office Action", CN Application No. 200980142632.9, dated Jan. 29, 2013, 11 pages.
"Foreign Office Action", CN Application No. 200980142644.1, dated Apr. 3, 2013, 10 pages.
"Foreign Office Action", CN Application No. 200980142661.5, dated Jan. 21, 2013, 12 pages.
"Foreign Office Action", CN Application No. 201080015728.1, dated May 16, 2013, 10 pages.
"Foreign Office Action", CN Application No. 201080015728.1, dated Dec. 26, 2012, 9 pages.
"Foreign Office Action", CN Application No. 201080015788.3, dated Jun. 5, 2013, 12 Pages.

(56) References Cited

OTHER PUBLICATIONS

"Foreign Office Action", CN Application No. 201080015788.3, dated Dec. 24, 2012, 10 pages.
"Foreign Office Action", CN Application No. 201080023212.1, dated Dec. 5, 2012, 10 pages.
"Foreign Office Action", CN Application No. 201080023212.1, dated Jun. 5, 2013, 8 pages.
"Foreign Office Action", CN Application No. 201080045865.X, dated Dec. 4, 2012, 10 pages.
"Foreign Office Action", CN Application No. 201080045865.X, dated Jun. 4, 2013, 10 pages.
"Foreign Office Action", CN Application No. 201110044285.5, dated Apr. 24, 2013, 8 pages.
"Foreign Office Action", CN Application No. 201110044285.5, dated Jun. 20, 2012, 12 pages.
"Foreign Office Action", CN Application No. 201110044285.5, dated Jan. 4, 2013, 13 pages.
"Foreign Office Action", CN Application No. 201110046510.9, dated May 31, 2013, 11 pages.
"Foreign Office Action", CN Application No. 201110046519.X, dated Mar. 19, 2013, 12 pages.
"Foreign Office Action", CN Application No. 201110046519.X, dated Aug. 2, 2012, 13 pages.
"Foreign Office Action", CN Application No. 201110046529.3, dated Feb. 4, 2013, 9 pages.
"Foreign Office Action", CN Application No. 201110046529.3, dated Aug. 16, 2012, 14 pages.
"Foreign Office Action", CN Application No. 201110050499.3, dated Nov. 27, 2012, 8 pages.
"Foreign Office Action", CN Application No. 201110050499.3, dated Aug. 3, 2012, 8 pages.
"Foreign Office Action", CN Application No. 201110050506.X, dated Apr. 2, 2013, 11 pages.
"Foreign Office Action", CN Application No. 201110050508.9, dated Mar. 7, 2013, 8 pages.
"Foreign Office Action", CN Application No. 201110050508.9, dated Aug. 3, 2012, 8 pages.
"Foreign Office Action", CN Application No. 201110050852.8, dated Mar. 26, 2013, 11 pages.
"Foreign Office Action", CN Application No. 201110429183.5, dated Jan. 6, 2014, 10 Pages.
"Foreign Office Action", CN Application No. 201110429183.5, dated Aug. 21, 2014, 13 Pages.
"Foreign Office Action", CN Application No. 201110429236.3, dated Feb. 16, 2015, 7 Pages.
"Foreign Office Action", CN Application No. 201110429236.3, dated Aug. 13, 2014, 11 Pages.
"Foreign Office Action", CN Application No. 201110429236.3, dated Dec. 17, 2013, 10 Pages.
"Foreign Office Action", CN Application No. 201110437542.1, dated Jan. 6, 2014, 10 Pages.
"Foreign Office Action", CN Application No. 201110437542.1, dated Jan. 28, 2015, 7 pages.
"Foreign Office Action", CN Application No. 201110437542.1, dated Aug. 20, 2014, 8 pages.
"Foreign Office Action", CN Application No. 201110437551.0, dated Jan. 6, 2014, 10 pages.
"Foreign Office Action", CN Application No. 201110437551.0, dated Mar. 25, 2015, 9 pages.
"Foreign Office Action", CN Application No. 201110437572.2, dated Dec. 3, 2013, 7 pages.
"Foreign Office Action", CN Application No. 201110454251.3, dated Feb. 28, 2015, 9 Pages.
"Foreign Office Action", CN Application No. 201110454251.3, dated Oct. 21, 2014, 13 Pages.
"Foreign Office Action", CN Application No. 201110454251.3, dated Dec. 27, 2013, 12 Pages.
"Foreign Office Action", CN Application No. 201180071186.4, dated Jan. 20, 2015, 8 pages.
"Foreign Office Action", CN Application No. 201180071186.4, dated Jun. 2, 2015, 7 pages.
"Foreign Office Action", CN Application No. 201180071186.4, dated Jun. 13, 2014, 12 pages.
"Foreign Office Action", CN Application No. 201180071195.3, dated Mar. 18, 2015, 8 pages.
"Foreign Office Action", CN Application No. 201180071195.3, dated Aug. 25, 2014, 15 pages.
"Foreign Office Action", CN Application No. 201180071196.8, dated Sep. 11, 2014, 13 pages.
"Foreign Office Action", CN Application No. 201180071200.0, dated Feb. 17, 2015, 12 pages.
"Foreign Office Action", CN Application No. 201180071200.0, dated Aug. 19, 2014, 15 pages.
"Foreign Office Action", CN Application No. 201210317470.1, dated Feb. 11, 2015, 9 pages.
"Foreign Office Action", CN Application No. 201210317470.1, dated Jun. 5, 2014, 12 pages.
"Foreign Office Action", CN Application No. 201210317470.1, dated Aug. 24, 2015, 9 pages.
"Foreign Office Action", CN Application No. 201210331158.8, dated May 11, 2015, 7 pages.
"Foreign Office Action", CN Application No. 201210331158.8, dated Sep. 3, 2014, 16 Pages.
"Foreign Office Action", CN Application No. 201210331188.9, dated Oct. 10, 2014, 12 pages.
"Foreign Office Action", CN Application No. 201210331564.4, dated Dec. 3, 2014, 12 pages.
"Foreign Office Action", CN Application No. 201210331584.1, dated Aug. 19, 2015, 7 pages.
"Foreign Office Action", CN Application No. 201210331584.1, dated Nov. 3, 2014, 14 pages.
"Foreign Office Action", CN Application No. 201210331670.2, dated Mar. 25, 2015, 14 pages.
"Foreign Office Action", CN Application No. 201210331686.3, dated Mar. 3, 2015, 14 pages.
"Foreign Office Action", CN Application No. 201210331686.3, dated Jun. 13, 2014, 13 pages.
"Foreign Office Action", CN Application No. 201210331686.3, dated Sep. 1, 2015, 11 pages.
"Foreign Office Action", CO Application No. 13-298.756, dated Sep. 18, 2014, 13 Pages.
"Foreign Office Action", CO Application No. 13300256, dated Apr. 11, 2015, 8 Pages.
"Foreign Office Action", CO Application No. 13300256, dated Sep. 24, 2014, 8 Pages.
"Foreign Office Action", CO Application No. 13300259, dated Sep. 24, 2014, 15 Pages.
"Foreign Office Action", CO Application No. 13300265, dated Apr. 21, 2015, 11 Pages.
"Foreign Office Action", CO Application No. 13300265, dated Sep. 24, 2014, 10 Pages.
"Foreign Office Action", EP Application No. 10823883.3, dated Aug. 10, 2012, 5 pages.
"Foreign Office Action", EP Application No. 11747907.1, dated Jan. 28, 2013, 5 pages.
"Foreign Office Action", EP Application No. 11748026.9, dated Jan. 16, 2013, 5 pages.
"Foreign Office Action", EP Application No. 11748027.7, dated Jan. 18, 2013, 5 pages.
"Foreign Office Action", EP Application No. 11748028.5, dated Jan. 28, 2013, 5 pages.
"Foreign Office Action", EP Application No. 11748029.3, dated Jan. 16, 2013, 5 pages.
"Foreign Office Action", JP Application No. 2012-503523, dated Apr. 22, 2013, 5 Pages.
"Foreign Office Action", JP Application No. 2012-534255, dated Aug. 15, 2014, 6 Pages.
"Foreign Office Action", PH Application No. PH/1/2013/502367, dated Apr. 24, 2015, 3 pages.
"Freeware.mobi", Retrieved from: <http://www.palmfreeware.mobi/download-palette.html> on Nov. 6, 2008, Oct. 9, 2001, 2 pages.

(56) References Cited

OTHER PUBLICATIONS

"Further Examination Report", NZ Application No. 618264, dated Dec. 3, 2014, 3 Pages.
"Further Examination Report", NZ Application No. 618284, dated Jul. 13, 2015, 2 pages.
"Gestures Programming", Retrieved from <http://doc.qt.digia.com/4.6/gestures-overview.html> on May 28, 2014, 2010, 3 pages.
"GnomeCanvas", Retrieved from: <http://library.gnome.org/devel/libgnomecanvas/unstable/GnomeCanvas.html> on Sep. 28, 2010, 11 pages.
"Google Apps versus Office 365: Audit Logs", Retrieved From: <http://www.linkgard.com/blog/google-apps/google-apps-vs-office-365-audit-logs.html> Mar. 29, 2014, Jul. 23, 2013, 8 pages.
"Guidelines for Panning", Retrieved From: <http://msdn.microsoft.com/en-in/library/windows/apps/hh465310.aspx> Aug. 19, 2014, Dec. 9, 2012, 5 Pages.
"Heatmap", Retrieved From: <https://supportgoogle.com/drive/answer/91599?hl=en> Mar. 29, 2014, 2 Pages.
"How Do I Cancel a "Drag" Motion on an Android Seekbar?", retrieved from <http://stackoverflow.com/questions/2917969/how-do-i-cancel-a-drag-motion-on-an-android-seekbar> on Jun. 20, 2011, May 28, 2010, 1 page.
"How do I use Categories with my Weblog?", Retrieved from: <http://tpsupport.mtcs.sixapart.com/tp/us-tp1/how_do_i_use_categories_with_my_weblog.html> on Sep. 28, 2010, Sep. 16, 2009, 3 pages.
"How do you dial 1-800-FLOWERS", Retrieved from: <http://blogs.msdn.com/windowsmobile/archive/2007/02/06/how-do-you-dial-1-800-flowers.aspx> on Nov. 20, 2008, Feb. 6, 2007, 24 pages.
"How-to Close an Application in BlackBerry PlayBook?", retrieved from <http://stackoverflow.com/questions/5277027/how-to-close-an-application-in-blackberry-playbook> on Nov. 18, 2011, 2 pages.
"HTC Shows HTC Snap with Snappy Email Feature", Retrieved from: <http://www.wirelessandmobilenews.com/smartphones/ on May 5, 2009>, May 4, 2009, 10 Pages.
"Image Gestures Example", Retrieved from <http://doc.qt.digia.com/4.6/gestures-imagegestures.html> on May 28, 2014, 2010, 3 pages.
"IntelliScreen—New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, May 13, 2008, 11 pages.
"International Search Report and Written Opinion", Application No. PCT/US2010/028555, dated Oct. 12, 2010, 10 pages.
"International Search Report and Written Opinion", Application No. PCT/US2011/025132, dated Oct. 26, 2011, 10 pages.
"International Search Report and Written Opinion", Application No. PCT/US2011/025131, dated Oct. 31, 2011, 10 pages.
"International Search Report and Written Opinion", Application No. PCT/US2010/028699, dated Oct. 4, 2010, 10 pages.
"International Search Report and Written Opinion", Application No. PCT/US2013/059563, dated Nov. 7, 2013, 10 pages.
"International Search Report and Written Opinion", Application No. PCT/US2013/060247, dated Dec. 10, 2013, 10 pages.
"International Search Report and Written Opinion", Application No. PCT/US2011/067075, dated Dec. 12, 2012, 10 pages.
"International Search Report and Written Opinion", Application No. PCT/US2009/061864, dated May 14, 2010, 10 pages.
"International Search Report and Written Opinion", Application No. PCT/US2009/061382, dated May 26, 2010, 10 pages.
"International Search Report and Written Opinion", Application No. PCT/US2011/067074, dated Aug. 27, 2012, 10 pages.
"International Search Report and Written Opinion", Application No. PCT/US2011/055725, dated Sep. 27, 2012, 10 pages.
"International Search Report and Written Opinion", Application No. PCT/US2009/061735, dated Jun. 7, 2010, 11 pages.
"International Search Report and Written Opinion", Application No. PCT/US2013/055507, dated Oct. 8, 2013, 12 pages.
"International Search Report and Written Opinion", Application No. PCT/US2010/034772, dated Dec. 29, 2010, 12 pages.
"International Search Report and Written Opinion", Application No. PCT/CN2014/074788, dated Dec. 30, 2014, 12 pages.
"International Search Report and Written Opinion", Application No. PCT/US2011/025973, dated Oct. 27, 2011, 13 pages.
"International Search Report and Written Opinion", Application No. PCT/US/2011025972, dated Sep. 30, 2011, 14 pages.
"International Search Report and Written Opinion", Application No. PCT/US2011/025575, dated Sep. 30, 2011, 14 pages.
"International Search Report and Written Opinion", Application No. PCT/CN2014/074825, dated Jan. 5, 2015, 15 pages.
"International Search Report and Written Opinion", Application No. PCT/CN2014/074793, dated Sep. 30, 2014, 15 pages.
"International Search Report and Written Opinion", Application No. PCT/US2011/025971, dated Oct. 31, 2011, 15 pages.
"International Search Report and Written Opinion", Application No. PCT/US2012/047091, dated Dec. 27, 2012, 15 pages.
"International Search Report and Written Opinion", Application No. PCT/CN2014/074783, dated Dec. 31, 2014, 15 pages.
"International Search Report and Written Opinion", Application No. PCT/CN2014/075046, dated Oct. 28, 2014, 16 pages.
"International Search Report and Written Opinion", Application No. PCT/US2013/061066, dated Feb. 4, 2014, 17 pages.
"International Search Report and Written Opinion", Application No. PCT/US2009/065701, dated Aug. 24, 2012, 8 pages.
"International Search Report and Written Opinion", Application No. PCT/US2010/038730, dated Jan. 19, 2011, 8 pages.
"International Search Report and Written Opinion", Application No. PCT/US2011/020417, dated Oct. 20, 2011, 8 pages.
"International Search Report and Written Opinion", Application No. PCT/US2011/025974, dated Oct. 26, 2011, 8 pages.
"International Search Report and Written Opinion", Application No. PCT/US2011/055513, dated Mar. 27, 2012, 8 pages.
"International Search Report and Written Opinion", Application No. PCT/US2010/052119, dated May 2, 2011, 8 pages.
"International Search Report and Written Opinion", Application No. PCT/US2011/055514, dated May 22, 2012, 8 pages.
"International Search Report and Written Opinion", Application No. PCT/US2011/055512, dated May 24, 2012, 8 pages.
"International Search Report and Written Opinion", Application No. PCT/US2011/055520, dated May 9, 2012, 8 pages.
"International Search Report and Written Opinion", Application No. PCT/US2011/055524, dated Jun. 1, 2012, 8 pages.
"International Search Report and Written Opinion", Application No. PCT/US2011/065702, dated Aug. 29, 2012, 8 pages.
"International Search Report and Written Opinion", Application No. PCT/US2011/055736, dated Sep. 17, 2012, 8 pages.
"International Search Report and Written Opinion", Application No. PCT/US2011/067073, dated Sep. 17, 2012, 8 pages.
"International Search Report and Written Opinion", Application No. PCT/US2011/055511, dated Apr. 24, 2012, 9 pages.
"International Search Report and Written Opinion", Application No. PCT/US2011/055523, dated May 10, 2012, 9 pages.
"International Search Report and Written Opinion", Application No. PCT/US2011/055521, dated May 15, 2012, 9 pages.
"International Search Report and Written Opinion", Application No. PCT/US2011/055522, dated May 15, 2012, 9 pages.
"International Search Report and Written Opinion", Application No. PCT/US2011/020412, dated Aug. 31, 2011, 9 pages.
"International Search Report and Written Opinion", Application No. PCT/US2011/055496, dated Sep. 12, 2012, 9 pages.
"International Search Report and Written Opinion", Application No. PCT/US2011/055712, dated Sep. 21, 2012, 9 pages.
"International Search Report and Written Opinion", Application No. PCT/US2011/055493, dated 9/26/212, 9 pages.
"International Search Report and Written Opinion", Application No. PCT/US2011/020410, dated Sep. 27, 2011, 9 pages.
"International Search Report and Written Opinion", Application No. PCT/US2011/055478, dated Sep. 27, 2012, 9 pages.
"International Search Report and Written Opinion", Application No. PCT/US2011/055746, dated Sep. 27, 2012, 9 pages.
"International Search Report and Written Opinion", Application No. PCT/US2010/028553, Application Filing Date: Mar. 24, 2010, Nov. 9, 2010, 9 pages.

(56) References Cited

OTHER PUBLICATIONS

"Internet Explorer Window Restrictions", Retrieved from: http://technet.microsoft.com/en-us/library/cc759517(WS.10).aspx on Jun. 28, 2011, Microsoft TechNet, 5 pages.
"Introducing Application Styling for Windows Forms", Infragistics Software Manual, Version 7.3.20073.1043, Nov. 2007, 95 pages.
"Introduction to Windows Touch", Retrieved from: <http://download.microsoft.com/download/a/d/f/adf1347d-08dc-41a4-9084-623b1194d4b2/Win7_touch.docx>, Dec. 18, 2008, pp. 1-7.
"iPad User Guide", retrieved from <http://cyndidannerkuhn.info/CDK/iPads_Resources_files/iPad_User_Guide.pdf> on Jun. 17, 2011, 154 pages.
"iPod touch User Guide for iPhone Os 3.0 Software", Apple Inc., 2009, 153 pages.
"iQuery & Css Example—Dropdown Menu", DesignReviver, Retrieved from: <http://designreviver.com/tutorials/jquery-css-example-dropdown-menu/> on Nov. 22, 2011, Oct. 7, 2008, 30 pages.
"KDE 4.0 Visual Guide: Desktop", Retrieved From: http://kde.org/announcements/4.0/desktop/php, Nov. 23, 2011, 8 Pages.
"Keyboard (5)", Retrieved from: <http://landru.uwaterloo.ca/cgi-bin/man.cgi?section=5&topic=keyboard> on Dec. 11, 2008., Aug. 11, 1997, 8 Pages.
"Keyboard Case Adjustable 10inch Rotating Stand Bluetooth USB Apple Ipad 2 3", Retrieved From:<http://shopping.rediff.com/product/keyboard-case-adjustable-10inch-rotating-stand-bluetooth-usb-apple-ipad-2-3/11935954> Mar. 31, 2014, 2 Pages.
"Keyboard Shortcuts", Retrieved from: <http://www.pctoday.com/editorial/article.asp?article=articles%2F200513/02Ft0311%2F26t11%2F26t11.asp> on Aug. 3, 2009., Nov. 2005, 5 pages.
"KeyFolio Pro™ for iPad Air", Retrieved From:<http://www.kensington.com/kensington/us/us/s/3478/keyfolio-pro%E2%84%A2-for-ipad-aspx#.UxYF5P1dV8F> Feb. 26, 2014, Dec. 15, 2013, 2 Pages.
"Kiosk Browser Chrome Customization Firefox 2.x", Retrieved from: <http://stlouis-shopper.com/cgi-bin/mozdev-wiki/,pl?ChromeCustomization> on Oct. 22, 2008 Making a new chrome for the kiosk browser, Kiosk Project Kiosk Browser Chrome Customization Firefox-2.x, Aug. 16, 2007, 2 pages.
"Live Photo Gallery—Getting Started—from Camera to Panorama", Retrieved from: <http://webdotwiz.spaces.live.com/blog/cns!2782760752B93233!1729.entry> on May 5, 2009., Sep. 2008, 7 Pages.
"Logitech Ultrathin Keyboard Folio for iPad Air", Retrieved From: <http://store.apple.com/us/product/HE900VC/A/logitech-ultrathin-keyboard-folio-for-ipad-air> Mar. 28, 2014, 2013, 4 Pages.
"Magic mouse", Retrieved from: <http://www.apple.com/magicmouse/> on May 10, 2011, 3 pages.
"Manage Multiple Windows", Retrieved From: <http://windows.microsoft.com/en-hk/windows/manage-multiple-windows#1TC=windows-7> Jul. 8, 2014, 4 Pages.
"Meet ClamCase Pro", Retrieved From: <http://clamcase.com/bluetooth-ipad-keyboard-case.html?PID=6146810> Mar. 28, 2014, 6 Pages.
"MIDTB Tip Sheet: Book Courier", Retrieved from: <http://www.midtb.org/tipsbookcourier.htm> on Dec. 11, 2008., Sep. 26, 2005, 6 Pages.
"Mobile/UI/Designs/TouchScreen/workingUI", Retrieved from: <https://wiki.mozilla.org/Mobile/UI/Designs/TouchScreen/workingUI> on Oct. 26, 2009, 2009, 30 pages.
"MoGo beta v.0.4", Retrieved from: <http://forum.xda-developers.com/showthread.php?t=375196> on Sep. 27, 2010, Mar. 7, 2008, 10 pages.
"MS-Content-Zoom-Snap-Points Property", Retrieved From: <http://msdn.microsoft.com/en-us/library/windows/apps/hh441259.aspx> Aug. 22, 2014, 2 Pages.
"-MS-Scroll-Snap-Type Property", Retrieved From: <http://msdn.microsoft.com/en-In/library/windows/apps/hh466057.aspx> Aug. 19, 2014, 1 Page.
"Multi-touch", Retrieved from <http://en.wikipedia.org/wiki/Multi-touch#Microsoft_Surface> on Apr. 24, 2009, Apr. 17, 2009, 8 pages.
"My Favorite Gadgets, System Monitor II", Retrieved from <http://www.myfavoritegadgets.info/monitors/SystemMonitorII/systemmonitorII.html> on Mar. 12, 2013, Jun. 8, 2010, 5 pages.
"New Features in WhatsUp Gold v12.0", retrieved from <http://www.netbright.co.th/?name=product&file=readproduct&id=12> on Jun. 10, 2011, 4 pages.
"New iOS 8 Concept Lets You Expand Icons Into Widget Blocks", Retrieved From: <http://www.iclarified.com/41188/new-ios-8-concept-lets-you-expand-icons-into-widget-blocks-video> Jul. 16, 2014, May 30, 2014, 4 Pages.
"New MS Courier Leak Details Multi-Touch Interface", Retrieved from: <http://www.electronista.com/articles/09/11/04/courier.gestures.ui.explained/> on Nov. 10, 2009, Nov. 4, 2009, 9 pages.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., Jan. 27, 2006, 2 Pages.
"Non-Final Office Action", U.S. Appl. No. 13/228,707, dated Oct. 25, 2013, 12 pages.
"Non-Final Office Action", U.S. Appl. No. 13/228,888, dated Feb. 10, 2014, 21 pages.
"Non-Final Office Action", U.S. Appl. No. 11/215,052, dated Jun. 23, 2011, 17 pages.
"Non-Final Office Action", U.S. Appl. No. 11/305,789, dated Sep. 21, 2009, 5 pages.
"Non-Final Office Action", U.S. Appl. No. 11/502,264, dated Sep. 30, 2009, 15 pages.
"Non-Final Office Action", U.S. Appl. No. 11/502,264, dated Sep. 14, 2012, 14 pages.
"Non-Final Office Action", U.S. Appl. No. 12/244,545, dated Mar. 27, 2012, 18 pages.
"Non-Final Office Action", U.S. Appl. No. 12/244,545, dated Aug. 17, 2011, 15 pages.
"Non-Final Office Action", U.S. Appl. No. 12/413,977, dated Jul. 19, 2011, 17 pages.
"Non-Final Office Action", U.S. Appl. No. 12/413,977, dated Jul. 20, 2012, 18 pages.
"Non-Final Office Action", U.S. Appl. No. 12/414,382, dated Jul. 26, 2011, 9 pages.
"Non-Final Office Action", U.S. Appl. No. 12/414,434, dated Jan. 17, 2012, 7 pages.
"Non-Final Office Action", U.S. Appl. No. 12/414,434, dated May 31, 2012, 7 pages.
"Non-Final Office Action", U.S. Appl. No. 12/414,434, dated Aug. 2, 2011, 6 pages.
"Non-Final Office Action", U.S. Appl. No. 12/414,455, dated Aug. 29, 2011, 8 pages.
"Non-Final Office Action", U.S. Appl. No. 12/414,458, dated Jul. 6, 2011, 8 pages.
"Non-Final Office Action", U.S. Appl. No. 12/414,476, dated Nov. 9, 2012, 22 pages.
"Non-Final Office Action", U.S. Appl. No. 12/414,476, dated Aug. 3, 2011, 21 pages.
"Non-Final Office Action", U.S. Appl. No. 12/433,605, dated Jan. 11, 2013, 7 pages.
"Non-Final Office Action", U.S. Appl. No. 12/433,605, dated Jun. 24, 2011, 10 pages.
"Non-Final Office Action", U.S. Appl. No. 12/433,667, dated Jun. 7, 2011, 15 pages.
"Non-Final Office Action", U.S. Appl. No. 12/433,667, dated Feb. 3, 2012, 16 pages.
"Non-Final Office Action", U.S. Appl. No. 12/469,419, dated Nov. 9, 2011, 15 pages.
"Non-Final Office Action", U.S. Appl. No. 12/469,419, dated May 23, 2012, 13 pages.
"Non-Final Office Action", U.S. Appl. No. 12/469,458, dated May 3, 2013, 21 pages.
"Non-Final Office Action", U.S. Appl. No. 12/469,458, dated Jul. 1, 2011, 15 pages.
"Non-Final Office Action", U.S. Appl. No. 12/469,458, dated Sep. 21, 2012, 14 pages.
"Non-Final Office Action", U.S. Appl. No. 12/469,480, dated Aug. 27, 2013, 22 pages.

(56) References Cited

OTHER PUBLICATIONS

"Non-Final Office Action", U.S. Appl. No. 12/469,480, dated Oct. 17, 2012, 16 pages.
"Non-Final Office Action", U.S. Appl. No. 12/469,480, dated Sep. 22, 2011, 14 pages.
"Non-Final Office Action", U.S. Appl. No. 12/470,558, dated Nov. 22, 2011, 9 pages.
"Non-Final Office Action", U.S. Appl. No. 12/472,699, dated Mar. 28, 2013, 10 pages.
"Non-Final Office Action", U.S. Appl. No. 12/472,699, dated Oct. 23, 2013, 14 pages.
"Non-Final Office Action", U.S. Appl. No. 12/472,699, dated Sep. 12, 2011, 12 pages.
"Non-Final Office Action", U.S. Appl. No. 12/480,969, dated Apr. 4, 2013, 22 pages.
"Non-Final Office Action", U.S. Appl. No. 12/480,969, dated Aug. 7, 2012, 15 pages.
"Non-Final Office Action", U.S. Appl. No. 12/484,799, dated Aug. 11, 2011, 12 pages.
"Non-Final Office Action", U.S. Appl. No. 12/484,799, dated Aug. 7, 2012, 13 pages.
"Non-Final Office Action", U.S. Appl. No. 12/484,845, dated Dec. 7, 2011, 16 pages.
"Non-Final Office Action", U.S. Appl. No. 12/560,081, dated Dec. 7, 2011, 16 pages.
"Non-Final Office Action", U.S. Appl. No. 12/577,400, dated Apr. 15, 2013, 25 pages.
"Non-Final Office Action", U.S. Appl. No. 12/577,400, dated Oct. 8, 2013, 24 pages.
"Non-Final Office Action", U.S. Appl. No. 12/577,400, dated Apr. 11, 2012, 22 pages.
"Non-Final Office Action", U.S. Appl. No. 12/695,842, dated May 22, 2013, 16 pages.
"Non-Final Office Action", U.S. Appl. No. 12/695,842, dated Oct. 3, 2012, 16 pages.
"Non-Final Office Action", U.S. Appl. No. 12/695,937, dated Apr. 25, 2012, 14 pages.
"Non-Final Office Action", U.S. Appl. No. 12/695,976, dated Sep. 11, 2012, 8 pages.
"Non-Final Office Action", U.S. Appl. No. 12/700,357, dated Jul. 2, 2012, 10 pages.
"Non-Final Office Action", U.S. Appl. No. 12/700,460, dated Jan. 13, 2012, 21 pages.
"Non-Final Office Action", U.S. Appl. No. 12/700,510, dated Feb. 7, 2012, 20 pages.
"Non-Final Office Action", U.S. Appl. No. 12/709,204, dated Jun. 6, 2013, 27 pages.
"Non-Final Office Action", U.S. Appl. No. 12/709,204, dated Nov. 20, 2013, 31 pages.
"Non-Final Office Action", U.S. Appl. No. 12/709,204, dated May 10, 2012, 20 pages.
"Non-Final Office Action", U.S. Appl. No. 12/709,245, dated May 30, 2013, 15 pages.
"Non-Final Office Action", U.S. Appl. No. 12/709,245, dated Nov. 30, 2011, 11 pages.
"Non-Final Office Action", U.S. Appl. No. 12/709,245, dated Mar. 21, 2012, 14 pages.
"Non-Final Office Action", U.S. Appl. No. 12/709,282, dated Feb. 28, 2013, 11 pages.
"Non-Final Office Action", U.S. Appl. No. 12/709,282, dated Oct. 10, 2013, 12 pages.
"Non-Final Office Action", U.S. Appl. No. 12/709,282, dated Apr. 12, 2012, 9 pages.
"Non-Final Office Action", U.S. Appl. No. 12/709,301, dated May 14, 2013, 14 pages.
"Non-Final Office Action", U.S. Appl. No. 12/709,301, dated Oct. 24, 2013, 11 pages.
"Non-Final Office Action", U.S. Appl. No. 12/709,301, dated Nov. 28, 2011, 9 pages.
"Non-Final Office Action", U.S. Appl. No. 12/709,301, dated Sep. 13, 2012, 13 pages.
"Non-Final Office Action", U.S. Appl. No. 12/709,348, dated Apr. 25, 2013, 15 pages.
"Non-Final Office Action", U.S. Appl. No. 12/709,348, dated Dec. 20, 2013, 9 pages.
"Non-Final Office Action", U.S. Appl. No. 12/709,348, dated Dec. 7, 2011, 12 pages.
"Non-Final Office Action", U.S. Appl. No. 12/709,348, dated Aug. 2, 2012, 14 pages.
"Non-Final Office Action", U.S. Appl. No. 12/709,376, dated May 23, 2013, 17 pages.
"Non-Final Office Action", U.S. Appl. No. 12/709,376, dated Jan. 23, 2012, 14 pages.
"Non-Final Office Action", U.S. Appl. No. 12/709,376, dated Aug. 17, 2012, 17 pages.
"Non-Final Office Action", U.S. Appl. No. 12/713,053, dated Nov. 23, 2012, 13 pages.
"Non-Final Office Action", U.S. Appl. No. 12/713,053, dated Feb. 3, 2012, 8 pages.
"Non-Final Office Action", U.S. Appl. No. 12/713,081, dated Nov. 29, 2012, 9 pages.
"Non-Final Office Action", U.S. Appl. No. 12/713,081, dated Dec. 23, 2011, 18 pages.
"Non-Final Office Action", U.S. Appl. No. 12/713,096, dated Jan. 30, 2014, 23 pages.
"Non-Final Office Action", U.S. Appl. No. 12/713,096, dated Jun. 26, 2013, 8 pages.
"Non-Final Office Action", U.S. Appl. No. 12/713,096, dated Jun. 6, 2012, 9 pages.
"Non-Final Office Action", U.S. Appl. No. 12/713,110, dated May 3, 2013, 10 pages.
"Non-Final Office Action", U.S. Appl. No. 12/713,110, dated Jun. 21, 2012, 21 pages.
"Non-Final Office Action", U.S. Appl. No. 12/713,113, dated Apr. 23, 2013, 18 pages.
"Non-Final Office Action", U.S. Appl. No. 12/713,113, dated Dec. 22, 2011, 20 pages.
"Non-Final Office Action", U.S. Appl. No. 12/713,118, dated Jun. 8, 2012, 7 pages.
"Non-Final Office Action", U.S. Appl. No. 12/713,127, dated Jan. 31, 2014, 21 pages.
"Non-Final Office Action", U.S. Appl. No. 12/713,127, dated Dec. 27, 2011, 22 pages.
"Non-Final Office Action", U.S. Appl. No. 12/713,130, dated Jan. 16, 2013, 5 pages.
"Non-Final Office Action", U.S. Appl. No. 12/713,130, dated Jan. 23, 2012, 7 pages.
"Non-Final Office Action", U.S. Appl. No. 12/713,133, dated Jan. 14, 2013, 8 pages.
"Non-Final Office Action", U.S. Appl. No. 12/713,133, dated Jan. 31, 2012, 7 pages.
"Non-Final Office Action", U.S. Appl. No. 12/713,133, dated Dec. 10, 2013, 8 pages.
"Non-Final Office Action", U.S. Appl. No. 12/721,422, dated Oct. 1, 2012, 7 pages.
"Non-Final Office Action", U.S. Appl. No. 12/972,611, dated Mar. 13, 2013, 31 pages.
"Non-Final Office Action", U.S. Appl. No. 12/972,611, dated Aug. 20, 2014, 26 pages.
"Non-Final Office Action", U.S. Appl. No. 12/972,967, dated Jan. 30, 2013, 19 pages.
"Non-Final Office Action", U.S. Appl. No. 12/972,967, dated Nov. 6, 2014, 17 pages.
"Non-Final Office Action", U.S. Appl. No. 12/977,235, dated Jun. 24, 2014, 15 pages.
"Non-Final Office Action", U.S. Appl. No. 12/977,584, dated Dec. 7, 2012, 8 pages.
"Non-Final Office Action", U.S. Appl. No. 12/978,184, dated Jan. 23, 2013, 7 pages.
"Non-Final Office Action", U.S. Appl. No. 12/983,106, dated Sep. 10, 2014, 19 pages.

(56) References Cited

OTHER PUBLICATIONS

"Non-Final Office Action", U.S. Appl. No. 12/983,106, dated Nov. 9, 2012, 17 pages.
"Non-Final Office Action", U.S. Appl. No. 13/073,300, dated Apr. 30, 2015, 15 pages.
"Non-Final Office Action", U.S. Appl. No. 13/073,300, dated Jul. 25, 2013, 13 pages.
"Non-Final Office Action", U.S. Appl. No. 13/118,181, dated Mar. 4, 2013, 22 pages.
"Non-Final Office Action", U.S. Appl. No. 13/118,204, dated Feb. 28, 2013, 13 pages.
"Non-Final Office Action", U.S. Appl. No. 13/118,221, dated Mar. 1, 2013, 22 pages.
"Non-Final Office Action", U.S. Appl. No. 13/118,257, dated Mar. 5, 2013, 19 pages.
"Non-Final Office Action", U.S. Appl. No. 13/118,265, dated Jun. 10, 2014, 13 pages.
"Non-Final Office Action", U.S. Appl. No. 13/118,265, dated Aug. 20, 2015, 18 pages.
"Non-Final Office Action", U.S. Appl. No. 13/118,288, dated Jul. 2, 2014, 17 pages.
"Non-Final Office Action", U.S. Appl. No. 13/118,288, dated Aug. 24, 2015, 19 pages.
"Non-Final Office Action", U.S. Appl. No. 13/118,292, dated Jun. 6, 2014, 25 pages.
"Non-Final Office Action", U.S. Appl. No. 13/118,302, dated Mar. 4, 2014, 10 pages.
"Non-Final Office Action", U.S. Appl. No. 13/118,314, dated Feb. 27, 2014, 13 pages.
"Non-Final Office Action", U.S. Appl. No. 13/118,314, dated Jun. 19, 2015, 23 pages.
"Non-Final Office Action", U.S. Appl. No. 13/118,321, dated Jun. 10, 2013, 32 pages.
"Non-Final Office Action", U.S. Appl. No. 13/118,321, dated Sep. 8, 2015, 34 pages.
"Non-Final Office Action", U.S. Appl. No. 13/118,321, dated Nov. 12, 2014, 33 pages.
"Non-Final Office Action", U.S. Appl. No. 13/118,333, dated Jul. 5, 2013, 18 pages.
"Non-Final Office Action", U.S. Appl. No. 13/118,339, dated Feb. 11, 2013, 15 pages.
"Non-Final Office Action", U.S. Appl. No. 13/118,339, dated Dec. 10, 2014, 16 pages.
"Non-Final Office Action", U.S. Appl. No. 13/118,347, dated Feb. 12, 2013, 14 pages.
"Non-Final Office Action", U.S. Appl. No. 13/118,347, dated Dec. 3, 2014, 28 pages.
"Non-Final Office Action", U.S. Appl. No. 13/196,272, dated Feb. 6, 2013, 10 pages.
"Non-Final Office Action", U.S. Appl. No. 13/196,272, dated Sep. 3, 2013, 5 pages.
"Non-Final Office Action", U.S. Appl. No. 13/224,258, dated Jan. 8, 2013, 35 pages.
"Non-Final Office Action", U.S. Appl. No. 13/228,707, dated Nov. 13, 2014, 20 pages.
"Non-Final Office Action", U.S. Appl. No. 13/228,876, dated Jan. 29, 2015, 18 pages.
"Non-Final Office Action", U.S. Appl. No. 13/228,876, dated Nov. 22, 2013, 14 pages.
"Non-Final Office Action", U.S. Appl. No. 13/228,931, dated Apr. 7, 2014, 21 pages.
"Non-Final Office Action", U.S. Appl. No. 13/228,945, dated Apr. 14, 2014, 22 pages.
"Non-Final Office Action", U.S. Appl. No. 13/229,155, dated Jan. 7, 2015, 14 pages.
"Non-Final Office Action", U.S. Appl. No. 13/229,155, dated Nov. 18, 2013, 14 pages.
"Non-Final Office Action", U.S. Appl. No. 13/229,556, dated Mar. 28, 2014, 12 pages.
"Non-Final Office Action", U.S. Appl. No. 13/229,693, dated Mar. 12, 2013, 21 pages.
"Non-Final Office Action", U.S. Appl. No. 13/229,693, dated Apr. 23, 2015, 28 pages.
"Non-Final Office Action", U.S. Appl. No. 13/229,693, dated Jun. 20, 2014, 25 pages.
"Non-Final Office Action", U.S. Appl. No. 13/229,702, dated Jul. 3, 2014, 28 pages.
"Non-Final Office Action", U.S. Appl. No. 13/229,709, dated Apr. 7, 2014, 12 pages.
"Non-Final Office Action", U.S. Appl. No. 13/335,001, dated Apr. 1, 2015, 25 pages.
"Non-Final Office Action", U.S. Appl. No. 13/335,001, dated Aug. 7, 2014, 20 pages.
"Non-Final Office Action", U.S. Appl. No. 13/335,001, dated Sep. 13, 2013, 15 pages.
"Non-Final Office Action", U.S. Appl. No. 13/335,001, dated Jan. 8, 2014, 17 pages.
"Non-Final Office Action", U.S. Appl. No. 13/345,263, dated Oct. 24, 2013, 19 Pages.
"Non-Final Office Action", U.S. Appl. No. 13/345,383, dated Feb. 14, 2014, 26 pages.
"Non-Final Office Action", U.S. Appl. No. 13/345,383, dated Jan. 29, 2015, 5 pages.
"Non-Final Office Action", U.S. Appl. No. 13/345,383, dated Feb. 28, 2013, 25 pages.
"Non-Final Office Action", U.S. Appl. No. 13/484,075, dated Jan. 15, 2013, 9 pages.
"Non-Final Office Action", U.S. Appl. No. 13/492,495, dated Dec. 19, 2012, 6 pages.
"Non-Final Office Action", U.S. Appl. No. 13/492,495, dated Sep. 17, 2012, 8 pages.
"Non-Final Office Action", U.S. Appl. No. 13/550,432, dated Apr. 27, 2015, 15 pages.
"Non-Final Office Action", U.S. Appl. No. 13/598,422, dated Feb. 21, 2014, 31 pages.
"Non-Final Office Action", U.S. Appl. No. 13/598,422, dated Mar. 5, 2015, 17 pages.
"Non-Final Office Action", U.S. Appl. No. 13/655,386, dated Dec. 26, 2012, 23 pages.
"Non-Final Office Action", U.S. Appl. No. 13/655,390, dated Dec. 17, 2012, 12 pages.
"Non-Final Office Action", U.S. Appl. No. 13/656,354, dated Feb. 6, 2013, 10 pages.
"Non-Final Office Action", U.S. Appl. No. 13/656,574, dated Jan. 31, 2013, 21 pages.
"Non-Final Office Action", U.S. Appl. No. 13/656,639, dated Feb. 7, 2013, 29 pages.
"Non-Final Office Action", U.S. Appl. No. 13/657,621, dated Feb. 7, 2013, 19 pages.
"Non-Final Office Action", U.S. Appl. No. 13/657,621, dated Jul. 18, 2014, 22 pages.
"Non-Final Office Action", U.S. Appl. No. 13/657,646, dated Aug. 12, 2014, 14 pages.
"Non-Final Office Action", U.S. Appl. No. 13/657,646, dated Jan. 3, 2013, 13 pages.
"Non-Final Office Action", U.S. Appl. No. 13/657,789, dated Jan. 9, 2013, 38 pages.
"Non-Final Office Action", U.S. Appl. No. 13/658,694, dated Feb. 13, 2014, 19 pages.
"Non-Final Office Action", U.S. Appl. No. 13/658,694, dated Apr. 26, 2013, 13 pages.
"Non-Final Office Action", U.S. Appl. No. 13/658,694, dated Aug. 14, 2014, 26 pages.
"Non-Final Office Action", U.S. Appl. No. 13/863,369, dated Feb. 27, 2015, 16 pages.
"Non-Final Office Action", U.S. Appl. No. 13/904,880, dated May 4, 2015, 22 pages.
"Non-Final Office Action", U.S. Appl. No. 14/059,163, dated Aug. 10, 2015, 5 pages.
"Non-Final Office Action", U.S. Appl. No. 14/089,149, dated Nov. 3, 2014, 8 pages.

(56) References Cited

OTHER PUBLICATIONS

"Non-Final Office Action", U.S. Appl. No. 14/109,779, dated Nov. 21, 2014, 9 pages.
"Non-Final Office Action", U.S. Appl. No. 14/659,442, dated Jul. 7, 2015, 7 pages.
"Normalizing Text: A Java Tutorial by Oracle", Retrieved from: <http://docs.oracle.com/javase/tutorial/i18n/text/normalizerapi.html> on Apr. 8, 2014, Nov. 11, 2006, 3 pages.
"Notice of Allowance", U.S. Appl. No. 11/215,052, dated Mar. 14, 2012, 5 pages.
"Notice of Allowance", U.S. Appl. No. 11/305,789, dated Nov. 23, 2009, 8 pages.
"Notice of Allowance", U.S. Appl. No. 12/414,382, dated Apr. 4, 2012, 4 pages.
"Notice of Allowance", U.S. Appl. No. 12/414,434, dated Aug. 17, 2012, 4 pages.
"Notice of Allowance", U.S. Appl. No. 12/414,455, dated Jan. 4, 2012, 4 pages.
"Notice of Allowance", U.S. Appl. No. 12/414,458, dated Oct. 31, 2011, 2 pages.
"Notice of Allowance", U.S. Appl. No. 12/414,458, dated Nov. 29, 2011, 2 pages.
"Notice of Allowance", U.S. Appl. No. 12/414,458, dated Aug. 10, 2011, 6 pages.
"Notice of Allowance", U.S. Appl. No. 12/433,667, dated Jun. 25, 2013, 14 pages.
"Notice of Allowance", U.S. Appl. No. 12/469,419, dated Nov. 27, 2012, 13 pages.
"Notice of Allowance", U.S. Appl. No. 12/470,558, dated Apr. 2, 2012, 7 pages.
"Notice of Allowance", U.S. Appl. No. 12/470,558, dated Aug. 23, 2012, 2 pages.
"Notice of Allowance", U.S. Appl. No. 12/472,699, dated May 2, 2014, 6 pages.
"Notice of Allowance", U.S. Appl. No. 12/484,799, dated Oct. 22, 2012, 10 pages.
"Notice of Allowance", U.S. Appl. No. 12/484,845, dated Mar. 16, 2012, 5 pages.
"Notice of Allowance", U.S. Appl. No. 12/695,064, dated Mar. 28, 2012, 12 pages.
"Notice of Allowance", U.S. Appl. No. 12/695,959, dated Apr. 17, 2012, 13 pages.
"Notice of Allowance", U.S. Appl. No. 12/713,053, dated Jun. 7, 2013, 7 pages.
"Notice of Allowance", U.S. Appl. No. 12/713,110, dated Dec. 4, 2013, 13 pages.
"Notice of Allowance", U.S. Appl. No. 12/713,130, dated Feb. 19, 2013, 5 pages.
"Notice of Allowance", U.S. Appl. No. 12/713,133, dated Jan. 17, 2014, 4 pages.
"Notice of Allowance", U.S. Appl. No. 12/721,422, dated Jul. 11, 2013, 9 pages.
"Notice of Allowance", U.S. Appl. No. 12/977,584, dated Jun. 19, 2013, 5 pages.
"Notice of Allowance", U.S. Appl. No. 12/978,184, dated Nov. 6, 2013, 5 pages.
"Notice of Allowance", U.S. Appl. No. 12/978,184, dated Aug. 2, 2013, 5 pages.
"Notice of Allowance", U.S. Appl. No. 13/118,204, dated Jul. 8, 2014, 8 pages.
"Notice of Allowance", U.S. Appl. No. 13/118,333, dated May 4, 2015, 16 pages.
"Notice of Allowance", U.S. Appl. No. 13/118,339, dated Mar. 31, 2015, 7 pages.
"Notice of Allowance", U.S. Appl. No. 13/118,347, dated Apr. 1, 2015, 7 pages.
"Notice of Allowance", U.S. Appl. No. 13/196,272, dated Nov. 8, 2013, 8 pages.
"Notice of Allowance", U.S. Appl. No. 13/229,556, dated Sep. 2, 2014, 12 pages.
"Notice of Allowance", U.S. Appl. No. 13/229,693, dated Sep. 14, 2015, 13 pages.
"Notice of Allowance", U.S. Appl. No. 13/229,702, dated Apr. 29, 2015, 7 pages.
"Notice of Allowance", U.S. Appl. No. 13/229,709, dated Sep. 2, 2014, 4 pages.
"Notice of Allowance", U.S. Appl. No. 13/345,383, dated May 18, 2015, 5 pages.
"Notice of Allowance", U.S. Appl. No. 13/492,495, dated Apr. 26, 2013, 5 pages.
"Notice of Allowance", U.S. Appl. No. 13/655,386, dated Apr. 25, 2014, 6 pages.
"Notice of Allowance", U.S. Appl. No. 13/655,390, dated May 24, 2013, 5 pages.
"Notice of Allowance", U.S. Appl. No. 13/656,574, dated Sep. 23, 2014, 7 pages.
"Notice of Allowance", U.S. Appl. No. 13/656,639, dated Aug. 19, 2013, 14 pages.
"Notice of Allowance", U.S. Appl. No. 13/657,646, dated Feb. 6, 2015, 15 pages.
"Notice of Allowance", U.S. Appl. No. 13/657,789, dated Aug. 4, 2014, 16 pages.
"Notice of Allowance", U.S. Appl. No. 14/089,149, dated Dec. 5, 2014, 4 pages.
"Notice of Allowance", U.S. Appl. No. 14/109,779, dated Jun. 17, 2015, 4 pages.
"Notice of Allowance", U.S. Appl. No. 14/659,442, dated Aug. 19, 2015, 4 pages.
"Notifications", retrieved from <http://msdn.microsoft.com/en-us/library/aa511497.aspx> on May 10, 2011, 16 pages.
"OmneMon™ System Resource Metrics", retrieved from <http://www.omnesys.com/documents/OmneMonSRM_Brochure.pdf> on Jun. 10, 2011, 3 pages.
"ONYX Graphics Announces New ONYX Prepedge Job Preparation Software", retrieved from <http://www.largeformatreview.com/rip-software/433-onyx-graphics-announces-new-onyx-> on May 10, 2011, 2 pages.
"Oracle Mobile Sales Assistant User Guide for BlackBerry", Retrieved from <http://download.oracle.com/docs/cd/E12547_01/books/PDF/MobileSalesAsstBB.pdf.>, Nov. 2008, 20 pages.
"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., Dec. 1999, 8 pages.
"Oracle8i Application Developer's Guide—Advanced Queuing", Retrieved from: http://www.cs.umbc.edu/help/oracle8/server.815/a68005/03_adq1i.htm on May 6, 2009., Feb. 1999, 29 Pages.
"Oracle8i Concepts Release 8.1.5", Retrieved from: http://www.cs.umbc.edu/help/oracle8/server.815/a67781/c16queue.htm on May 6, 2009., Feb. 1999, 10 Pages.
"Organize Your Desktop Workspace for More Comfort with WindowSpace", Retrieved From: <http://www.ntwind.com/software/windowspace.html> Jul. 4, 2014, Sep. 19, 2008, 5 Pages.
"Palette Extender 1.0.2", Retrieved from: <http://palette-extender.en.softonic.com/symbian> on Nov. 6, 2008, Jan. 21, 2003, 2 pages.
"Parallax Scrolling", Retrieved from: <http://en.wikipedia.org/wiki/Parallax_scrolling> on May 5, 2009., May 4, 2009, 3 Pages.
"Purple Swivel Rotating Stand Case Cover Wireless Bluetooth Keyboard for iPad Air", Retrieved From: <http://www.ebay.com/itm/Purple-Swivel-Rotating-Stand-Case-Cover-Wireless-Bluetooth-Keyboard-for-iPad-Air-/400686726944> Mar. 31, 2014, Mar. 2014, 9 Pages.
"Push Notifications Overview for Windows Phone", Retrieved from: <http://msdn.microsoft.com/en-us/library/ff402558%28VS.92%29.aspx> on Sep. 30, 2010, Sep. 3, 2010, 1 page.
"QNX Photon microGUI Windowing System", Retrieved from: <http://www.qnx.com/developers/docs/6.5.0/index.jsp?topic=%2Fcom.qnx.doc.photon_prog_guide%2Fdragndrop.html> on Apr. 6, 2014, 22 pages.
"QODE Ultimate Keyboard Case for iPad (4th & 3rd gen) and iPad 2", Available at: <http://www.belkin.com/us/p/P-F5L149/>, Mar. 28, 2013, 8 pages.
"QPinchGesture Class Reference", Retrieved from <http://doc.qt.digia.com/4.6/qpinchgesture.html> on May 28, 2014, 2010, 6 pages.

(56) References Cited

OTHER PUBLICATIONS

"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., Jul. 15, 2005, 5 Pages.
"Rename a file", Retrieved from <http://windows.microsoft.com/en-us/windows7/rename-a-file> on Apr. 27, 2015, Aug. 24, 2009, 1 page.
"Restriction Requirement", U.S. Appl. No. 13/118,265, dated Feb. 27, 2014, 7 pages.
"Restriction Requirement", U.S. Appl. No. 13/118,288, dated Mar. 4, 2014, 7 pages.
"Restriction Requirement", U.S. Appl. No. 13/658,694, dated Feb. 6, 2013, 6 pages.
"Search Report", CN Application No. 201110437551.0, dated Dec. 23, 2013, 2 pages.
"SecureMe—Anti-Theft Security Application for S60 3rd", Retrieved from: <http:/www.killermobile.com/newsite/mobile-software/s60-applications/secureme-%11-anti%11theft-security-application-for-s60-3rd.htm> on Jun. 28, 2011, Dec. 15, 2008, 3 pages.
"Shottrack for Windows VoD Software Analysis", Retrieved From: http://www.matrixconsult.com.au/ MATRIX_Web_Files/ShotTrack_ Software_Manual.pdf, Nov. 23, 2011, 47 Pages.
"SizeUp The Missing Window Manager", Retrieved From: <https://www.irradiatedsoftware.com/sizeup/> Jul. 4, 2014, Jan. 17, 2013, 4 Pages.
"SmartView Tiling User Guide", Available At: <http://dealers.savantav.com/portal/SavantSandbox/Released%20User%20Guides/009-1108-00%20SmartView%20Tiling%20User%20Guide.pdf>, Jan. 2014, 25 Pages.
"Snap", Windows 7 Features—retrieved from <http://windows.microsoft.com/en-US/windows7/products/features/snap> on Sep. 23, 2011, 2 pages.
"Split the Windows® Desktop: How to Divide a Single Large Desktop into Multiple Smaller Ones", retrieved from <http://www.actualtools.com/multiplemonitors/split-windows-desktop-how-to-divide-single-large-desktop-into-smaller-ones.shtml> on Jul. 7, 2014, Apr. 10, 2014, 3 pages.
"Supplemental Notice of Allowance", U.S. Appl. No. 12/433,667, dated Aug. 1, 2013, 2 pages.
"Supplemental Notice of Allowance", U.S. Appl. No. 12/713,133, dated Feb. 3, 2014, 2 pages.
"Supplemental Notice of Allowance", U.S. Appl. No. 12/977,584, dated Sep. 16, 2013, 2 pages.
"Supplemental Notice of Allowance", U.S. Appl. No. 12/977,584, dated Oct. 11, 2013, 2 pages.
"Supplemental Notice of Allowance", U.S. Appl. No. 12/978,184, dated Feb. 25, 2014, 2 pages.
"Supplemental Notice of Allowance", U.S. Appl. No. 13/118,204, dated Sep. 10, 2014, 2 pages.
"Supplemental Notice of Allowance", U.S. Appl. No. 13/118,204, dated Oct. 2, 2014, 2 pages.
"Supplemental Notice of Allowance", U.S. Appl. No. 13/118,204, dated Oct. 23, 2014, 3 pages.
"Supplemental Notice of Allowance", U.S. Appl. No. 13/655,390, dated Sep. 19, 2013, 2 pages.
"Supplemental Notice of Allowance", U.S. Appl. No. 13/655,390, dated Jul. 25, 2013, 2 pages.
"Supplemental Notice of Allowance", U.S. Appl. No. 13/656,574, dated Feb. 25, 2015, 4 pages.
"Supplemental Notice of Allowance", U.S. Appl. No. 14/089,149, dated Mar. 20, 2015, 2 pages.
"Supplementary European Search Report", EP Application No. 11747907.1, dated Nov. 7, 2012, 3 pages.
"Supplementary European Search Report", EP Application No. 11748027.7, dated Nov. 29, 2012, 3 pages.
"Supplementary European Search Report", EP Application No. 11748028.5, dated Nov. 7, 2012, 3 pages.
"Supplementary European Search Report", EP Application No. 10823883.3, dated Jul. 31, 2012, 3 pages.
"Switch between Windows of the Same App", Retrieved from <http://www.ntwind.com/software/vistaswitcher/instance-switcher.html> on Feb. 20, 2013, May 12, 2012, 2 pages.
"Symbian Applications", Retrieved from: <http://symbianfullversion.blogspot.com/2008_12_01_archive.html> on May 5, 2009., Jan. 2009, 51 Pages.
"TaskOS", AppBrain retrieved from <http://www.appbrain.com/app/taskos/com.profete162.TaskOS> on 11/18/211, 2 pages.
"The Map Screen", retrieved from <http://www.symbianos.org/whereamiusersguide> on Jun. 17, 2011, 3 pages.
"The Start Menu (overview)", retrieved from <http://web.archive.org/web/20101219151141/http://www.windows.microsoft.com/en-US/windows-vista/The-Start-menu-overview> on Feb. 12, 2013, Dec. 19, 2010, 5 pages.
"ThumbJot", Retrieved form <http://thumbjot.com/wp/?page_id=8>, 2008, 2 pages.
"Tiles and Notifications for Windows Phone", Retrieved From: <http://msdn.microsoft.com/en-us/library/windowsphone/develop/jj662933.aspx> Apr. 1, 2014, Mar. 11, 2014, 2 Pages.
"Top 3 Task Switchers for Android", TechCredo—retrieved from <http://www.techcredo.com/android/top-3-task-switchers-for-android> on May 11, 2011, Mar. 9, 2011, 5 pages.
"Top Android App: Swipepad", Best Android Apps Review—retrieved from <http://www.bestandroidappsreview.com/2011/01/top-android-app-swipepad-launcher.html> on May 11, 2011, 4 pages.
"Touch Shell Free", Retrieved from: <http://www.pocketpcfreeware.mobi/download-touch-shell-free.html> on May 5, 2009., Feb. 23, 2009, 2 Pages.
"UI Guidelines Version 2.1", Retrieved from: http://na.blackberry.com/eng/deliverables/6622/BlackBerry_Smartphones-US.pdf., 76 Pages.
"User Guide", retrieved from <http://wireframesketcher.com/help/help.html> on Jun. 17, 2011, 19 pages.
"Vista—User Experiences: Site-Centric Browsing on Windows", retrieved from <http://www.vistax64.com/vista-news/283040-user-experiences-site-centric-browsing-windows.html> on Sep. 28, 2010, 6 pages.
"What You Should Expect from the Windows 7 Beta", Retrieved From: http://www.howtogeek.com/howto/the-geek-blog/what-you-should-expect-from-the-windows-7-beta/, Nov. 23, 2011, 17 Pages.
"What's new in Excel 2013", Retrieved From: <http://office.microsoft.com/en-in/excel-help/what-s-new-in-excel-2013-HA102809308.aspx> Mar. 28, 2014, Oct. 30, 2012, 5 Pages.
"Window Desktop", Retrieved From: http://pjnicholson.com/windowsdesktop.htm, Nov. 23, 2011, 4 Pages.
"Window Frames", MSDN, retrieved from <http://msdn.microsoft.com/en-us/library/aa974173.aspx> on Sep. 28, 2010, 7 pages.
"Window Magnet", Retrieved From: <http://magnet.crowdcafe.com/> Jul. 4, 2014, Jun. 23, 2011, 2 Pages.
"Windows 8 Is Gorgeous, But Is It More Than Just a Shell? (Video)", retrieved from <http://techcrunch.com/2011/06/02/windows-8-gorgeous-shell-video/> on Jun. 20, 2011, Jun. 2, 2011, 6 pages.
"Windows Phone 7 (Push Notification)", retrieved from <http://unknownerror.net/2011-06/windows-phone-7-push-notification-36520> on Jul. 6, 2011, 4 pages.
"Windows Phone 7 Live Tiles", Retrieved from: <http://www.knowyourmobile.com/microsoft/windowsphone7/startscreen/640737/windows_phone_7_live_tiles.html> on May 11, 2011, Oct. 20, 2010, 3 pages.
"Winterface Review", Retrieved from: <http://www.mytodayscreen.com/winterface-review/> on Nov. 12, 2008, Jul. 9, 2008, 42 pages.
"Womma", Retrieved from: <http://www.womma.org/blog/links/wom-trends/> on May 5, 2009., 2007, 70 Pages.
"Working with Multiple Windows", MSOFFICE tutorial!—retrieved from <http://www.msoffice-tutorial.com/working-with-multiple-windows.php> on Sep. 23, 2011, 3 pages.
"Working with Windows", Retrieved From: http://h30097.www3hp.com/docs/base_doc/documentation/F40F html/AQ917BTE/docu_004.htm,, Nov. 23, 2011, 14 pages.
"Working with Windows", Retrieved From: <http://windows.microsoft.com/en-us/windows/working-with-windows#1TC=windows-7> Jul. 4, 2014, 10 Pages.

(56) References Cited

OTHER PUBLICATIONS

"You've Got Mail 1.4 Build", retrieved from <http://www.fileshome.com/Shows_Animation_Plays_Sound_Automatic_N . . . > on Jan. 6, 2010, Jun. 18, 2007, 2 pages.

"YUI 3: ScrollView [beta]", Retrieved from: <http://developer.yahoo.com/yui/3/scrollview/> on Sep. 28, 2010, 5 pages.

"ZAGGkeys PROfolio+ Keyboard", Retrieved From: <http://www.zagg.com/accessories/zaggkeys-ipad-profolio-plus-keyboard-case/7063?cj_aid=10539646&cj_pid=6146810&cj_sid=fwn62ieocicw#7063?cj_aid=10539646&cj_pid=6146810&cj_sid=fwn62ieocicw&_suid=13959948728450884140834287934 2> Mar. 31, 2014, 2013, 9 pages.

Aguilar,"How to Run Multiple Instances of the Same App in Mac OS X", Retrieved from <http://operating-systems.wonderhowto.com/how-to/run-multiple-instances-same-app-mac-os-x-0140144/> on Feb. 20, 2013, Jan. 1, 2013, 4 Pages.

Al"Droptiles—Metro Style Live Tiles Enabled Web 2.0 Dashboard", Retrieved from <http://oazabir.github.com/Droptiles/> on Mar. 5, 2013, Jul. 18, 2012, 7 pages.

Alexander,"MeeGo Basics", retrieved from <http://meego.com/developers/ui-design-guidelines/handset/meego-basics> on Sep. 28, 2010, Jun. 29, 2010, 8 pages.

Anson,"Pining for Windows Phone 7 controls? We got ya covered! [Announcing the first release of the Silverlight for Windows Phone Toolkit!]", Retrieved from <http://blogs.msdn.com/b/delay/archive/2010/09/16/pining-for-windows-phone-7-controls-we-got-ya-covered-announcing-the-first-release-of-the-silverlight-for-windows-phone-toolkit.aspx> on May 30, 2014, Sep. 16, 2010, 17 pages.

Appleinsider,"Special Report: Apple's Touch-Sensitive iPod Ambitions Disclosed in Filing", Retrieved from: <http://www.appleinsider.com/articles/06/10/26/special_report_apples_touch_sensitive_ipod_ambitions_disclosed_in_filing.html> on Nov. 11, 2009, Oct. 26, 2006, 10 pages.

Ashraf,"Winsplit Revolution: Tile, Resize, and Position Windows for Efficient Use of Your Screen", Retrieved From: <http://dottech.org/11240/winsplit-revolution-tile-resize-and-position-windows-for-efficient-use-of-your-screen/> Jul. 8, 2014, Dec. 18, 2011, 4 Pages.

Banerjee,"Using Facebook, Twitter and Google Plus from a Single Browser Tab—A Complete Guide", Retrieved from: <http://www.ampercent.com/post-to-google-plus-facebook-twitter-one-location/9597/> on Feb. 15, 2012, Aug. 3, 2011, 11 pages.

Bates,"A Framework to Support Large-Scale Active Applications", University of Cambridge Computer Laboratory—Available at <http://citeseerx.ist.psu.edu/viewdoc/download?doi=10.1.1.48.1690&rep=rep1&type=pdf> , 1996, 8 pages.

Baweja,"OpenHeatMap: Create Heat Maps for Excel Spreadsheets With Geo Data", Retrieved From: <http://www.makeuseof.com/tag/openheatmap-create-heat-maps/> Mar. 29, 2014, Jul. 24, 2010, 4 Pages.

Bederson,"Implementing a Zooming User Interface: Experience Building Pad++", Software Practice & Experience, Wiley & Sons, Aug. 1998, 34 pages.

Bederson,"Jazz: An Extensible Zoomable User Interface Graphics Toolkit in Java", Proceedings of the 2000 ACM SIGCPR Conference, Apr. 2000, 11 pages.

Beiber,"Screen Coverage: A Pen-Interaction Problem for PDA's and Touch Screen Computers", In Proceedings of ICWMC 2007, Mar. 2007, 6 pages.

Bhatnagar,"Locate and Kill Annoying Processes in Windows", Trouble Fixers: All About Fixing Computer Troubles—retrieved from <http://www.troublefixers.com/locate-and-kill-annoying-processes-in-windows/> on Nov. 18, 2011, Apr. 19, 2010, 4 pages.

Bisson,"Windows 8 Developer Preview", Retrieved From: <http://www.zdnet.com/windows-8-developer-preview-3040093921/> Jul. 10, 2014, Sep. 13, 2011, 9 pages.

Bjork,"Redefining the Focus and Context of Focus+Context Visualizations", In Proceedings of INFOVIS 2000—Available at <http://www.johan.redstrom.se/papers/redefining.pdf>, Oct. 2000, 9 pages.

Blankenburg,"31 Days of Mango | Day #11: Live Tiles", Retrieved from <http://www.jeffblankenburg.com/2011/11/11/31-days-of-mango-day-11-live-tiles/> on Mar. 5, 2013, Nov. 11, 2011, 10 pages.

Bolton,"A Slide-out Keyboard on an Android tablet. Genius or total madness?", Retrieved From: <http://www.techradar.com/reviews/pc-mac/tablets/asus-eee-pad-slider-1036296/review> Mar. 31, 2014, Oct. 25, 2011, 8 pages.

Bowes,"Transparency for Item Highlighting", Faculty of Computing Science, Dalhousie University—Available at <http://torch.cs.dal.ca/~dearman/pubs/GI2003-bowes,dearman,perkins-paper.pdf>, 2003, 2 pages.

Brandl,"Combining and Measuring the Benefits of Bimanual Pen and Direct-Touch Interaction on Horizontal Interfaces", Retrieved from: <http://www.merl.com/papers/docs/TR2008-054.pdf> on Nov. 5, 2009, Mitsubishi Electric Research Laboratories, May 2008, 10 pages.

Bruzzese,"Using Windows 7, Managing and Monitoring Windows 7—Chapter 11", Que Publishing, May 5, 2010, 33 pages.

Buring,"User Interaction with Scatterplots on Small Screens—A Comparative Evaluation of Geometric-Semantic Zoom and Fisheye Distortion", IEEE Transactions on Visualization and Computer Graphics, vol. 12, Issue 5, Available at <http://citeseerx.ist.psu.edu/viewdoc/download?doi=10.1.1.134.4568&rep=rep1&type=pdf>, Sep. 2006, pp. 829-836.

Camick,"Wrap Layout", Java Tips Weblog, retrieved from <https://tips4java.wordpress.com/2008/11/06/wrap-layout/> on Jan. 11, 2015, Nov. 6, 2008, 28 pages.

Carrera,"Conserving Disk Energy in Network Servers", available at <http://citeseerx.ist.psu.edu/viewdoc/download?doi=10.1.1.6.8301&rep=rep1&type=ps>, Nov. 2002, 15 pages.

Cawley,"How to Customize Your Windows Phone 7", Retrieved from: <http://www.brighthub.com/mobile/windows-mobile-platform/articles/95213.aspx> on May 10, 2011, Nov. 12, 2010, 3 pages.

Cawley,"Windows Phone 7 Customization Tips and Tricks", retrieved from <http://www.brighthub.com/mobile/windows-mobile-platform/articles/95213.aspx> on Jun. 20, 2011, May 16, 2011, 2 pages.

Cohen,"Automatic Strategies in the Siemens RTL Tiled Window Manager", In Proceedings: The 2nd IEEE Conference on Computer Workstations, Mar. 7, 1988, pp. 111-119.

Cohen,"Wang Tiles for Image and Texture Generation", In Proceedings of SIGGRAPH 2003—Available <http://research.microsoft.com/en-us/um/people/cohen/WangFinal.pdf>, 2003, 8 pages.

Crouch,"Smartphone Wars: Micron's Slide-to-Unlock Patent", Jan. 30, 2013, 2 pages.

Damien,"7 Ways to Supercharge Multitasking in Android", retrieved from <http://maketecheasier.com/7-ways-to-supercharge-multitasking-in-android/2011/01/22/> on May 11, 2011, Jan. 22, 2011, 5 pages.

Daniels,"Brave New World", Retrieved from: <http://bookseller-association.blogspot.com/2009_03_01_archive.html> on Nov. 10, 2009, Mar. 2009, 54 pages.

Danish,"Win7sé Brings Mac-Like Screen Corners to Windows 7 & Windows 8", retrieved from <http://technomondo.com/2011/11/13/win7se-brings-mac-like-screen-corners-to-windows-7-windows8/> on Nov. 23, 2011, Nov. 13, 2011, 4 pages.

Davis,"A WPF Custom Control for Zooming and Panning", Retrieved from: <http://www.codeproject.com/KB/WPF/zoomandpancontrol.aspx> on Sep. 28, 2010, Jun. 29, 2010, 21 pages.

Delimarsky,"Sending Tile Push Notifications on Windows Phone 7", retrieved from <http://mobile.dzone.com/articles/sending-tile-push> on May 10, 2011, Aug. 25, 2010, 2 pages.

Denoue,"WebNC: Efficient Sharing of Web Applications", In Proceedings of WWW 2009—Available at <http://www.fxpal.com/publications/FXPAL-PR-09-495.pdf>, 2009, 2 pages.

Dernbach,"Mac OS 7.0", >http://www.mac-history.net/computer-history/2008-05-24/ mac-os-70-2<, May 24, 2008, 6 pages.

Dixon,"Living in the Online Cloud: The T-Mobile G1 / Google Android Smartphone", Retrieved from <http://www.manifest-tech.com/media_pda/t-mobile_g1_android.htm>, Dec. 2008, 3 pages.

Dolcourt,"Webware", Retrieved from: <http://news.cnet.com/webware/?categoryId=2010> on May 5, 2009., May 5, 2009, 13 Pages.

(56) References Cited

OTHER PUBLICATIONS

Dunsmuir,"Selective Semantic Zoom of a Document Collection", Available at <http://www.cs.ubc.ca/~tmm/courses/533/projects/dustin/proposal.pdf>, Oct. 30, 2009, pp. 1-9.

Egan,"Modifying Live Tiles in a Background Process", Retrieved from <http://thesociablegeek.com/windows-8/livetiles/modifying-live-tiles-in-a-background-process/> on Mar. 5, 2013, Aug. 31, 2012, 24 pages.

Elliott,"First Dell, Then HP: What's Next for N-trig's Multitouch Screen Technology", Retrieved from: <http://news.cnet.com/8301-17938_105-10107886-1.html> on Nov. 11, 2009, Nov. 25, 2008, 5 pages.

Emigh,"Lenovo Launches Windows 7 ThinkPads with Multitouch and Outdoor Screens", Retrieved from: <http://www.betanews.com/article/Lenovo-launches-Windows-7-ThinkPads-with-multitouch-and-outdoor-screens/1253017166> on Nov. 11, 2009, Sep. 15, 2009, 3 pages.

Farrugia,"Cell Phone Mini Challenge: Node-Link Animation Award Animating Multivariate Dynamic Social Networks", IEEE Symposium on Visual Analytics Science and Technology, Columbus, OH, USA, Oct. 21-23, 2008, Oct. 21, 2008, 2 pages.

Fisher,"Cool Discussion of Push Notifications—Toast and Tile—on Windows Phone", Retrieved from: <http://www.windowsphoneexpert.com/Connection/forums/p/4153/18399.aspx> on Sep. 29, 2010, May 3, 2010, 3 pages.

Foley,"The JavaScript Behind Touch-Friendly Sliders", Retrieved From: <http://css-tricks.com/the-javascript-behind-touch-friendly-sliders/> Aug. 19, 2014, Jun. 13, 2013, 14 Pages.

Friedlaender,"Better Way to Delete and Close Apps from Task Manager", retrieved from <http://www.ideasproject.com/ideas/14475> on Nov. 21, 2011, Nov. 15, 2011, 2 pages.

Gade,"Samsung Alias u740", Retrieved from: <http://www.mobiletechreview.com/phones/Samsung-U740.htm> on Nov. 20, 2008, Mar. 14, 2007, 6 pages.

Gao,"A General Logging Service for Symbian based Mobile Phones", Retrieved from: <http://www.nada.kth.se/utbildning/grukth/exjobb/rapportlistor/2007/rapporter07/gao_rui_07132.pdf.> on Sep. 17, 2008, Feb. 2007, pp. 1-42.

Gladisch,"MultiStates: Monitoring Databases With Acoustic and Intuitive Perspective Wall Interaction", In Proceedings of 2nd International Workshop on Design & Evaluation of e-Government Applications and Services, Aug. 24, 2009, 7 pages.

Gralla,"Windows XP Hacks, Chapter 13—Hardware Hacks", O'Reilly Publishing, Feb. 23, 2005, 25 pages.

Greenberg,"Review: SHARKK Apple iPad Air Wireless Bluetooth Keyboard Case", Retrieved From: <http://www.runaroundtech.com/2014/01/25/review-sharkk-apple-ipad-air-wireless-bluetooth-keyboard-case/> Mar. 31, 2014, Jan. 25, 2014, 6 Pages.

Gross,"Stretch-A-Sketch: A Dynamic Diagrammer", IEEE Symposium on Visual Languages, Available at <http://depts.washington.edu/dmachine/PAPER/VL94/vl.html>, Oct. 1994, 11 pages.

Ha,"SIMKEYS: An Efficient Keypad Configuration for Mobile Communications", Retrieved from: < http://ieeexplore.ieee.org/stamp/stamp.jsp?arnumber=01362557.> on Dec. 17, 2008, Nov. 2004, 7 Pages.

Hahn,"Freedom Case, the Adjustable Stand and Protective Case for Microsoft Surface Tablets with Patent-Pending Folding Design, Launches Pre-Orders on Kickstarter", Retrieved From: <http://www.prweb.com/releases/2014/02/prweb11583725.htm> Mar. 3, 2014, Feb. 8, 2014, 4 Pages.

Harrison,"Symbian OS C++ for Mobile Phones Volume 3", Retrieved from: <http://www.amazon.co.uk/Symbian-OS-Mobile-Phones-Press/dp/productdescription/0470066415> on Oct. 23, 2008, Symbian Press, Jun. 16, 2003, 4 pages.

Hickey,"Google Android has Landed; T-Mobile, HTC Unveil G1", Retrieved from: <http://www.crn.com/retail/210603348> on Nov. 26, 2008., Sep. 23, 2008, 4 pages.

Hinckley,"Codex: A Dual Screen Tablet Computer", Conference on Human Factors in Computing Systems, Apr. 9, 2009, 10 pages.

Hinckley,"Stitching: Pen Gestures that Span Multiple Displays", CHI 2004, Available at <http://www.cs.cornell.edu/~francois/Papers/2004-Hinckley-AVI04-Stitching.>, 2004, pp. 1-8.

Hollister,"Windows 8 Primer: How to Navigate Microsoft's New Operating System", retrieved from <http://www.theverge.com/2012/10/28/3562172/windows-8-gestures-keyboard-shortcuts-tips-tricks-how-to-guide> on Aug. 7, 2014, Oct. 28, 2012, 30 pages.

Horowitz,"Installing and Tweaking Process Explorer part 2", Retrieved from <http://web.archive.org/web/20110510093838/http://blogs.computerworld.com/16165/installing_and_tweaking_process_explorer_part_2> on Mar. 12, 2013, May 23, 2010, 7 pages.

Janecek,"An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf> , Feb. 15, 2005, pp. 1-15.

Jetter,"Materializing the Query with Facet-Streams—A Hybrid Surface for Collaborative Search on Tabletops", May 7, 2011, 10 pages.

Johnson,"Create an Awesome Zooming Web Page With jQuery", Retrieved from <http://designshack.net/articles/javascript/create-an-awesome-zooming-web-page-with-jquery/> on Aug. 20, 2015, May 25, 2011, 11 pages.

Johnson,"Samsung Galaxy Tab Pro 10.1 Review", Retrieved From: <http://hothardware.com/Reviews/Samsung-Galaxy-Tab-Pro-101-Review/?page=3#!baG2DY> Jul. 9, 2014, Mar. 21, 2014, 10 Pages.

Kandogan,"Elastic Windows: Improved Spatial Layout and Rapid Multiple Window Operations", In Proceedings of the Workshop on Advanced Visual Interfaces, May 27, 1996, 10 Pages.

Kcholi,"Windows CE .NET Interprocess Communication", Retrieved from http://msdn.microsoft.com/en-us/library/ms836784.aspx on Jul. 17, 2008., Jan. 2004, 15 Pages.

Keranen,"OpenGL-based User Interface Toolkit for Symbian Mobile Devices", Master of Science Thesis, Tamere University of Technology, Department of Information Technology, Apr. 6, 2005, 88 pages.

Kessler,"Microsoft Research Shows Off Awesome Interactive Live Tiles for Windows", Retrieved From: <http://www.wpcentral.com/microsoft-research-shows-interactive-live-tiles-windows> Jul. 10, 2014, Apr. 11, 2014, 29 Pages.

Kishore,"Split or Divide Your Desktop Screen into Multiple Parts", retrieved from <http://www.online-tech-tips.com/free-software-downloads/split-or-divide-your-desktop-screen-into-multiple-parts/> on Jul. 7, 2014, Oct. 18, 2008, 7 pages.

Krazit,"Has Apple Found the Magic Touch?", Retrieved from: <http://news.cnet.com/8301-13579_3-9879471-37.html> on Nov. 10, 2009, Feb. 26, 2008, 2 pages.

Kurdi,"Acer GridVista: snap your windows to pre-defined sections on your screen(s)", Retrieved from <http://www.freewaregenius.com/acer-gridvista-snap-your-windows-to-pre-defined-sections-of-your-screens/> on Jun. 30, 2013, Jan. 19, 2010, 6 pages.

Kurdi,"WinSplit Revolution", Retrieved from <http://www.freewaregenius.com/winsplit-revolution/> on Jun. 30, 2013, Aug. 22, 2007, 4 Pages.

La,"Parallax Gallery", Available at <http://webdesignerwall.comtutorials/parallax-gallery/comment-page-1>, Apr. 25, 2008, 16 pages.

Livingston,"Windows 95 Secrets", 1995, I DG Books Worldwide, 3rd Edition, 1995, pp. 121-127.

Long,"Gmail Manager 0.6", Retrieved from: <https://addons.mozilla.org/en-US/firefox/addon/1320/> on Sep. 29, 2010, Jan. 27, 2010, 4 pages.

Mann,"Spectrum Analysis of Motion Parallax in a 3D Cluttered Scene and Application to Egomotion", Journal of the Optical Society of America A, vol. 22, No. 9—Available at <http://www.cs.uwaterloo.ca/~mannr/snow/josa-mann-langer.pdf>, Sep. 2005, pp. 1717-1731.

Mantia,"Multitasking: What Does It Mean?", retrieved from <http://mantia.me/blog/multitasking/> Sep. 23, 2011, 3 pages.

Mao,"Comments of Verizon Wireless Messaging Services, LLC", Retrieved from: http://www.ntia.doc.gov/osmhome/warnings/comments/verizon.htm on May 6, 2009., Aug. 18, 2000, 5 Pages.

(56) References Cited

OTHER PUBLICATIONS

Marie,"MacBook Trackpad Four Fingers Swipe Left/Right to Switch Applications", MacBook Junkie—retrieved from <http://www.macbookjunkie.com/macbook-trackpad-four-fingers-swipe-left-right-to-switch-applications/> on May 11, 2011, Nov. 13, 2010, 4 pages.
Matejka,"Patina: Dynamic Heatmaps for Visualizing Application Usage", In Proceedings: The SIGCHI Conference on Human Factors in Computing Systems, Autodesk Research, Toronto, Ontario, Canada, Apr. 27, 2013, pp. 3227-3236.
Mazo,"How to Switch Applications and Multitask on the Galaxy S3", Retrieved from <http://www.androidcentral.com/how-switch-applications-and-multitask-samsung-galaxy-s3> on Feb. 18, 2013, Jul. 17, 2012, 7 pages.
Mcgee,"Expandable Tiles with Pinch to Expand", Retrieved From: <http://wpdev.uservoice.com/forums/110705-dev-platform/suggestions/2283791-expandable-tiles-with-pinch-to-expand> Jul. 9, 2014, Sep. 29, 2011, 3 Pages.
Mei,"Probabilistic Multimodality Fusion for Event Based Home Photo Clustering", Retrieved from: <http://ieeexplore.ieee.org//stamp/stamp.jsp?tp=&arnumber=04036960.>, Dec. 26, 2006, pp. 1757-1760.
Michaluk,"Using the Application Switcher and Closing Apps When Finished to Maximize your BlackBerry Efficiency", Retrieved from <http://crackberry.com/using-application-switcher-and-closing-apps-when-finished-maximize-your-blackberry-efficiency> on Feb. 19, 2013, Aug. 17, 2009, 14 pages.
Minsky,"Manipulating Simulated Objects with Real-world Gestures using a Force and Position Sensitive Screen", Computer Graphics, vol. 18, No. 3, Available at <http://delivery.acm.org/10.1145/810000/808598/p195-minsky.pdf?key1=808598&key2=2244955521&coll=GUIDE&dl=GUIDE&CFID=57828830&CFTOKEN=43421964>, Jul. 1984, pp. 195-203.
Mpdooley,"Sea Monkey Hangs during Drag Operation", mozillaZine—retrieved from <http://forums.mozillazine.org/viewtopic.php?f=5&t=1783735> on Nov. 18, 2011, Mar. 5, 2010, 2 pages.
Mullender,"Digital Dashboards: Web Parts Integrate with Internet Explorer and Outlook to Build Personal Portals", Retrieved from: < http://technet.microsoft.com/en-us/query/bb985692> on, Jan. 2001, 5 pages.
Muller,"MultiSplitPane: Splitting without Nesting", Java.net, retrieved from <http://today.java.net/pub/a/today/2006/03/23/multi-split-pane.html> on Mar. 23, 2006, Mar. 23, 2006, 6 pages.
Nordgren,"Development of a Touch Screen Interface for Scania Interactor", Master's Thesis in C—Available at <http://www.cs.umu.se/education/examina/Rapporter/PederNordgren.pdf>omputing Science, UMEA University, Apr. 10, 2007, pp. 1-59.
Oliver,"Potential iPhone Usability and Interface Improvements", Retrieved from: <http://www.appleinsider.com/articles/08/09/18/potential_iphone_usability_and_interface_improvements.html> on Nov. 12, 2008, AppleInsider, Sep. 18, 2008, 4 pages.
Olwal,"Rubbing and Tapping for Precise and Rapid Selection on Touch-Screen Displays", Conference on Human Factors in Computing Systems, Available at <http://www.csc.kth.se/~alx/projects/research/rubbing/olwal_rubbing_tapping_chi_2008.pdf>, Apr. 2008, 10 pages.
O'Reilly,"How to Use the Microsoft Surface Touch Screen and Keyboard", Retrieved From: <http://www.cnet.com/how-to/how-to-use-the-microsoft-surface-touch-screen-and-keyboard/> Jul. 5, 2014, Nov. 6, 2012, 5 Pages.
Oryl,"Review: Asus P527 Smartphone for North America", Retrieved from: <http://www.mobileburn.com/review.jsp?Id=4257> on Dec. 17, 2008., Mar. 5, 2008, 1 Page.
Padilla,"Palm Treo 750 Cell Phone Review—Hardware", Retrieved from: <http://www.wirelessinfo.com/content/palm-Treo-750-Cell-Phone-Review/Hardware.htm> on Dec. 11, 2008., Mar. 17, 2007, 4 Pages.
Paul,"Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, Aug. 2010, 3 pages.
Paul,"Three Windows Multitasking Features That Help Maximize Your Screen Space", Retrieved From: <http://www.pcworld.com/article/2094124/three-windows-multitasking-features-that-help-maximize-your-screen-space.html> Jul. 4, 2014, Feb. 4, 2014, 4 Pages.
Pendharkar,"Fluid Home Screen for Mobile Phones", Helsinki Metropolia University of Applied Sciences, Master of Engineering, Information Technology, Thesis, Available at <http://theseus17-kk.lib.helsinki.fi/bitstream/handle/10024/46481/FinalThesis3.pdf?sequence=1/>, Apr. 12, 2012, 48 pages.
Perry,"Teach Yourself Windows 95 in 24 Hours", 1997, Sams Publishing, 2nd Edition, 1997, pp. 193-198.
Pierce,"Toolspaces and Glances: Storing, Accessing, and Retrieving Objects in 3D Desktop Applications", 1999 Symposium on Interactive 3D Graphics, Available at <http://delivery.acm.org/10.1145/310000/300545/p163-pierce.pdf?key1=300545&key2=8792497521&coll=GUIDE&dl=GUIDE&CFID=61004073&CFTOKEN=28819248>, Apr. 1999, pp. 163-168.
Pointet,"Scrollsnap", Retrieved From: <http://benoit.pointet.info/stuff/jquery-scrollsnap-plugin/> Aug. 19, 2014, Jun. 29, 2013, 3 Pages.
Raghaven,"Model Based Estimation and Verification of Mobile Device Performance", Available at http://alumni.cs.ucsb.edu/~raimisl/emsoft04_12.pdf., Sep. 27-29, 2004, 10 Pages.
Rakow,"CSS Scroll Snap Points Module Level 1", Retrieved From: <http://dev.w3.org/csswg/css-snappoints/> Aug. 19, 2014, Mar. 5, 2014, 18 Pages.
Rathbone,"Windows Phone 7 Live Tile Schedules—How to Execute Instant Live Tile Updates", Retrieved from <http://www.diaryofaninja.com/blog/2011/04/03/windows-phone-7-live-tile-schedules-ndash-executing-instant-live-tile-updates> on Mar. 11, 2013, Apr. 3, 2011, 8 pages.
Ray,"Microsoft Re-Tiles Mobile Platform for Windows 7 Era", retrieved from <http://www.theregister.co.uk/2010/02/15/windows_phone_7_series/> on May 11, 2011, Feb. 15, 2010, 2 pages.
Reed,"Microsoft Demos Windows Mobile 6.1 at CTIA", Retrieved from: <http://www.networkworld.com/news/2008/040208-ctia-microsoft-windows-mobile.html> on Jul. 18, 2008, Apr. 2, 2008, 1 page.
Remond,"Mobile Marketing Solutions", Retrieved from: <http://www.mobilemarketingmagazine.co.uk/mobile_social_networking/> on May 5, 2009., Apr. 28, 2009, 16 Pages.
Rice,"A System for Searching Sound Palettes", Proceedings of the Eleventh Biennial Symposium on Arts and Technology Available at <http://www.comparisonics.com/FindSoundsPalettePaper.pdf>, Feb. 2008, 6 pages.
Ritchie,"iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, Jun. 14, 2010, 2 pages.
Ritscher,"Using Surface APIs in your WPF application—Part 1", Retrieved from: <http://blog.wpfwonderland.com/2009/06/30/using-surface-apis-in-your-wpf-application/> on Sep. 28, 2010, Jun. 30, 2009, 7 pages.
Roberts,"Touching and Gesturing on the iPhone", Available at <http://www.sitepen.com/blog/2008/07/10/touching-and-gesturing-on-the-iphone/comments-pare-1>, Jul. 10, 2008, 16 pages.
Rossi,"Enabling New Interoperable Panning Experiences Through the CSS Scrolling Snap Points Specification", Retrieved From: <http://blogs.msdn.com/b/ie/archive/2013/10/22/enabling-new-interoperable-panning-experiences-through-the-css-scrolling-snap-points-specification.aspx> Aug. 22, 2014, Oct. 22, 2013, 4 Pages.
Roth,"Bezel Swipe: Conflict-Free Scrolling and Multiple Selection on Mobile Touch Screen Devices", CHI 2009, Available at <http://www.volkerroth.com/download/Roth2009a.pdf>, Apr. 2009, 4 pages.
Sandoval,"A development platform and execution environment for mobile applications", Universidad Autónoma de Baja California, School of Chemical Sciences and Engineering, Available at <http://citeseerx.ist.psu.edu/viewdoc/download?doi=10.1.1.86.7989&rep=rep1&type=pdf> , 2004, 18 pages.
Saugat,"Access Multiple Cloud Files from Single Application", Retrieved from: <http://freshtutorial.com/access-multiple-cloud-files-single-application/> on Feb. 15, 2012, Sep. 26, 2011, 7 pages.

(56) References Cited

OTHER PUBLICATIONS

Schmalstieg,"Bridging Multiple User Interface Dimensions with Augmented Reality", Retrieved from: >http:!/3citeseerx.ist.psu.edu/viewdoc/download?doi=10.1.1.43.5429&rep=rep1 &type=pdf< Proceedings IEEE and ACM D International Symposium on Augmented Reality, 2000, 10 pages.
Simeone,"A Cross-Device Drag-and-Drop Technique", In Proceedings of MUM 2013, Dec. 2013, 4 pages.
Singh,"CINEMA: Columbia InterNet Extensible Multimedia Architecture", Available at <http://www1.cs.columbia.edu/~library/TR-repository/reports/reports-2002/cucs-011-02.pdf>, Sep. 3, 2002, 83 Pages.
Smith,"GroupBar: The TaskBar Evolved", Proceedings of OZCHI 2003—Available at <http://research.microsoft.com/pubs/64316/ozchi2003-groupbar.pdf>, Nov. 2003, pp. 1-10.
Spradlin,"Switcher Provides an Incredible Gesture-based App Switching Tool", Retrieved from <http://www.androidpolice.com/2012/07/09/switcher-proof-of-concept-hits-the-play-store-providing-an-incredible-gesture-based-app-switching-tool/> on Feb. 18, 2013, Jul. 9, 2012, 7 pages.
Stark,"Review: Logitech Ultrathin Keyboard Cover for iPad", Retrieved From: <http://www.gadgetguy.com.au/product/logitech-ultrathin-keyboard-cover-for-ipad/> Feb. 26, 2014, Jun. 8, 2012, 4 Pages.
Stebih,"Windows 8 Mouse and Keyboard Commands", retrieved from <http://www.helpdesktv.ca/windows/windows-8-mouse-and-keyboard-commands.html> on Nov. 23, 2011, Sep. 21, 2011, 5 pages.
Steinicke,"Multi-Touching 3D Data: Towards Direct Interaction in Stereoscopic Display Environments coupled with Mobile Devices", Advanced Visual Interfaces (AVI) Workshop on Designing Multi-Touch Interaction Techniques for Coupled Public, Available at <http://viscg.uni-muenster.de/publications/2008/SHSK08/ppd-workshop.-pdf.>, Jun. 15, 2008, 4 Pages.
Storey,"Setting Native-Like Scrolling Offsets in CSS with Scrolling Snap Points", Retrieved From: <http://generatedcontent.org/post/66817675443/setting-native-like-scrolling-offsets-in-css-with> Aug. 19, 2014, Nov. 18, 2013, 9 pages.
Sun,"Clamshell Keyboard Case transforms the iPad Mini into a Laptop and Gets Raving Review from RunAroundTech.com", Retrieved From: <http://www.prweb.com/releases/2014/01/prweb11456818.htm> Apr. 1, 2014, Jan. 6, 2014, 3 Pages.
Suror,"PocketShield—New Screenlock App for the HTC Diamond and Pro", Retrieved from: <http://wmpoweruser.com/?tag=htc-touch-diamond> on Jun. 28, 2011, Oct. 23, 2008, 2 pages.
Terpstra,"Beta Beat: Grape, a New Way to Manage Your Desktop Clutter", Retrieved from: http://www.tuaw.com/2009/04/14/beta-beat-grape-a-new-way-to-manage-your-desktop-clutter/, Apr. 14, 2009, 4 pages.
Ueland,"25 Apps for Dropbox", Retrieved from: <http://www.practicalecommerce.com/articles/3984-25-Apps-for-Dropbox> on Apr. 6, 2014, Apr. 15, 2013, 10 pages.
Vallerio,"Energy-Efficient Graphical User Interface Design", Retrieved from: <http://www.cc.gatech.edu/classes/AY2007/cs7470_fall/zhong-energy-efficient-user-interface.pdf>, Jun. 10, 2004, pp. 1-13.
Vermeulen,"BlackBerry PlayBook Hands-on", retrieved from <http://mybroadband.co.za/news/gadgets/20104-BlackBerry-PlayBook-hands-.html> on May 11, 2011, May 8, 2011, 4 pages.
Vigil,"Methods for Controlling a Floating Cursor on a Multi-touch Mobile Phone or Tablet in Conjunction with Selection Gestures and Content Gestures", U.S. Appl. No. 61/304,972, filed Feb. 16, 2010, 54 pages.
Viticci,"Growl 1.3 to Be Released on Mac App Store, Introduce Lion Support and Drop GrowlMail Support", Retrieved from: <http://www.macstories.net/stories/growl-1-3-to-be-released-on-mac-app-store-introduce-lion-support-and-drop-growlmail-support/> on Jul. 22, 2011, Jul. 6, 2011, 6 pages.
Viticci,"Reeder Redefines Google Reader on the iPad. Reviewed", Retrieved From: <http://www.macstories.net/ipad/reeder-review/> Jul. 10, 2014, Jun. 4, 2010, 8 pages.
Vornberger,"Bluetile", Retrieved from: <http://www.bluetile.org> on Sep. 29, 2010, 5 pages.
Webmonkey"HTML Cheatsheet", Retrieved From: <http://www.webmonkey.com/2010/02/html_cheatsheet> on Nov. 7, 2014, Feb. 15, 2010, 5 pages.
Webster,"VsNotepad: An Improved Way to Jot Down on Windows Mobile", Retrieved from <http://pocketnow.com/index.php/index.php?a=portal_detail&t=news&id=7424>, May 19, 2009, 2 pages.
Wells,"Advanced Task Killer", Android Tapp: Android App Reviews—retrieved from <http://www.androidtapp.com/advanced-task-killer/> on Nov. 18, 2011, Aug. 28, 2009, 15 pages.
Wilson,"How the iPhone Works", Retrieved from: <http://electronics.howstuffworks.com/iphone2.htm> on Apr. 24, 2009, Jan. 2007, 9 pages.
Wilson,"Robust Computer Vision-Based Detection of Pinching for One and Two-Handed Gesture Input", In Proceedings of UIST 2006—Available at <http://research.microsoft.com/en-us/um/people/awilson/publications/wilsonuist2006/uist%202006%20taffi.pdf>, Oct. 2006, 4 pages.
Wobbrock,"User-Defined Gestures for Surface Computing", CHI 2009, Apr. 4-9, 2009, Boston, MA—available at <http://faculty.washington.edu/wobbrock/pubs/chi-09.2.pdf>, Apr. 4, 2009, 10 pages.
Wollman,"Sony gives the slider another shot with the VAIO Duo 13", Retrieved From: <http://www.engadget.com/2013/06/04/sony-duo-13/> Mar. 31, 2014, Jun. 4, 2013, 7 Pages.
Wu,"Achieving a Superior Ownership Experience in Manageability and Quality for Siebel CRM", available at <http://www.oracle.com/us/products/enterprise-manager/superior-exp-for-siebel-crm-068962.pdf>, Aug. 2008, 25 pages.
Wyatt,"/Flash/the art of parallax scrolling", .net Magazine, Aug. 1, 2007, pp. 74-76.
Yang,"Dual-Surface Input: Augmenting One-Handed Interaction with Coordinated Front and Behind-the-Screen Input", Proceedings: MobileHCI '09, Sep. 15-18, 2009, Bonn, Germany—retrieved from <http://www.cs.ualberta.ca/~wfb/publications/C-2009-MobileHCI-Yang.pdf>, Sep. 18, 2009, 10 pages.
Yang,"Semantic Photo Album Based on MPEG-4 Compatible Application Format", Retrieved from: <http://ieeexplore.ieee.org/stamp/stamp.jsp?arnumber=04146254.>, 2007 2 Pages.
Yee,"Two-Handed Interaction on a Tablet Display", Retrieved from: <http://zesty.ca/tht/yee-tht-chi2004-short.pdf>, Conference on Human Factors in Computing Systems, Apr. 2004, 4 pages.
"Corrected Notice of Allowance", U.S. Appl. No. 14/109,779, dated Oct. 19, 2015, 2 pages.
"Corrected Notice of Allowance", U.S. Appl. No. 14/659,442, dated Nov. 10, 2015, 2 pages.
"Extended European Search Report", Application No. 11871739.6, dated Oct. 5, 2015, 13 pages.
"Extended European Search Report", EP Application No. 11872164.6, dated Sep. 18, 2015, 8 pages.
"Foreign Notice of Allowance", CN Application No. 201210331158.8, dated Sep. 8, 2015, 3 Pages.
"Foreign Office Action", CL Application No. 3369-13, dated Oct. 29, 2015, 6 pages.
"Foreign Office Action", CN Application No. 201110454251.3, dated Sep. 30, 2015, 10 Pages.
"Foreign Office Action", CN Application No. 201210331564.4, dated Sep. 2, 2015, 14 pages.
"Foreign Office Action", CO Application No. 13-298.756, dated Oct. 11, 2015, 11 pages.
"Foreign Office Action", EP Application No. 11866579.3, dated Sep. 3, 2015, 4 pages.
"Foreign Office Action", JP Application No. 2014-512819, dated Sep. 29, 2015, 4 pages.
"Foreign Office Action", JP Application No. 2014-512820, dated Sep. 29, 2015, 10 pages.
"Foreign Office Action", JP Application No. 2014-512821, dated Oct. 20, 2015, 5 pages.
"Foreign Office Action", JP Application No. 2014-512824, dated Nov. 6, 2015, 5 pages.
"Foreign Office Action", JP Application No. 2014-528371, dated Sep. 29, 2015, 16 pages.

(56) References Cited

OTHER PUBLICATIONS

"Foreign Office Action", JP Application No. 2014-529671, dated Sep. 29, 2015, 16 pages.
"Foreign Office Action", JP Application No. 2014-529672, dated Oct. 6, 2015, 7 pages.
"Foreign Office Action", JP Application No. 2014-529684, dated Nov. 4, 2015, 10 pages.
"Foreign Office Action", JP Application No. 2014-529685, dated Nov. 4, 2015, 5 pages.
"Foreign Office Action", JP Application No. 2014-529687, dated Oct. 20, 2015, 8 pages.
"Foreign Office Action", RU Application No. 2013152635, dated Oct. 28, 2015, 4 pages.
"Foreign Office Action", Ru Application No. 2014107906, dated Oct. 6, 2015, 6 pages.
"Foreign Office Action", RU Application No. 2014108874, dated Oct. 6, 2015, 6 pages.
"Introduction to Windows 7", https://www.google.com/url?q=http://www.wright.edu/sites/default/files/page/attachements/windows7.pdf, Jul. 1, 2010, 13 pages.
"Non-Final Office Action", U.S. Appl. No. 13/118,181, filed Oct. 23, 2015, 15 pages.
"Non-Final Office Action", U.S. Appl. No. 13/118,221, filed Oct. 7, 2015, 8 pages.
"Non-Final Office Action", U.S. Appl. No. 13/118,302, filed Nov. 6, 2015, 21 pages.
"Samsung Galaxy 2 TouchWiz 4.0 Tour (Homescreen, Settings, etc)", https://www.youtube.com/watch?v=oXBbiy0Adiw, May 9, 2011, 3 pages.
"Search Report", TW Application No. 100136568, dated Sep. 14, 2015, 2 pages.
D,"Android Apps in Depth—02—Go Launcher EX", https://www.youtube.com/watch?v=u5LISE8BU_E, Mar. 6, 2011, 3 pages.
D,"Android HTC EVO 4G Tutorials 01—Getting Started, Home Screens", https://www.youtube.com/watch?v=fwvt-rsCMA8, Feb. 3, 2011, 3 pages.
Demers,"In Depth: GO Launcher EX—Droid Life", http://www.droid-life.com/2011/01/26/in-depth-go-launcher-ex/, Jan. 26, 2011, 8 pages.
Takahiro,"Let's Manage the Installed Applications", In Easy to Use Mini, Exhaustion Utilization of iPhone, vol. 1, p. 25 Memo, Mar. 10, 2011, 6 pages.
"Foreign Office Action", EP Application No. 11872164.6, dated Jun. 12, 2018, 8 pages.
"Summon to Attend Oral Hearing Issued in European Patent Application No. 11872164.6", dated Jan. 7, 2019, 11 Pages.

* cited by examiner

PROGRESSIVELY INDICATING NEW CONTENT IN AN APPLICATION-SELECTABLE USER INTERFACE

RELATED APPLICATION

This application is a continuation of and claims priority to U.S. patent application Ser. No. 13/229,702, filed Sep. 10, 2011 and entitled "Progressively Indicating New Content in an Application-Selectable User Interface," the teachings of which are incorporated herein in their entirety.

BACKGROUND

Conventional operating systems permit users to launch applications, often through a user interface having selectable icons for the applications. In some cases a user selects to launch an application from this user interface and does not care whether there is anything new for that application.

In many cases, however, users launch applications to find out what is new in those applications. A user wishing to find out what is new in her applications, for example, typically selects an icon for a desired application, in response to which the conventional operating system launches the application. This application then opens and, assuming it is one that presents content, presents that content. For some applications, such as news or social-networking websites, the application retrieves content from a remote source and then presents that content. It is at this point that the user sees the content, which may or may not be new since the last time the user viewed content for that application.

The user may continue this process of selecting applications, in response to which they are launched and present content, and then view the presented content to find out what, if anything, is new. Following this process will permit a user to see what is new in her applications, but doing so takes significant amounts of time and effort. This process also expends computing and bandwidth resources. Worse still, in some cases her applications may not have any new content, in which case all of this time, effort, and resources are wasted.

SUMMARY

This document describes techniques for progressively indicating new content in an application-selectable user interface. These techniques permit a user to view indications of new content for applications progressively, rather than all at one time. By so doing, the techniques may avoid mentally or visually overloading or over-stimulating a user viewing the indications.

This summary is provided to introduce simplified concepts for progressively indicating new content in an application-selectable user interface that is further described below in the Detailed Description. This summary is not intended to identify essential features of the claimed subject matter, nor is it intended for use in determining the scope of the claimed subject matter. Techniques and/or apparatuses for progressively indicating new content in an application-selectable user interface are also referred to herein separately or in conjunction as the "techniques" as permitted by the context.

BRIEF DESCRIPTION OF THE DRAWINGS

Embodiments for progressively indicating new content in an application-selectable user interface are described with reference to the following drawings. The same numbers are used throughout the drawings to reference like features and components.

DETAILED DESCRIPTION

Overview

This document describes techniques for progressively indicating new content in an application-selectable user interface. These indications, whether or not they include some of the new content, show that the corresponding application for a tile in which the indication is shown has as-yet-unviewed content. These techniques permit a user to view indications of new content for applications progressively, rather than all at one time. By so doing, the techniques may avoid mentally or visually overloading or over-stimulating a user viewing the indications.

When presenting some or all of the new content in the tile, the techniques enable a user of the interface to decide whether or not to visit the application. In some cases, for example, the new content shown is not interesting to a user and thus the user selects not to visit the application. In some other cases, the new content shown is sufficient information for the user, such as when the new content indicates, through a tile corresponding to a weather website, current weather conditions and projected weather conditions for the rest of the day. In still other cases, the new content is interesting to the user, causing the user to select the tile to visit the application.

Assume that a user wishes to check what is new in her applications. When she selects to view the application interface, assume that there are numerous tiles in which new content is available. Rather than present this new content all at once, the techniques progressively present the indications in the numerous tiles. By so doing, the user may better consume those indications.

This discussion proceeds to describe an example environment in which the techniques may operate, methods performable by the techniques, and an example apparatus below.

Example Environment

Figure 1:
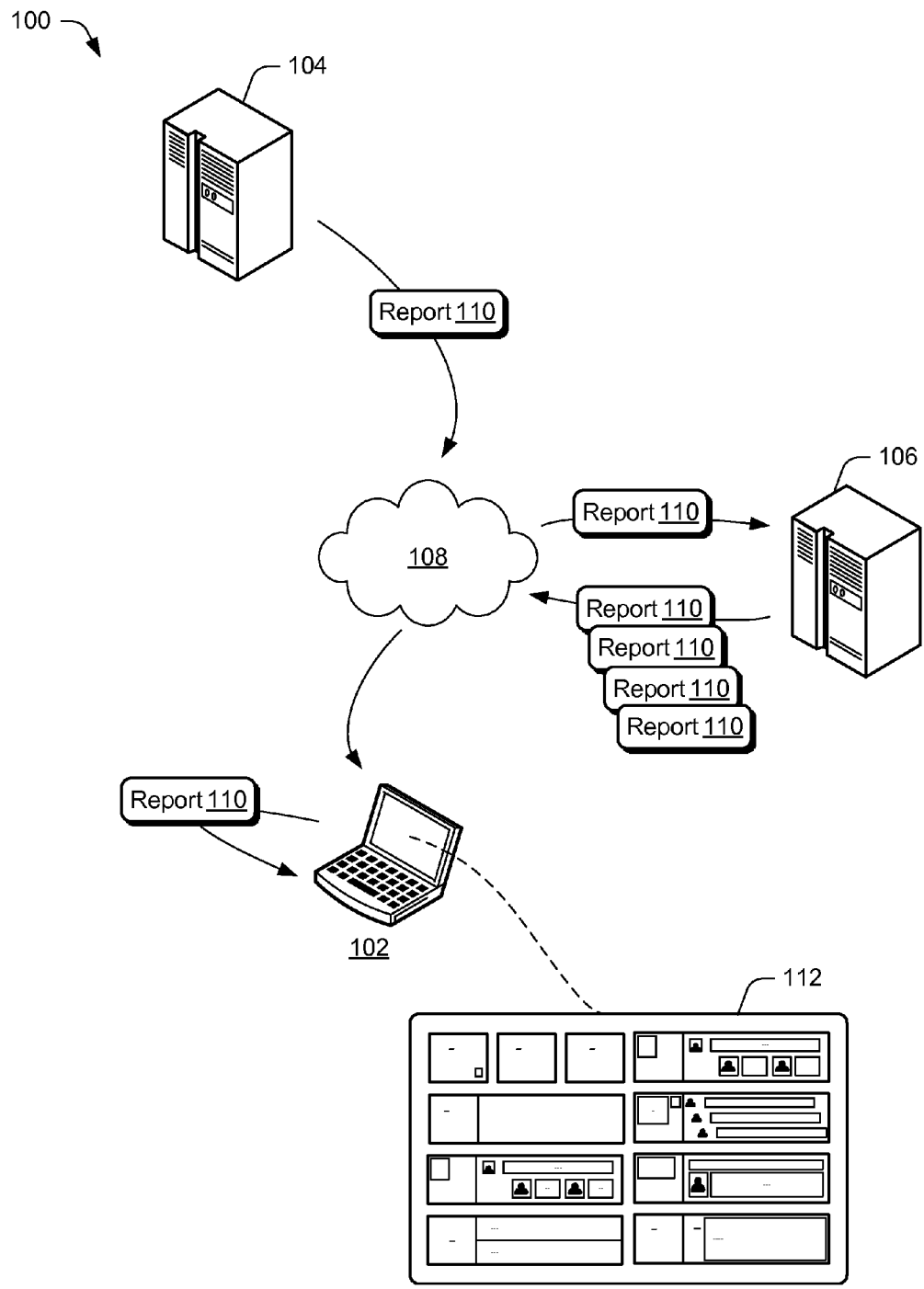
FIG. 1 illustrates an example environment in which techniques for progressively indicating new content in, or pre-rendering new content for, an application-selectable user interface can be implemented.
Figure 2:
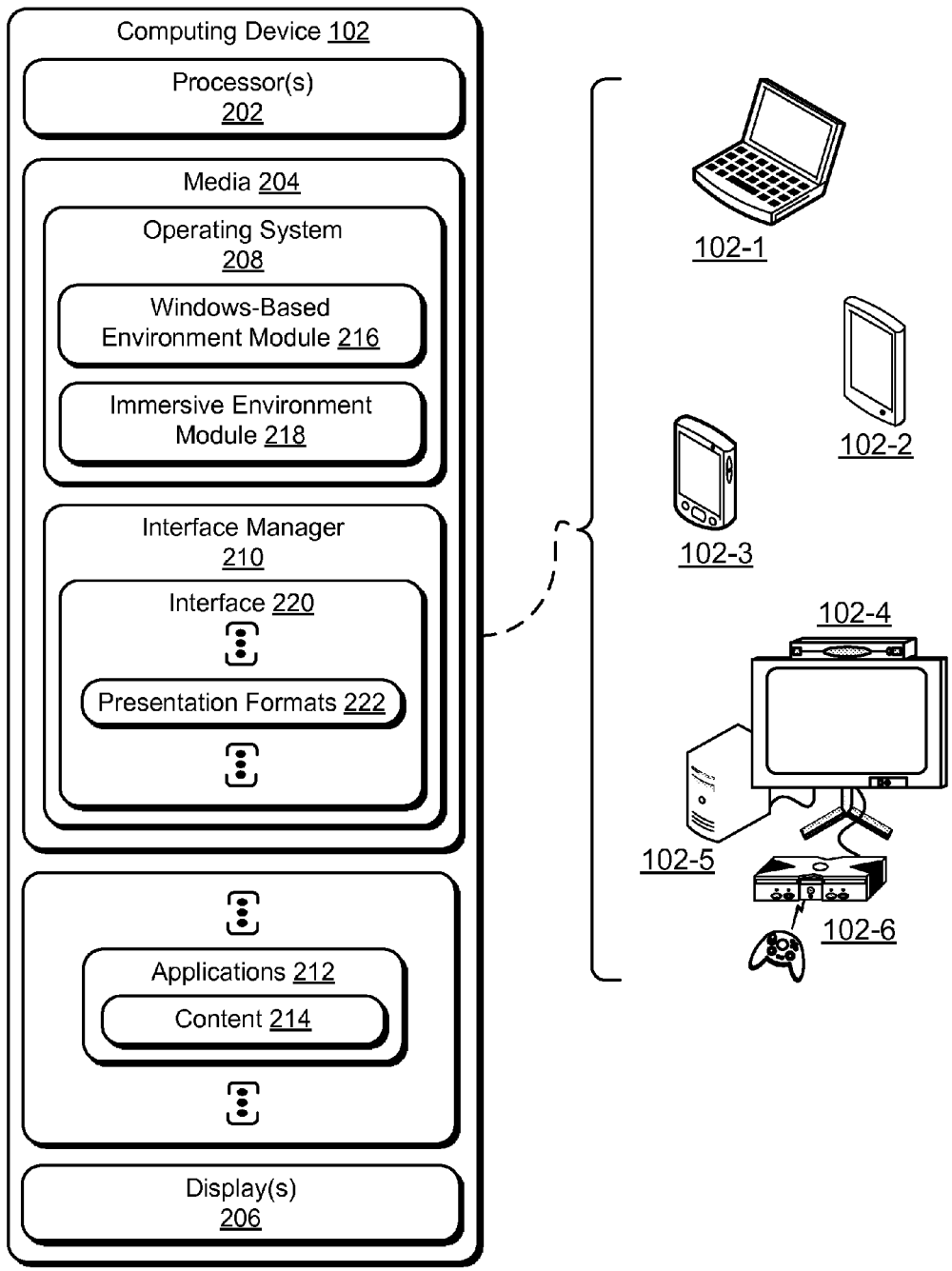
FIG. 2 illustrates an example embodiment of the computing device of FIG. 1.

FIG. 1 illustrates an example environment 100 in which techniques for progressively indicating new content in an application-selectable user interface can be embodied, as well as other techniques described herein. Environment 100 includes a computing device 102, remote provider 104, optional report compiler 106, and communication network 108, which enables communication between these entities. In this illustration, computing device 102 receives reports 110 from three sources, remote provider 104, report compiler 106, and an application executing on computing device 102 (this application is shown in FIG. 2). Reports 110 indicate what is new or of potential interest for the selectable applications, such as a change to an application's content or status (e.g., a new email, entry, or article, or that a software update or expiration is approaching, to name just a few). Computing device 102 presents user interface 112, which includes selectable tiles for applications and indicates when new content is available.

FIG. 2 illustrates an example embodiment of computing device 102 of FIG. 1, which is illustrated with six examples devices: a laptop computer 102-1, a tablet computer 102-2, a smart phone 102-3, a set-top box 102-4, a desktop computer 102-5, and a gaming device 102-6, though other computing devices and systems, such as servers and netbooks, may also be used.

Computing device 102 includes or has access to computer processor(s) 202, computer-readable storage media 204 (media 204), and one or more displays 206, four examples of which are illustrated in FIG. 2. Media 204 includes an operating system 208, interface manager 210, and applications 212, each of which may provide content 214.

Operating system 208 includes or has access to window-based environment module 216 and/or immersive environment module 218. Applications selected through the techniques can be presented through a windows-based or immersive environment, as well as others.

Windows-based environment module 216 presents applications and accompanying content through windows having frames. These frames provide controls through which to interact with an application and/or controls enabling a user to move and size the window.

Immersive environment module 218 provides an environment by which a user may view and interact with one or more of applications 212 and corresponding new content 214. In some embodiments, this environment presents content of, and enables interaction with, applications with little or no window frame and/or without a need for a user to manually size or position content. This environment can be, but is not required to be, hosted and/or surfaced without use of a typical desktop environment. Thus, in some cases immersive environment module 218 presents an immersive environment that is not a window (even one without a substantial frame) and precludes usage of desktop-like displays (e.g., a taskbar). Further still, in some embodiments this immersive environment is similar to an operating system in that it is not closeable or capable of being uninstalled.

Interface manager 210 includes, has access to, or generates an application-selectable user interface 220, an example of which is shown at 112 in FIG. 1. Interface 220 includes or has access to presentation formats 222. Interface manager 210 presents content for, and/or indicates changes associated with, one or more of applications 212 through interface 220, such as an animation to the tile and/or new content in the tile. Interface manager 210 may indicate changes and new content, and perform many operations noted herein, with or without application 212 executing. As noted above, reports 110 may be received directly from one or more of applications 212 (in which case they are executing), or another entity associated with one or more of applications 212, such as remote provider 104 or report compiler 106 (in which case applications 212 may or may not be executing).

In some cases one of reports 110 indicates which presentation format 222 is intended, in which case interface manager 210 reports changes in the appropriate format through interface 220, though following the intended presentation format is optional.

Figure 3:
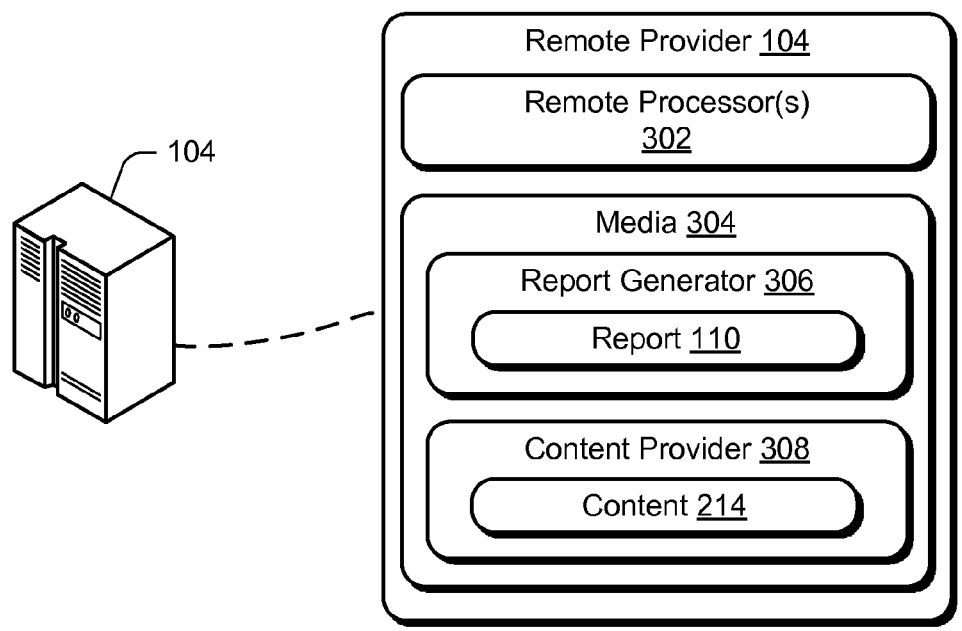
FIG. 3 illustrates an example embodiment of the remote provider of FIG. 1.

FIG. 3 illustrates example embodiments of remote provider 104. Remote provider 104 is shown as a singular entity for visual brevity, though multiple remote providers are also contemplated herein. Remote provider 104 includes or has to access to provider processor(s) 302 and provider computer-readable storage media 304 (media 304). Media 304 includes report generator 306 and content provider 308.

Report generator 306 is capable of providing one or more reports 110 to computing device 102, either directly or indirectly through report compiler 106. In some embodiments, reports 110 include new content (e.g., text), information useful to gain new content (e.g., with universal resource locators (URLs) to gain images, audio, and/or video), information indicating an update, change, or new content, and/or a presentation format in which the new content is intended to be presented within a tile.

Report generator 306 may act responsive to interface manager 210, such as a request from interface manager 210 for reports 110, though report generator 306 may also act to periodically send, or consistently make available, new content and updates as they become available. Report generator 306 may indicate what is new since a user last selected a particular application, though it may also simply provide reports 110, with which interface manager 210 may instead determine what is or is not new.

Content provider 308 provides content, such as new content 214 associated with application 212. Content provider 308 may act in conjunction with report generator 306, such as to provide new content 214 to report generator 306, which report generator 306 then provides a portion of (or sometimes all of) or information useful to gain the new content 214 within report 110.

Figure 4:
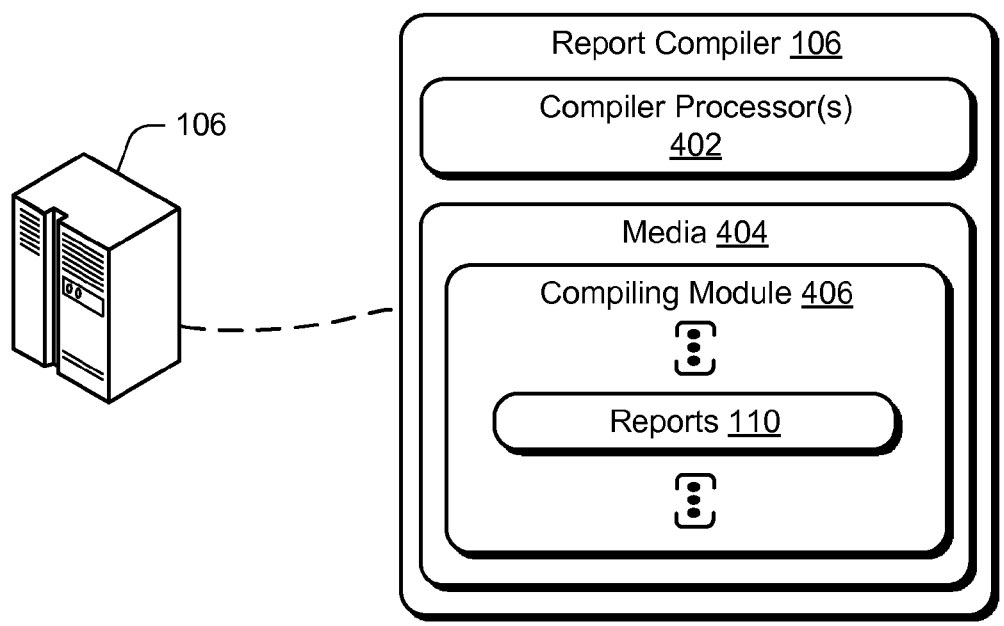
FIG. 4 illustrates an example embodiment of the report compiler of FIG. 1.

FIG. 4 illustrates an example embodiment of report compiler 106. Report compiler 106 is shown as a singular entity for visual brevity, though multiple compilers may also be used. Report compiler 106 includes or has to access to compiler processor(s) 402 and compiler computer-readable storage media 404 (media 404). Media 404 includes compiling module 406, which is capable of receiving and compiling reports 110 from one or more sources, such as report provider 104. Compiling module 406 may receive reports for later provision to computing device 102, such as periodically or when computing device 102 indicates that it is on. Compiling module 406 may determine which changes are new since a particular user last viewed content from an application and provide those of the reports 110 indicating these changes.

Ways in which entities of FIGS. 1-4 act and interact are set forth in greater detail below. The entities illustrated for computing device 102, remote provider 104, or report compiler 106, respectively, can be separate or integrated.

Example Methods

Figure 5:
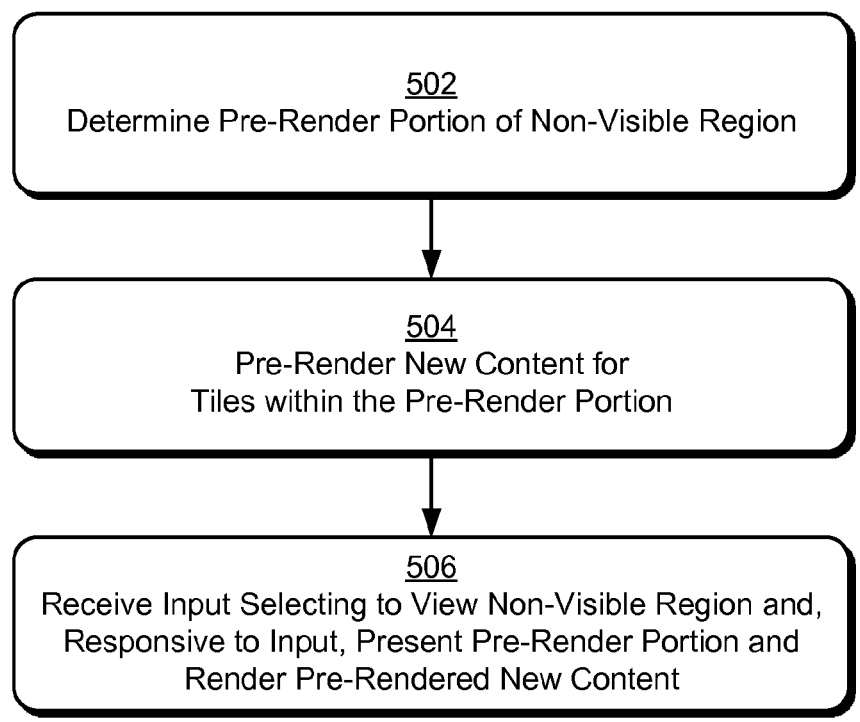
FIG. 5 illustrates an example method for pre-rendering new content for an application-selectable user interface, including determining a portion of a non-visible region in which to pre-render the new content.

FIG. 5 depicts a method 500 for pre-rendering new content for an application-selectable user interface, including determining a portion of a non-visible region in which to pre-render the new content. In portions of the following discussion reference may be made to environment 100 of FIG. 1 and as detailed in FIGS. 2-4, reference to which is made for example only. Method 500 may operate separate from or in conjunction with, in whole or in part, other methods described herein.

Block 502 determines, for an interface having a visible region in which visible, selectable tiles associated with applications are presented and a non-visible region in which tiles associated with applications are not currently presented, a portion of the non-visible region for which to pre-render new content.

Block 502 may determine the portion in which to pre-render content (the "pre-render portion") based on various different criteria and analysis, such as device resources (processing power, memory, battery power) and communication bandwidth.

For example, block 502 may determine an historical average of amounts of time between receiving inputs selecting to view prior-selected non-visible regions and pre-rendering new content for tiles to be rendered in the non-visible regions. Assume that the computing device is smart phone 102-3, that the phone has limited communication bandwidth to download new content (such as images or video) and limited computational resources and memory. In such a case, interface manager 210 historically takes a relatively large amount of time between receiving a selection to view a non-visible region and pre-rendering (and later rendering) content changes to tiles. Interface manager 210 determines to set a relatively large pre-render portion so that smart phone 102-3 can be ready to present new content responsive to selection.

Similarly, block 502 may determine the size and location of the pre-render portion based on a projected time to download new content, such as when communication bandwidth is determined to be slower or faster than usual for the device (e.g., table computer 102-2 has a cellular network or a high-bandwidth wireless LAN available).

Block 502 may also or instead determine a pre-render portion based on new content to be presented. Interface manager 210, for example, may determine that some of the reported new content will be time-consuming to download or process, such as if report 110 indicates that an audio-visual file at a URL is new content to be presented in an associated tile, and thus determine to enlarge the pre-render portion to include the associated tile. Conversely, interface manager 210 may determine a smaller pre-render portion if the new contents are simply text residing within reports 110.

The techniques may also or instead determine a pre-render portion based on an input received through the application-selection user interface. Manners in which this is performed as set forth in great detail in other methods herein.

Whatever the manner, block 502 determines the pre-render portion. Consider, for example, FIG. 6, which illustrates user interface 600 having a visible region 602, a non-visible region 604, and a pre-render portion 606 of non-visible region 604. In this example, interface manager 210 determines pre-render portion 606, which includes one column of four tiles having four associated applications. Pre-render portion 606 is a single portion and is adjacent to visible region 602, though pre-render portions may be disparate from a visible region and in multiple parts (e.g., on opposite sides of visible region 602).

Assume, for this example, that nine reports 110 are received during presentation of visible region 602 and prior to receiving a user input selecting to view pre-render portion 606. One of these reports 110 includes text and a URL for an image for a new article on a news website. The other eight of the reports 110 each indicate that a new email has been received and include a subject line and name of the sender within reports 110.

Block 504 pre-renders new content for tiles in the pre-render portion and for which reports indicating the new contents have been received. Block 504 pre-renders the new content and/or effects or indications of new content, though this pre-rendering may include one or many of the following operations: downloading media from a URL; parsing report 110 for text and preparing to render that text in a format, such as one of presentation formats 222 indicated in report 110; preparing to render downloaded media (e.g., storing a bitmap in a graphics card for quick rendering); preparing an appropriate animation effect or calculations thereof for the tiles having new content (e.g., to present a shimmer or gloss over, coloring or highlighting, or reshaping the tile); loading images from disk; and/or localizing text.

Block 506 receives an input selecting to view the non-visible region and, responsive to the input, presents the pre-render portion and renders the pre-rendered new content for the tiles in the pre-render portion for which reports indicating the new content have been received.

Figure 6:
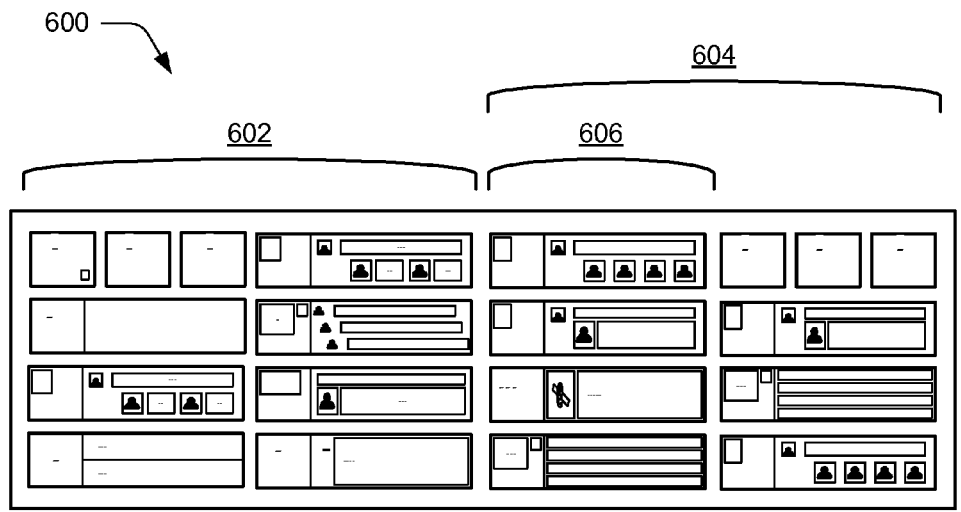
FIG. 6 illustrates an example user interface having a visible region, a non-visible region, and a pre-render portion of the non-visible region.
Figure 7:
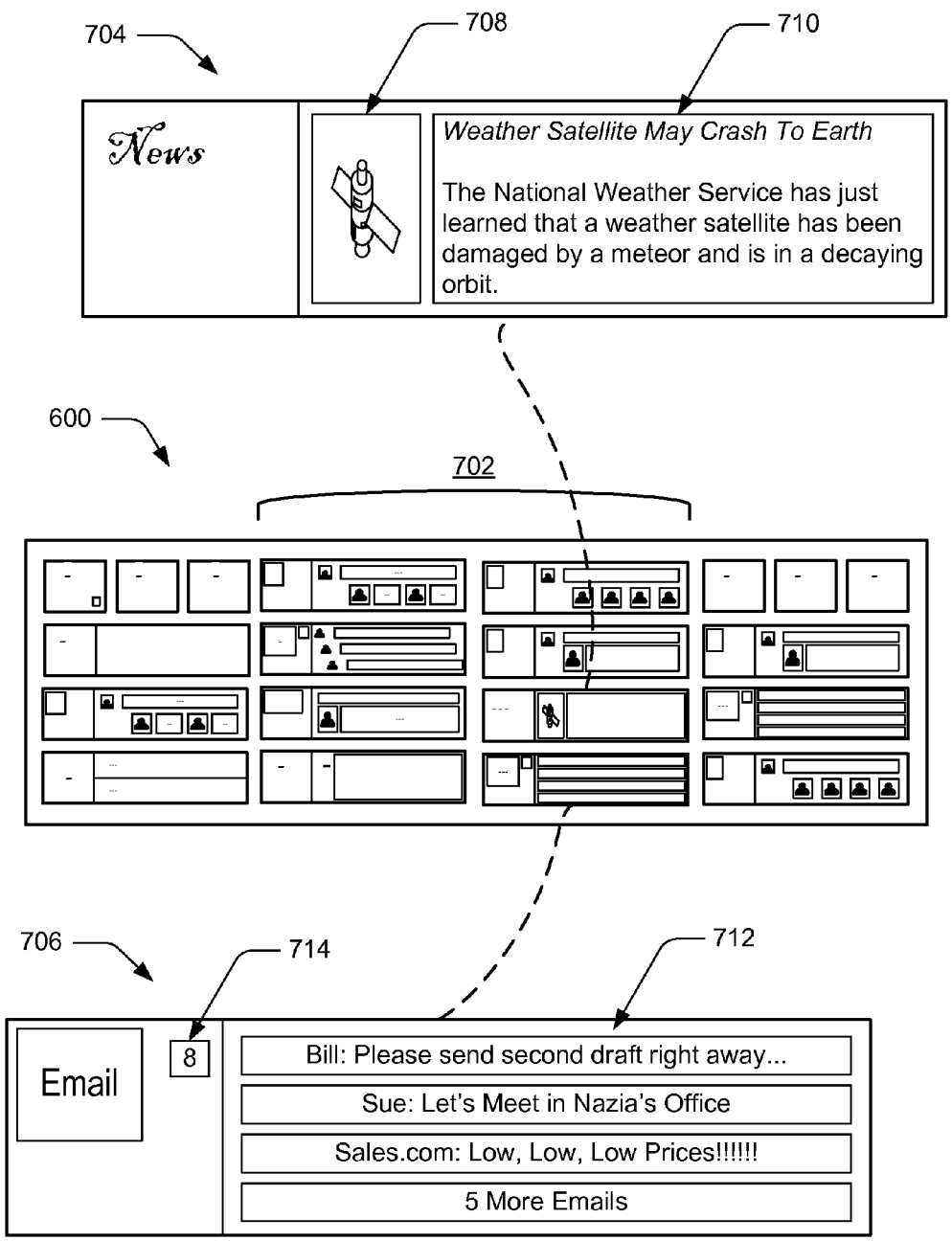
FIG. 7 illustrates the example interface of FIG. 6 along with a new visible region having part of the previously visible region and pre-render portion of FIG. 6.

Continuing the illustrated example, consider FIG. 7, in which interface 600 shows a new visible region 702 having part of the previously visible region of FIG. 6 (visible region 602) and pre-render portion 606 of FIG. 6. Two of the tiles in new visible region 702 (previously in pre-render portion 606) received changes, which are shown expanded at news webpage tile 704 and email tile 706. As shown, interface manager 210 renders an image 708 and text 710 showing new content 712 within news webpage tile 704. Interface manager 210 also shows new content in email tile 706 for three new emails and indicating that five other emails have been received. Similarly, interface manager 210 indicates, without showing the new content as part of the indication, at indicator 714 (marked "8" for eight new emails).

Figure 8:
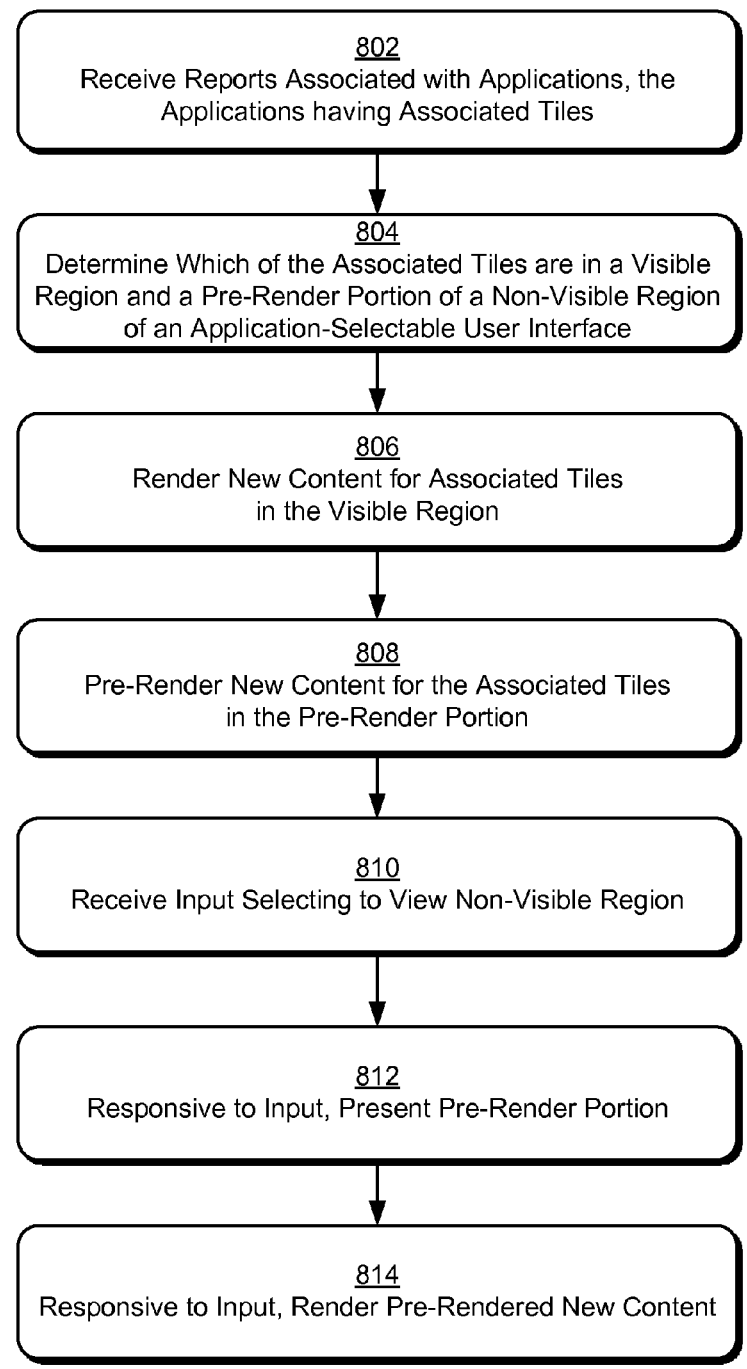
FIG. 8 illustrates an example method for pre-rendering new content for an application-selectable user interface, including based on a previously determined pre-render portion of a non-visible region.

FIG. 8 depicts a method 800 for pre-rendering new content for an application-selectable user interface, including based on a previously determined pre-render portion of a non-visible region. In portions of the following discussion reference may be made to environment 100 of FIG. 1 and as detailed in FIGS. 2-4, reference to which is made for example only. Method 800 may operate separate from or in conjunction with, in whole or in part, other methods described herein.

Block 802 receives reports associated with applications, the applications having associated tiles, such as one or more reports 110 of FIG. 1. Block 804 determines which of the associated tiles for the received reports are in which regions of an application-selectable user interface, such as a visible region and a pre-render portion of a non-visible region of the interface.

Block 806 renders the new content for the associated tiles in the visible region, such as visible region 602 of FIG. 6, the new content rendered as described above (e.g., as shown in FIG. 7 in tiles 704 and 706).

Block 808 pre-renders new content for the associated tiles in the pre-render portion of the non-visible region. This pre-rendering can be in any of the ways set forth above, including images and text. For example, interface manager 210 can determine URLs in reports 110 that are associated with the associated tiles that are in the pre-render portion of the non-visible region and download visual media from the URLs. Also or instead, interface manager 210 can pre-render text parsed from report 110 or a visual indicator for the associated tiles that are in a remaining portion of the non-visible region.

Further, block 808 may pre-render animations indicating new content. Ways in which this may be performed, including progressive, cascading animations, are set forth in more detail in FIGS. 11-13 below.

Block 810 receives an input selecting to view the non-visible region, such as a panning gesture moving horizontally through the regions of the interface.

Block 812, responsive to the input, presents the pre-render portion and, following presentation or simultaneously with presenting the pre-render portion, block 814 renders the pre-rendered new content for the tiles in the pre-render portion. Continuing one of the above examples, interface manager 210 renders pre-rendered visual media downloaded from a URL in a report 110 within a tile, such as image 708 within tile 704 of FIG. 7.

Note also that method 800 can determine which of reports 110 received at block 802 are in a remaining portion of the non-visible region (the part of the region not determined to be the pre-render portion). Interface manager 210 may determine to perform some operations in preparation for presenting the remaining portion, such as those using small amounts of device resources or bandwidth. In one case, interface manager 210 pre-renders text or a visual indicator for the associated tiles that are in a remaining portion of the non-visible region, but does not download images or other visual media. In this case, interface manager 210 may more-quickly render text and indicators (but not images) in response to a user selection to view the remaining region.

Interface manager 210 may re-perform blocks of method 800 and/or 500 to pre-render for a new pre-render portion after presenting a new visible region, but in some cases a user still selects a remaining portion before pre-rendering can be completed or without pre-rendering being performed. Pre-rendering text and/or indicators, in this case, can improve a user's experience, because while the user may have to wait to see images in a tile, the user knows that new content does exist for the tile.

Figure 9:
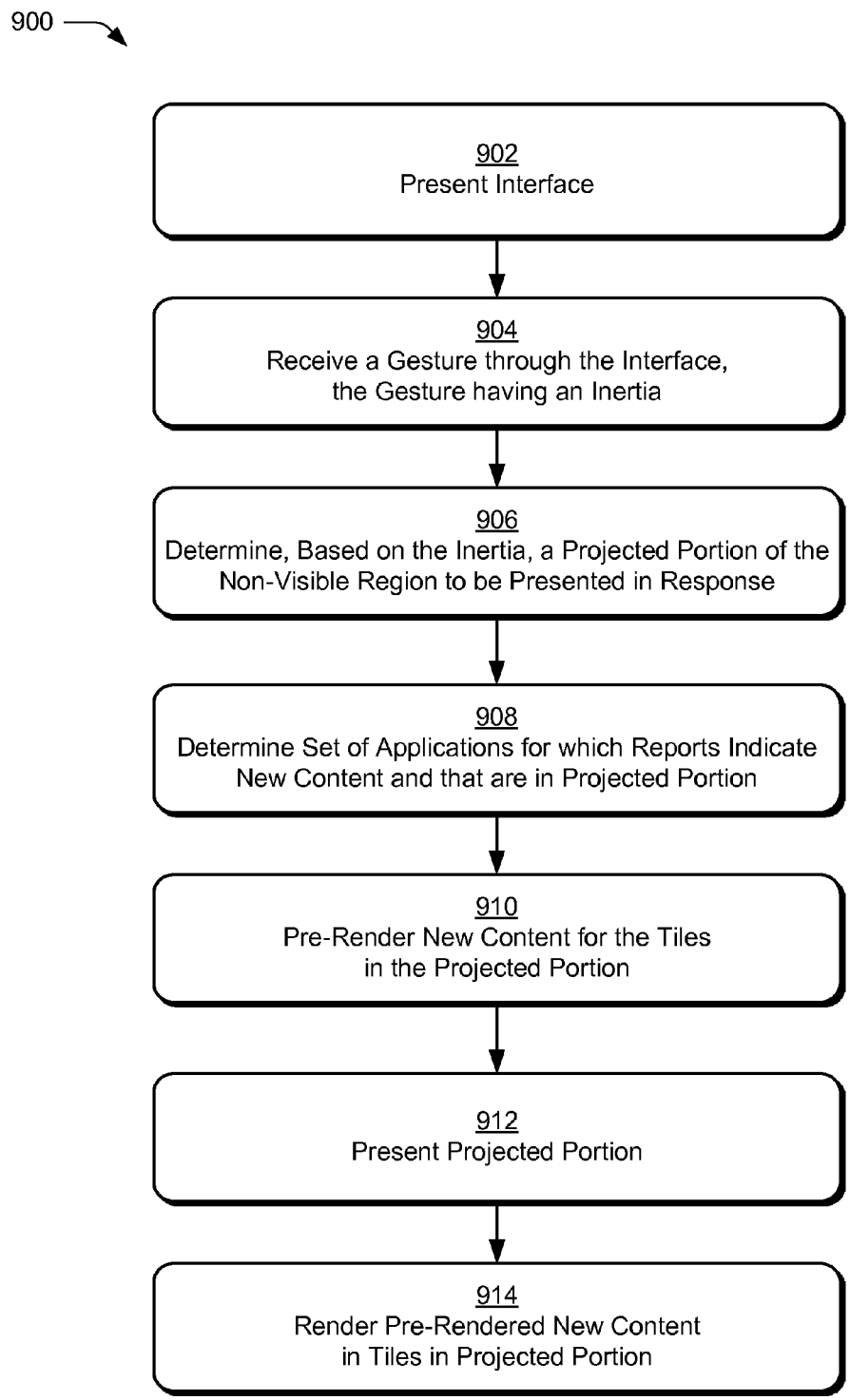
FIG. 9 illustrates an example method for pre-rendering new content for an application-selectable user interface, including determining a pre-render portion of a non-visible region based on a received input.

FIG. 9 depicts a method 900 for pre-rendering new content for an application-selectable user interface, including determining a pre-render portion of a non-visible region based on a received input. In portions of the following discussion reference may be made to environment 100 of FIG. 1 and as detailed in FIGS. 2-4, reference to which is made for example only. Method 900 may operate separate from or in conjunction with, in whole or in part, other methods described herein.

Block 902 presents an interface enabling selection of tiles associated with applications, the interface having a visible region and a non-visible region, such as application-selection interface 600 of FIG. 6.

Block 904 receives a gesture through the interface, the gesture having an inertia. Gestures having inertias can be of various types, such as those made through a touch-sensitive display or a motion-sensitive device with a stylus, finger, or arm, or a mouse-entered selection. Each of these has a velocity and an explicit or implicit friction slowing the velocity. Based on the inertia determined for a gesture, interface manager 210 may determine an ending point responsive to the inertia, such as a particular portion of a non-visible region of the interface.

Block 906 determines, based on the inertia of the gesture, a portion of the non-visible region projected to be presented in response to the gesture. This calculation can be based on the real-world physics calculations (e.g., those in which a gesture is given a mass, velocity, and friction) or be based on other calculations resulting in some ending point.

Figure 10:
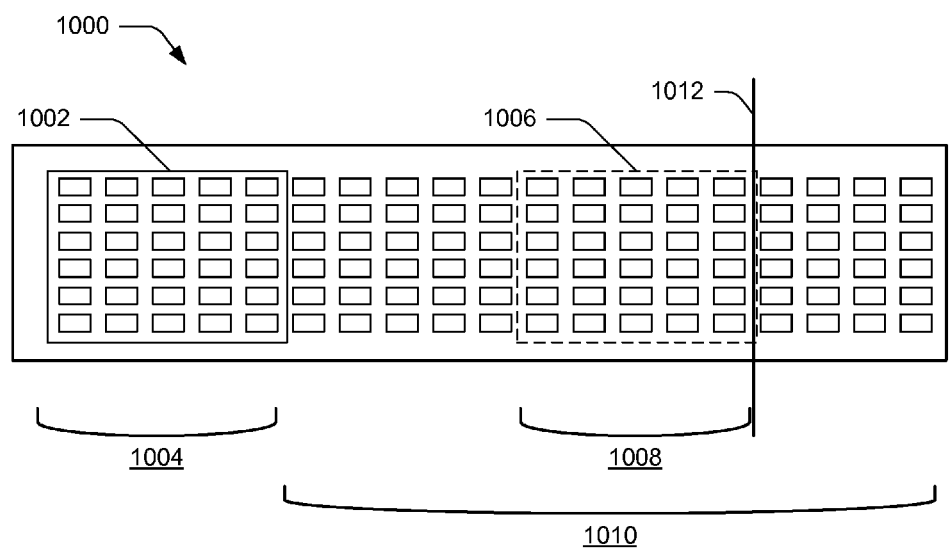
FIG. 10 illustrates an example interface having visible tiles of a visible region through which a gesture is received and projected tiles of a projected portion of a non-visible region.

By way of example, consider FIG. 10, which illustrates an example interface 1000 having visible tiles 1002 of visible region 1004 through which the gesture is received and projected tiles 1006 of projected portion 1008 of non-visible region 1010. Assume here that the gesture is a touch-based gesture panning from a right side of window 1002 to a left side of window 1002 (not shown). While not required, in some cases the inertia alone is not used to determine the projected portion of the non-visible region. In some cases the ending point is altered based on a snap point 1012 (e.g., an end or beginning of a group of tiles) or to avoid showing part of a tile, and so ending between columns of tiles rather than cutting off some of them. In some cases interface manager 210 alters the inertia or calculations to "naturally" show movement through the tiles of the interface to the projected portion.

Block 908 determines a set of the applications for which reports indicating new content have been indicated and that have corresponding tiles within the projected portion of the non-visible region. Here interface manager 210 determines which of the tiles in projected tiles 1006 have new content.

Block 910 pre-renders new content for the corresponding tiles in the projected portion of the non-visible region prior to presenting the projected portion of the non-visible region. Method 900 may do so in various ways described elsewhere herein.

Block 912 presents the projected portion of the non-visible region prior to or simultaneously with block 914. Block 914 renders the pre-rendered new content for the corresponding tiles in the portion of the non-visible region.

Note that interface manager 210 may pre-render the new content while showing movement to the projected portion. Also, interface manager 210 may slow down the movement to the projected portion so that the pre-rendering is completed prior to presenting the projected portion.

Interface manager 210 may present a movement from the visible region, through a different, remaining portion of the non-visible region, and ending at the projected portion. As noted, the techniques may pre-render less resource-intensive new content (e.g., text) or indicators for remaining portions of a non-visible region. Consider again FIG. 10 and note that while showing movement from visible region 1004 to projected region 1008 that various tiles in the non-visible region 1010 will be moved through, though this may be done quickly or relatively slowly. In either case, however, interface manager 210 may indicate new content for these tiles, such as by presenting new text in the tiles or indicating new content is available with an animation or other indicator (e.g., indicator 714 of FIG. 7).

Here assume that interface manager 210 reports changes to eleven of the twelve larger tiles and one of the three small tiles shown in interface 600 of FIG. 6, though any variation of such a presentation is contemplated, such as changes to all or none of the selectable tiles. Note that these changes, even if all of these changes were already received at the time a user selects to view user interface 600, may be presented to each of the various tiles and portions of the tiles progressively. This progressive alteration of the tiles can make user interface 600 look animated. Thus, the changes to the tiles are not necessarily made all at once.

Further, in cases where multiple changes for an application are known, interface manager 210 may present the newest of the changes or rotate through these changes. Interface manager 210 may rotate through changes to maintain a "live" feel to user interface 600 or responsive to activity or inactivity with a tile. Inactively with a tile may indicate that the currently-indicated change is not of interest to a user. As another of the changes may be of more interest, the most-recent change may be rotated off of a tile and an older (but still new) change rotated on to the tile.

While method 900 describes determining a projected region based on a gesture having an inertia, method 900 may receive and determine a projected portion based on other types of inputs, such as hotkeys, page-advancement keys, selections to a graphic (e.g., a scrolling bar), and the like.

Generally, the above-described methods concern pre-rendering new content while the below-described methods concern how new content is rendered. All methods described herein, however, may be used alone or in combination, in whole or in part, with the other methods.

Figure 11:
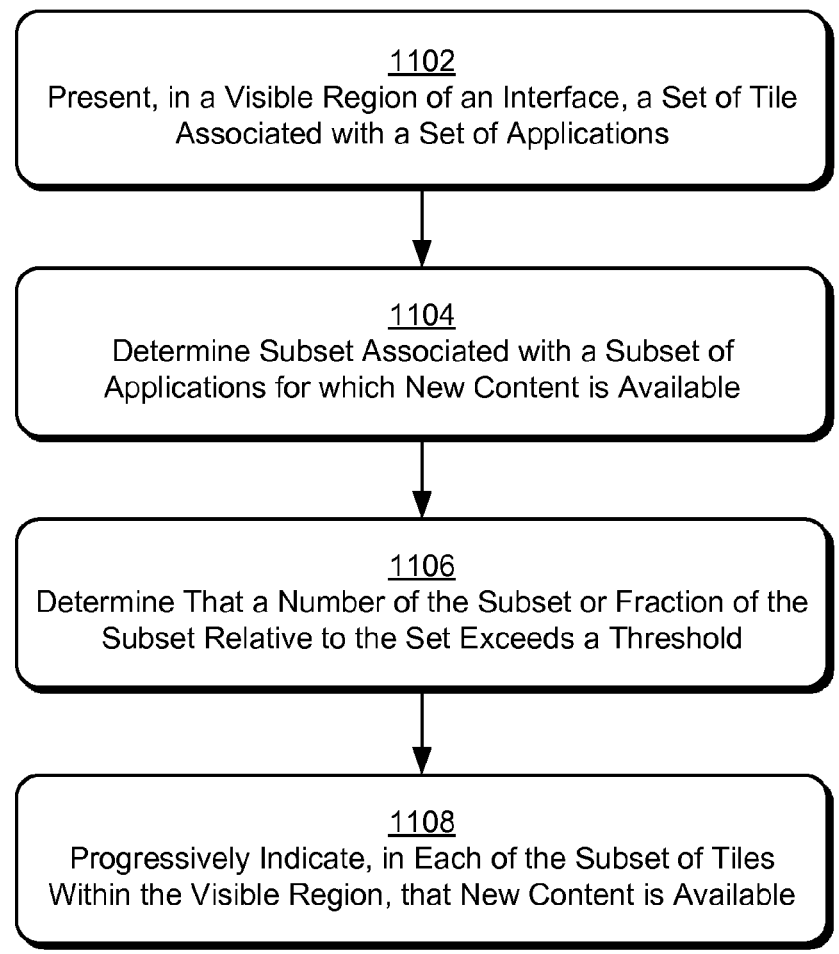
FIG. 11 illustrates an example method for progressively indicating new content within an application-selection user interface.

FIG. 11 depicts a method 1100 for progressively indicating new content within an application-selection user interface. In portions of the following discussion reference may be made to environment 100 of FIG. 1 and as detailed in FIGS. 2-4, reference to which is made for example only. Method 1100 may operate separate from or in conjunction with, in whole or in part, other methods described herein, such as methods 500, 800, and 900.

Block 1102 presents, in a visible region of an interface, a set of tiles associated with a set of applications. The set of tiles can be those of a visible region that a user selects to see, such as when a user first selects or returns to an application-selection interface that previously presented the tiles. In such a case block 1102 first presents or re-presents the set of tiles, respectively.

The set of tiles can also be those presented in response to a selection to view a currently non-visible region and the set being those presented in response to the selection in the various manners set forth above.

Block 1104 determines a subset of the set of tiles associated with a subset of applications and for which new content is available. Block 1104 may do so by receiving reports 110 as noted above and determining which indicate new content and which of those have tiles in the set.

Block 1106 determines that a number of the subset or a fraction of the subset relative to the set exceeds a threshold. This threshold can be pre-determined, such as when set by a user or by default. It may also be determined (during or prior to method 1100), such as by interface manager 210 based on a number of tiles viewable on display 206, the size of interface 220, the size of the tiles themselves, as well as types of indications, whether they be a small, simple indication or a complex animation.

The threshold can be based on a specific user or a typical user's mental or visual limit. Some users, for example, will be mentally or visually overloaded or overstimulated if more than five tiles present new content or otherwise indicate that new content is available at one time. Some users will instead be overloaded or overstimulated if more than $4/10$ths, $5/10$ths, or $6/10$ths indicate new content at one time. This threshold, whether based on a fraction of visible tiles or a particular number, can be determined and used to improve a user experience.

Block 1108 progressively indicates, in each of the subset of tiles within the visible region, that new content is available. Block 1108 may progressively indicate new content in numerous ways, such as through cascading indications or animations across the subset of tiles through the visible region. Interface manager 210, for example, may cascade animations from one side to another (e.g., a left-most to a right-most column) or from one corner to an opposite corner (e.g., an upper-left tile to a lower-right tile).

Figure 12:
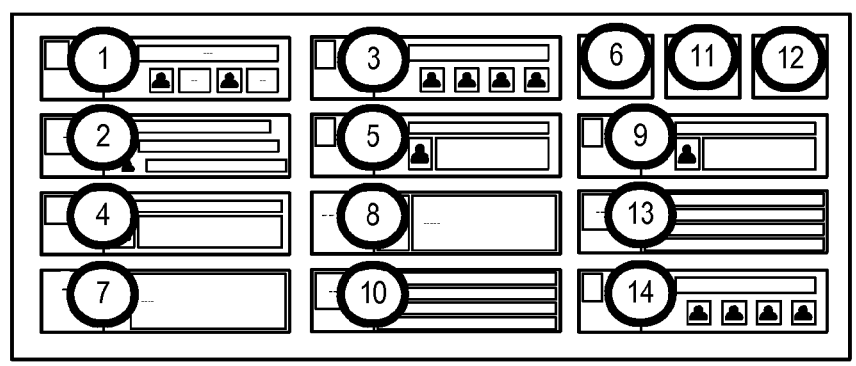
FIG. 12 illustrates an example interface showing an order for progressive indications to be shown in the tiles.

By way of example, consider an upper-left corner to lower-right corner progressive indications illustrated in FIG. 12 in interface 1200. This particular example shows a progressive indication of new content numbered by order of indication. In contrast to other examples, three columns of tiles are visible at one time in interface 1200. Note that interface manager 210 indicates new content in an order, though the delay between each number can vary. In some cases the delay is set at a total time to complete an animation for the prior tile in the order, in others it is based on a fraction of that amount of time, such that as the first tile is part way through displaying an animation the second tile begins to display an animation and so forth. Further, while here the order proceeds through 14 distinct stages (if all of the tiles have new content), fewer stages may instead be used. Thus, interface manager 210 can begin with the first-number tile but then show animations on both tiles 2 and 3 at once, then tiles 4, 5, and 6 at once, and so forth. In cases where interface manager 210 cascades through indications from left-to-right based on columns, for example, interface manager 210 may presents the tiles numbered 1, 2, 4, and 7 at one time, then tiles numbered 3, 5, 8, and 10, then tiles 6, 9, 13, and 14, and lastly 11 and then 12.

The indications showing new content, as noted in part above, can be small and simple (e.g., indication 714 of FIG. 7), animations altering an appearance of the entire tile, presentation of new content (e.g., presenting the new image and text to show that a new article is available as shown at 708 and 710, respectively), rotating through new content or portions thereof, and so forth. Animations of tiles may visibly alter an appearance of the tiles but may or may not include the new content. Interface manager 210 may indicate new content is available by tilting, adding a shimmering effect, or changing a color of a tile, with or without showing the new content in the tile. Note also that in some embodiments, not indicating new content through a tile allows a user to easily understand that no new content is available.

Consider a case where five new articles are available at a news website since a user last-visited the website. In such a case, the indication of method 1100 may include rotating through images and text for each of the five new articles. Or, for even a single content change, interface manager 210 may rotate or scroll through content associated with that content change, such as a title of new article and the first sentence of the article, a name of a person that sent an email and the subject line of the email, or a picture of a person that added content to a social-networking website and the first sentence of the added content.

Figure 13:
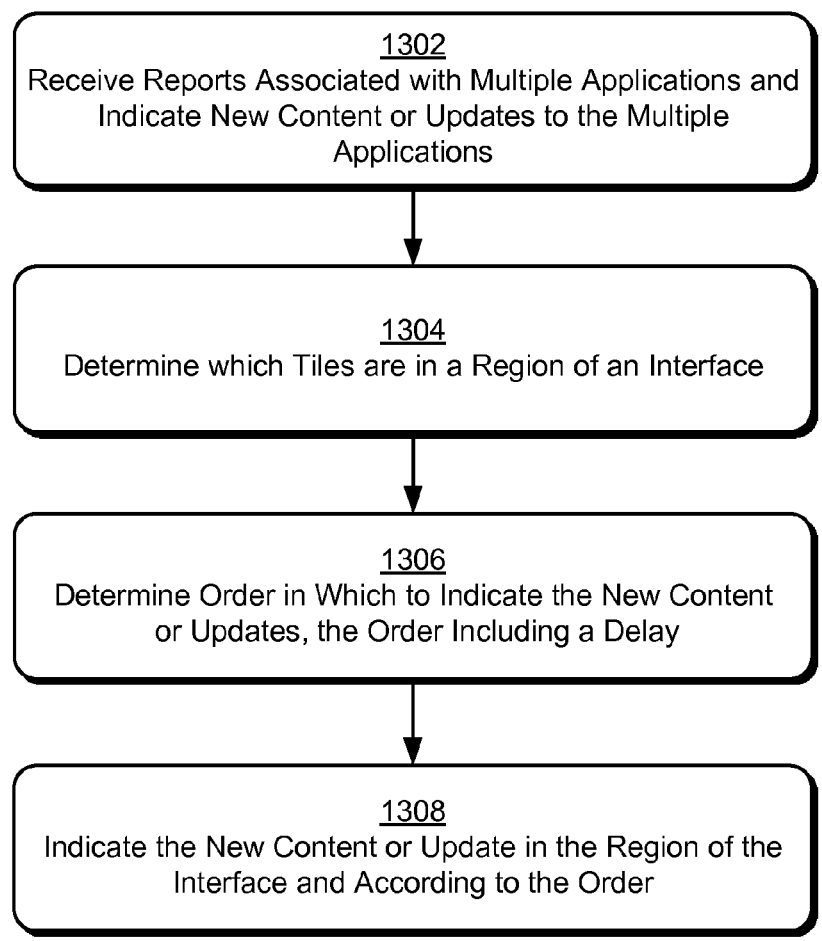
FIG. 13 illustrates an example method for progressively indicating new content within an application-selection user interface, including determining an order in which to perform the indications.

FIG. 13 depicts a method 1300 for progressively indicating new content within an application-selection user interface, including determining an order in which to progressively indicate. In portions of the following discussion reference may be made to environment 100 of FIG. 1 and as detailed in FIGS. 2-4, reference to which is made for example only. Method 1300 may operate separate from or in conjunction with, in whole or in part, other methods described herein, such as methods 500, 800, 900, and 1100.

Block 1302 receives reports associated with multiple applications and indicates new content or updates to the multiple applications, the multiple applications having associated tiles of an interface through which the new content or the update can be indicated. Block 1302 may do so in various of the manners set forth above, such as similar to block 802 of FIG. 8.

Block 1304 determines which of the associated tiles are in a region of the interface, such as similar to block 804 of FIG. 8.

Block 1306 determines an order in which to indicate the new content or the updates, the order including a delay to indicate at least one of the new content or the updates in the region of the interface. The order can be as noted for method 1100 above, as well as based on when reports 110 are received or a pre-selected priority for various of the applications. Thus, a user may select to have indications noted in a particular order or set some tiles as more important than others. This order can be implicit based on the layout of the tiles or explicit, such as by receiving a selection to increase or decrease an application's priority.

In addition to the order itself, a delay can be based on an amount of time needed to show a certain part of, or all of, an animation, or even an amount of time to download images or content to present as part of the indication (e.g., in cases where the images are not pre-rendered). Further still, the order may also or instead be based on a fraction or number of tiles in the visible region that have new content. Thus, interface manager 210 may more-quickly present indications when there is a large number or fraction visible.

Block 1308 indicates the new content or the updates in the region of the interface and according to the order. Consider again FIG. 12 in which various tiles are shown. Here assume that interface manager 210 determines that tiles numbered 2, 5, 6, and 13 have associated applications for which one of reports 110 indicates new content or an update. Interface manager 210 then determines to present animations starting at tile 2, and then, after a delay, presenting both tiles 5 and 6 at once, and then after another delay, tile 13.

The preceding discussion describes methods for progressively indicating new content in and pre-rendering new content for an application-selectable user interface. These methods are shown as sets of blocks that specify operations performed but are not necessarily limited to the order shown for performing the operations by the respective blocks.

Aspects of these methods may be implemented in hardware (e.g., fixed logic circuitry), firmware, software, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

These techniques may be embodied on one or more of the entities shown in environment 100 of FIG. 1 (and as detailed in FIGS. 2-4) and/or example device 1400 described below, which may be further divided, combined, and so on. Thus, environment 100 and/or device 1400 illustrate some of many possible systems or apparatuses capable of employing the described techniques. The entities of environment 100 and/or device 1400 generally represent software, firmware, hardware, whole devices or networks, or a combination thereof. In the case of a software implementation, for instance, the entities (e.g., interface manager 210 of FIG. 2, report generator 306 of FIG. 3, and compiling module 406 of FIG. 4) represent program code that performs specified tasks when executed on a processor (e.g., processor(s) 202, 302, and 402, respectively). The program code can be stored in one or more computer-readable memory devices, such as computer-readable storage media 204, 304, or 404 or computer-readable media 1414 of FIG. 14. The features and techniques described herein are platform-independent, meaning that they may be implemented on a variety of commercial computing platforms having a variety of processors.

Example Apparatus

Figure 14:
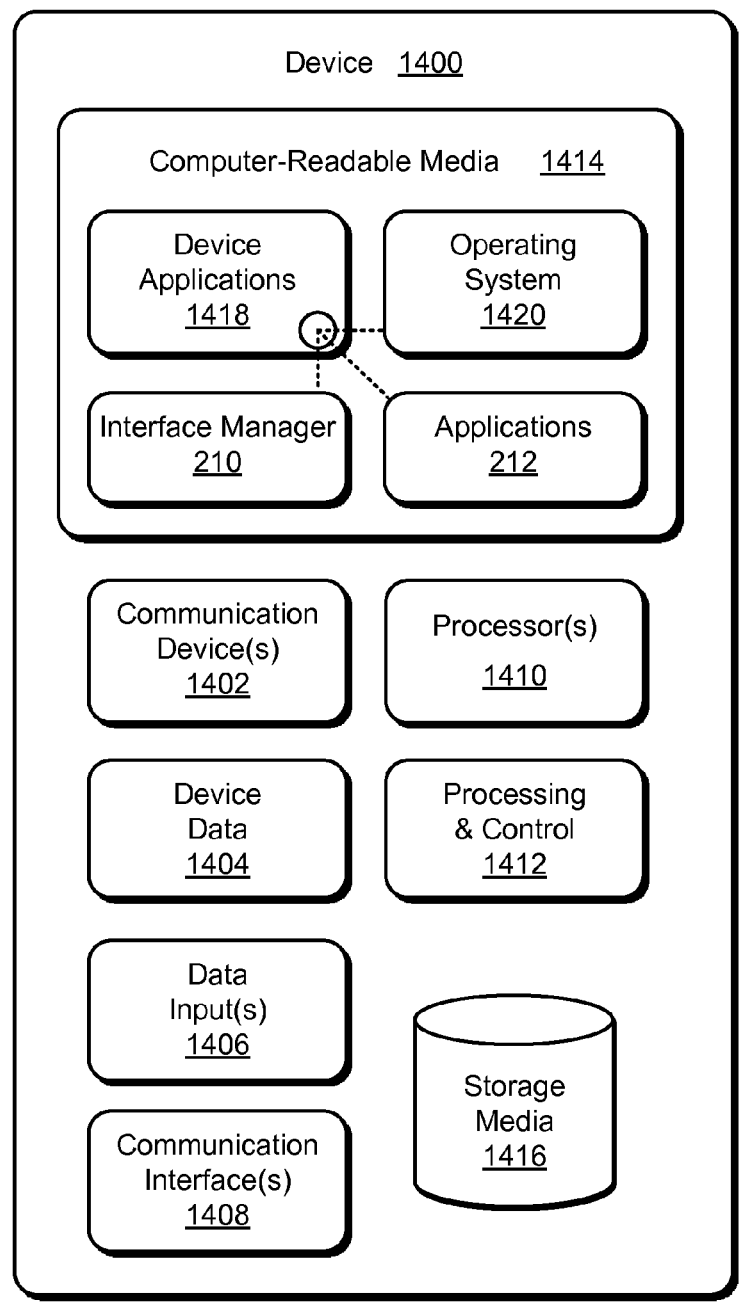
FIG. 14 illustrates an example device in which techniques for progressively indicating new content in, or pre-rendering new content for, an application-selectable user interface can be implemented.

FIG. 14 illustrates an apparatus having various components, here as part of an example device 1400, which can be implemented as any type of client, server, and/or computing device as described with reference to the previous FIGS. 1-13 to implement techniques for progressively indicating new content in, or pre-rendering new content for, an application-selectable user interface. In embodiments, device 1400 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 1400 may also be associated with a user (e.g., a person) and/or an entity that operates the device such that a device describes logical devices that include users, software, firmware, and/or a combination of devices.

Device 1400 includes communication devices 1402 that enable wired and/or wireless communication of device data 1404 (e.g., received data, data that is being received, data scheduled for broadcast, data packets of the data, etc.). The device data 1404 or other device content can include configuration settings of the device, media content stored on the device, and/or information associated with a user of the device. Media content stored on device 1400 can include any type of audio, video, and/or image data. Device 1400 includes one or more data inputs 1406 via which any type of data, media content, and/or inputs can be received, such as user-selectable inputs, messages, music, television media content, recorded video content, and any other type of audio, video, and/or image data received from any content and/or data source.

Device 1400 also includes communication interfaces 1408, which can be implemented as any one or more of a serial and/or parallel interface, a wireless interface, any type of network interface, a modem, and as any other type of communication interface. The communication interfaces 1408 provide a connection and/or communication links between device 1400 and a communication network by which other electronic, computing, and communication devices communicate data with device 1400.

Device 1400 includes one or more processors 1410 (e.g., any of microprocessors, controllers, and the like), which process various computer-executable instructions to control the operation of device 1400 and to enable application reporting in an application-selectable interface. Alternatively or in addition, device 1400 can be implemented with any one or combination of hardware, firmware, or fixed logic circuitry that is implemented in connection with processing and control circuits, which are generally identified at 1412. Although not shown, device 1400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1400 also includes computer-readable storage media 1414, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1400 can also include a mass storage media device 1416.

Computer-readable storage media 1414 provides data storage mechanisms to store the device data 1404, as well as various device applications 1418 and any other types of information and/or data related to operational aspects of device 1400. For example, an operating system 1420 can be maintained as a computer application with the computer-readable storage media 1414 and executed on processors 1410. The device applications 1418 may include a device manager, such as any form of a control application, software application, signal-processing and control module, code that is native to a particular device, a hardware abstraction layer for a particular device, and so on.

The device applications 1418 also include any system components or modules to implement techniques for progressively indicating new content in, or pre-rendering new content for, an application-selectable user interface. In this example, the device applications 1418 can include interface manager 210 and applications 212.

CONCLUSION

Although embodiments of techniques and apparatuses for progressively indicating new content in, or pre-rendering new content for, an application-selectable user interface have been described in language specific to features and/or methods, it is to be understood that the subject of the appended claims is not necessarily limited to the specific features or methods described. Rather, the specific features and methods are disclosed as example implementations for progressively indicating new content in, or pre-rendering new content for, an application-selectable user interface.

What is claimed is:

1. A computing device comprising:
    one or more computer processors; and
    one or more computer-readable storage memories having instructions stored thereon that, responsive to execution by the one or more computer processors, perform operations comprising:
        presenting, in a visible region of an interface, a first set of tiles associated with a first set of applications, the interface having the visible region and a non-visible region containing a second set of tiles associated with a second set of applications, individual tiles of the second set of tiles configured to present new application content or an application update;
        receiving a gesture input, the gesture input having an inertia;
        determining, based on the inertia of the gesture input, an ending point of the gesture input and a portion of the non-visible region of the interface corresponding to the ending point of the gesture input; and
        presenting, responsive to the determining the ending point, the portion of the non-visible region of the interface, wherein the portion of the non-visible region of the interface includes a subset of the second set of tiles and the new application content or the application update for individual tiles in the subset of the second set of tiles is displayed progressively.

2. A computing device as described in claim 1, wherein the determined ending point of the gesture input is determined by a real-world physics calculation in which the gesture input is assigned, for calculation purposes, a mass, velocity, and friction.

3. A computing device as described in claim 1, further comprising a touch-sensitive input device, wherein the gesture input is received through the touch-sensitive input device.

4. A computing device as described in claim 1, wherein the gesture input is received through a motion-sensitive input device.

5. A computing device as described in claim 1, wherein the gesture input is received through a mouse-entered selection.

6. A computing device as described in claim 1, wherein the new application content or the application update for the individual tiles in the subset of the second set of tiles is displayed progressively over a period of time after the portion of the non-visible region is presented on a display screen.

7. A computing device as described in claim 1, wherein the new application content or the application update for the individual tiles in the subset of the second set of tiles is displayed progressively from one side of a display screen to another side of the display screen after the portion of the non-visible region is presented on the display screen.

8. A computing device as described in claim 1, wherein the new application content or the application update for the individual tiles in the subset of the second set of tiles is displayed progressively from one corner of a display screen to another corner of the display screen after the portion of the non-visible region is presented on the display screen.

9. A computer-implemented method comprising:
    presenting, at a computing device and in a visible region of an interface, a first set of tiles associated with a first set of applications, the interface having the visible region and a non-visible region containing a second set of tiles associated with a second set of applications, individual tiles of the second set of tiles configured to present new application content or an application update;
    receiving a gesture input, the gesture input having an inertia;
    determining, based on the inertia of the gesture input, an ending point of the gesture input and a portion of the non-visible region of the interface corresponding to the ending point of the gesture input; and presenting, responsive to the determining the ending point, the portion of the non-visible region of the interface, wherein the portion of the non-visible region of the interface includes a subset of the second set of tiles and the new application content or the application update for individual tiles in the subset of the second set of tiles is displayed progressively.

10. A computer-implemented method as described in claim 9, wherein the ending point of the gesture input is determined by a real-world physics calculation in which the gesture input is assigned, for calculation purposes, a mass, velocity, and friction.

11. A computer-implemented method as described in claim 9, wherein the gesture input is received through a touch-sensitive input device associated with the computing device.

12. A computer-implemented method as described in claim 9, wherein the gesture input is received through a motion-sensitive input device.

13. A computer-implemented method as described in claim 9, wherein the gesture input is received through a mouse-entered selection.

14. A computer-implemented method as described in claim 9, wherein the new application content or the application update for the individual tiles in the subset of the second set of tiles is displayed progressively over a period of time after the portion of the non-visible region is presented on a display screen.

15. A computer-implemented method as described in claim 9, wherein the new application content or the application update for the individual tiles in the subset of the second set of tiles is displayed progressively from one side of a display screen to another side of the display screen after the portion of the non-visible region is presented on the display screen.

16. A computer-implemented method as described in claim 9, wherein the new application content or the application update for the individual tiles in the subset of the second set of tiles is displayed progressively from one corner of a display screen to another corner of the display screen after the portion of the non-visible region is presented on the display screen.

17. A system comprising:
one or more computer processors;
one or more computer-readable storage memories having instructions stored thereon that, responsive to execution by the one or more computer processors, perform operations comprising:
presenting, in a visible region of an interface, a first set of tiles associated with a first set of applications, the interface having the visible region and a non-visible region containing a second set of tiles associated with a second set of applications;
determining, for individual tiles of the second set of tiles, new application content to pre-render;
pre-rendering the determined new application content;
receiving a gesture input;
determining a portion of the non-visible region of the interface to be presented in response to receipt of the gesture input; and
presenting, responsive to the determining, the determined portion of the non-visible region, the presenting including presenting the pre-rendered determined new content in a progressive manner.

18. A system as described in claim 17, wherein the determining the portion of the non-visible region of the interface to be presented is based on an ending point of the gesture input.

19. A system as described in claim 18, wherein the ending point of the gesture input is determined by a real-world physics calculation in which the gesture input is assigned, for calculation purposes, a mass, velocity, and friction.

20. A system as described in claim 17, wherein the pre-rendered determined new content is displayed progressively from one side of a display screen to another side of the display screen after the determined portion of the non-visible region is presented on the display screen.

* * * * *